(12) United States Patent
Tang et al.

(10) Patent No.: US 11,118,111 B2
(45) Date of Patent: Sep. 14, 2021

(54) COMPOUNDS WITH CIRCULARLY POLARIZED LUMINESCENCE

(71) Applicant: THE HONG KONG UNIVERSITY OF SCIENCE AND TECHNOLOGY, Hong Kong (CN)

(72) Inventors: Benzhong Tang, Hong Kong (CN); Wing Yip Lam, Hong Kong (CN); Fengyan Song, Hong Kong (CN)

(73) Assignee: THE HONG KONG UNIVERSITY OF SCIENCE AND TECHNOLOGY, Hong Kong (CN)

( * ) Notice: Subject to any disclaimer, the term of this patent is extended or adjusted under 35 U.S.C. 154(b) by 0 days.

(21) Appl. No.: 16/680,861

(22) Filed: Nov. 12, 2019

(65) Prior Publication Data

US 2020/0157425 A1 May 21, 2020

Related U.S. Application Data

(60) Provisional application No. 62/917,021, filed on Nov. 16, 2018.

(51) Int. Cl.
*C09K 19/04* (2006.01)
*G02F 1/01* (2006.01)
*G02F 1/13357* (2006.01)
*G02F 1/1335* (2006.01)

(52) U.S. Cl.
CPC ............ *C09K 19/04* (2013.01); *G02F 1/0105* (2013.01); *G02F 1/133617* (2013.01); *C09K 2019/0433* (2013.01); *G02F 1/133543* (2021.01)

(58) Field of Classification Search
None
See application file for complete search history.

(56) References Cited

U.S. PATENT DOCUMENTS

2018/0094155 A1* 4/2018 Fujita .................. C09D 11/328

\* cited by examiner

*Primary Examiner* — Po-Chih Chen
(74) *Attorney, Agent, or Firm* — Nath, Goldberg & Meyer; Joshua B. Goldberg; Nahied Usman

(57) ABSTRACT

The present subject matter relates to a fluorescent compound having aggregation-induced emission (AIE) characteristics. The compound can be a rod-like chiral luminogen bearing a chiral moiety at one end and long aliphatic chains at an opposing end. The compound emits circularly polarized light or luminescence (CPL) in the aggregate state. For example, the compound does not exhibit a chiroptical signal when dispersed in solution, but demonstrates tunable CPL signals in the aggregate state.

4 Claims, 43 Drawing Sheets

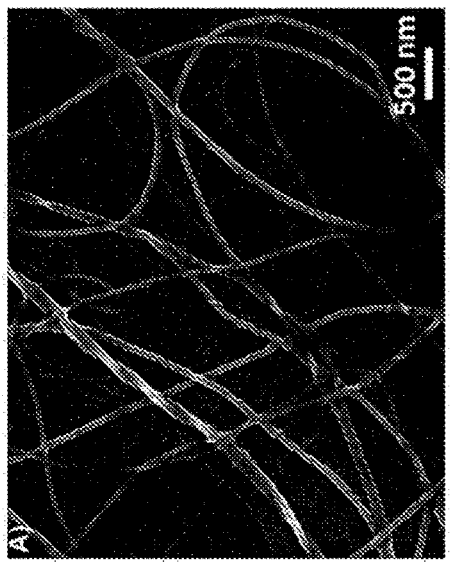
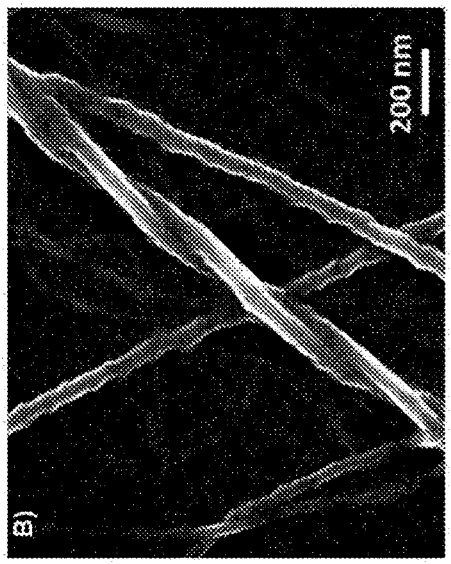
FIG. 3A
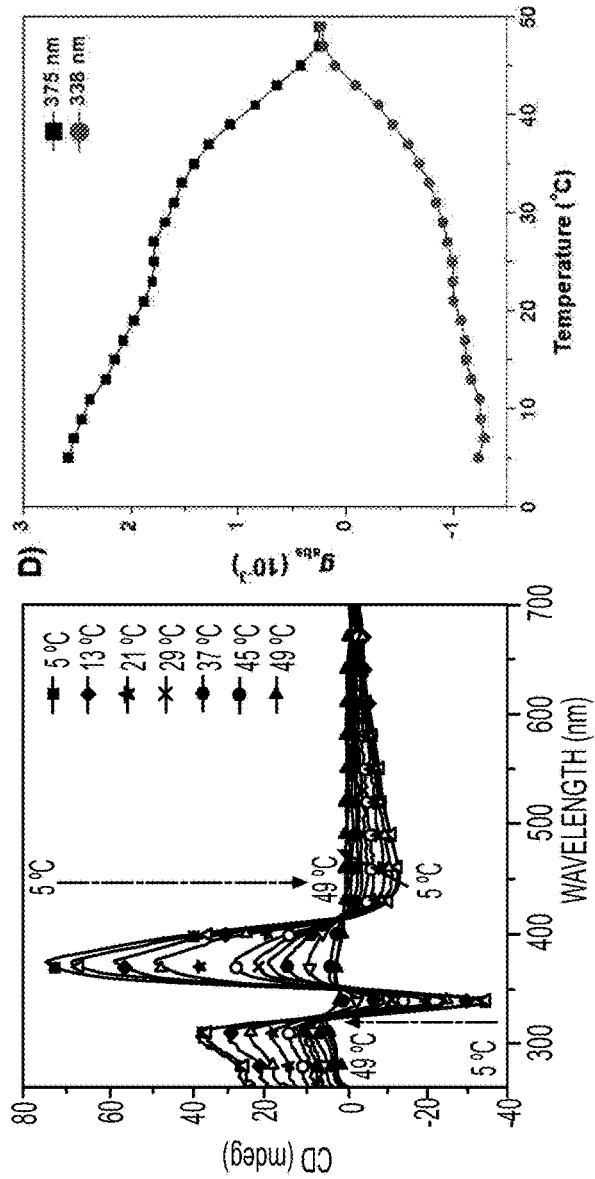
FIG. 3C
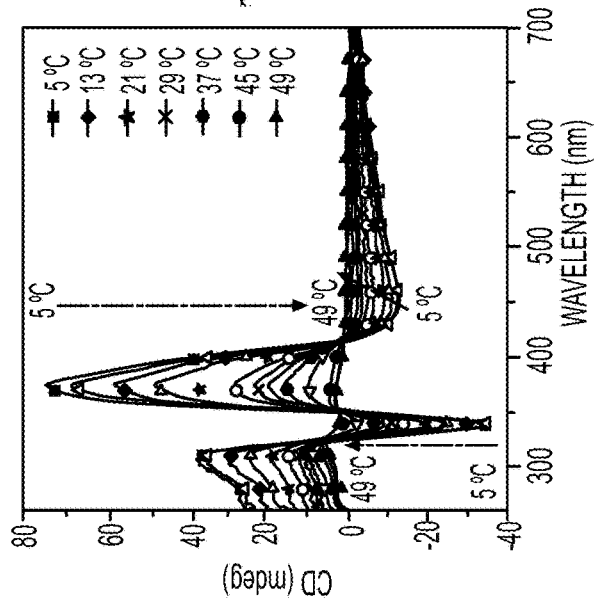
FIG. 3D

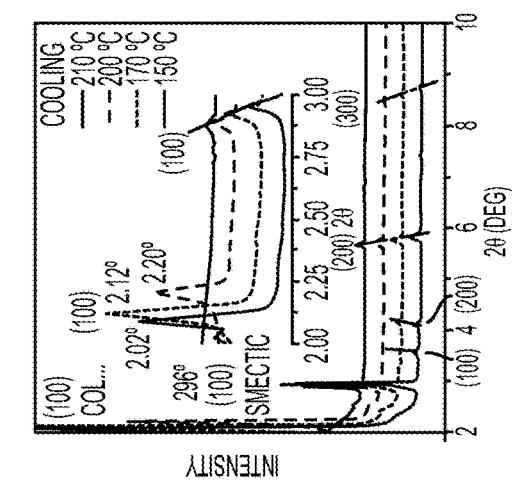
FIG. 4A
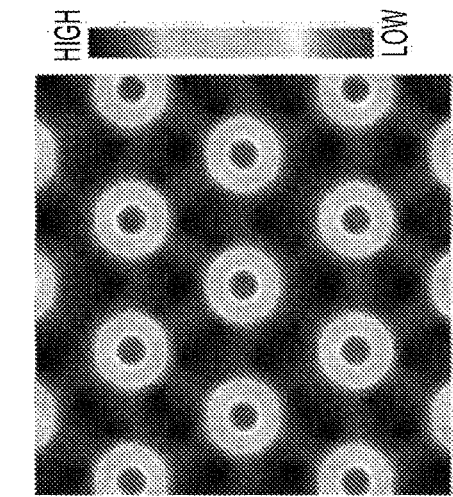
FIG. 4B
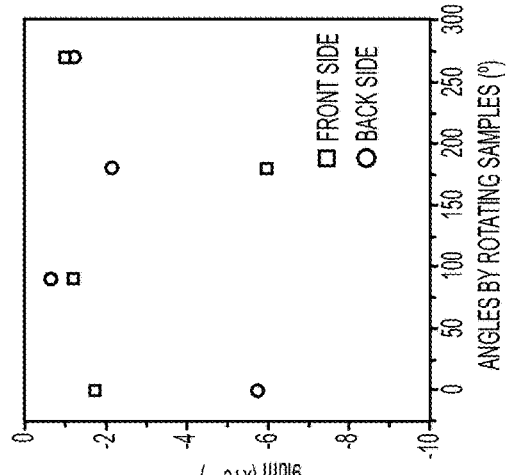
FIG. 4C
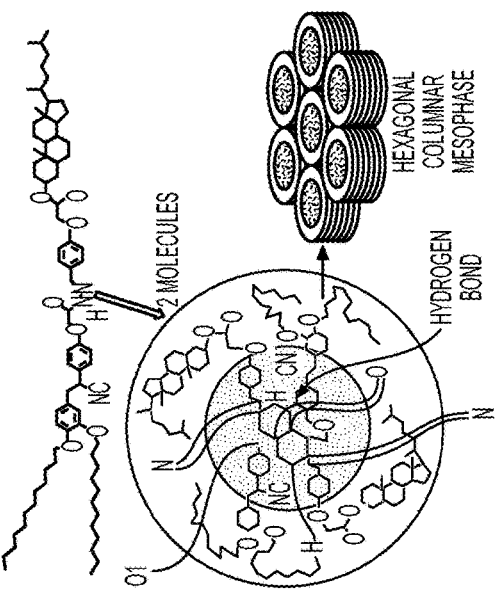
FIG. 4D
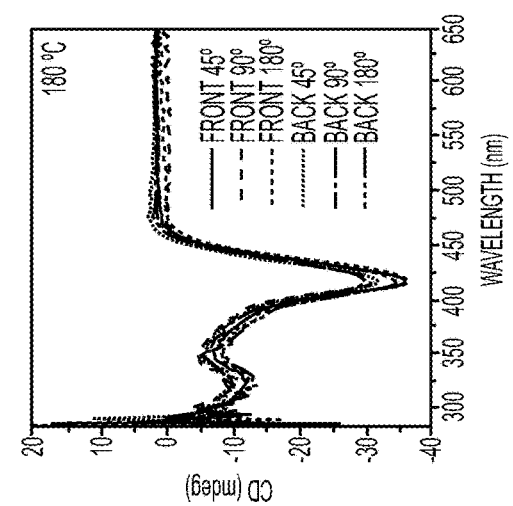
FIG. 4E
FIG. 4F

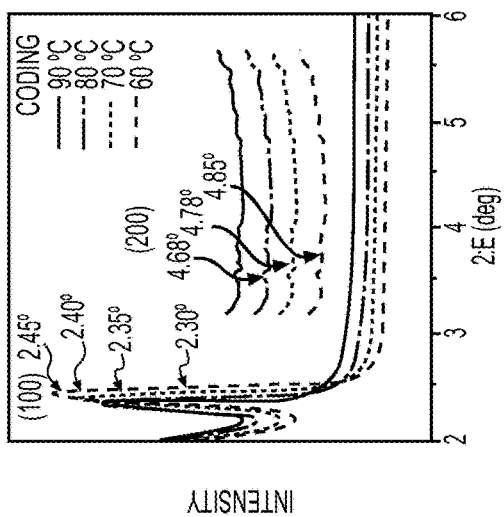
FIG. 5A
FIG. 5B
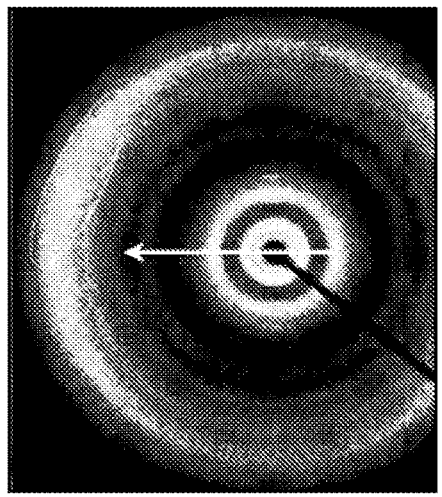
FIG. 5C
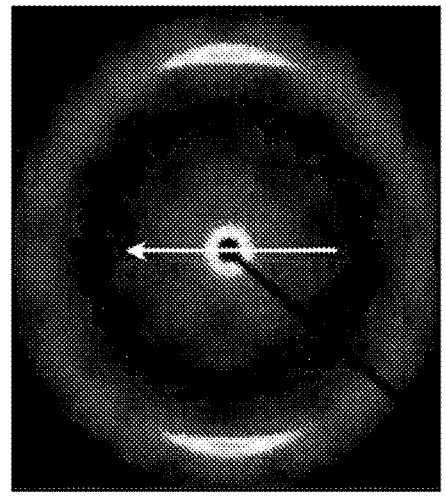
FIG. 5D

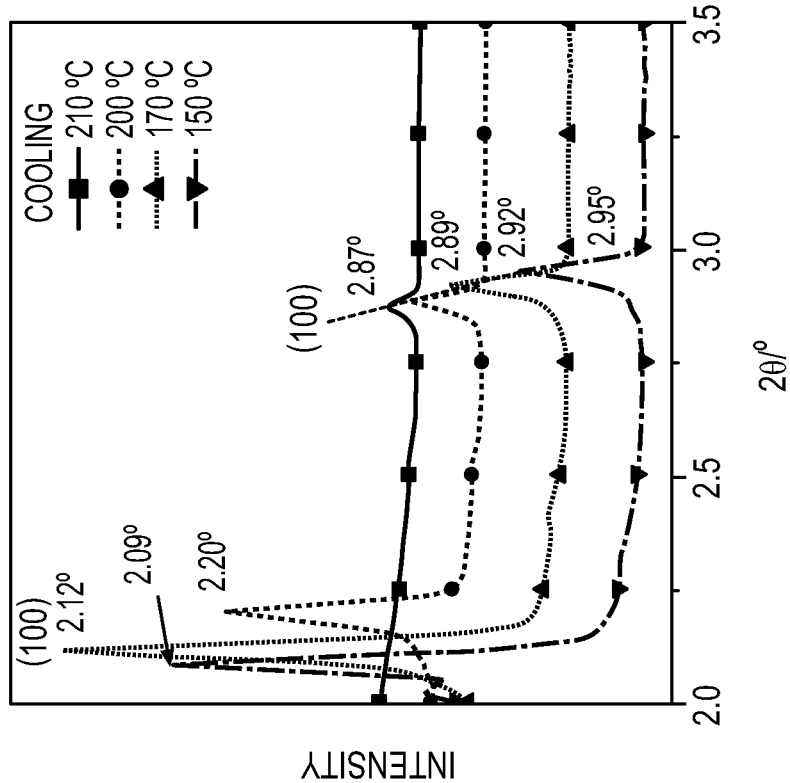
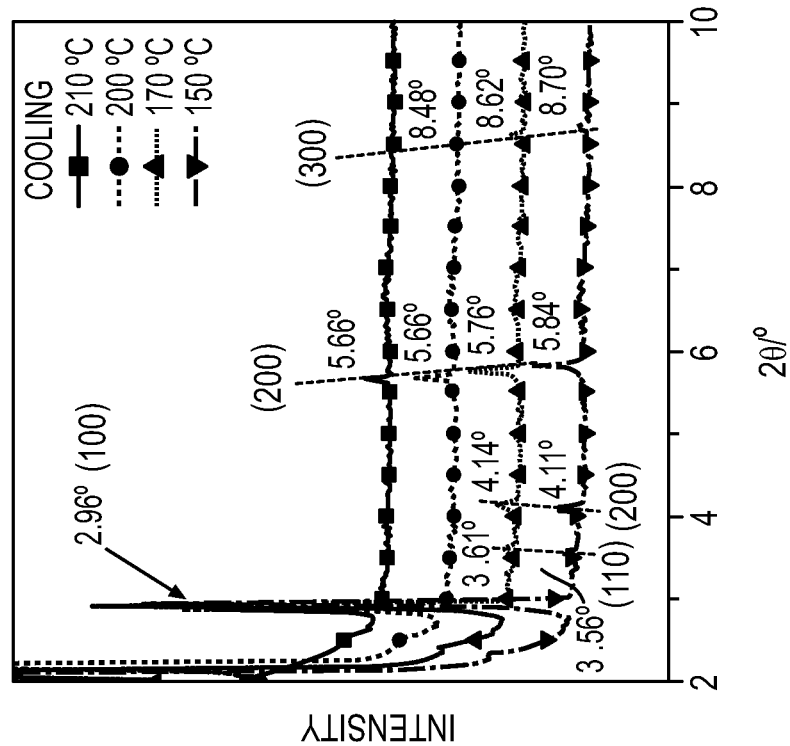
FIG. 20B
FIG. 20A

Fig. 22A
Fig. 22B
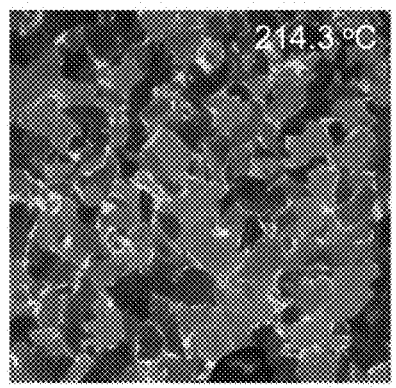
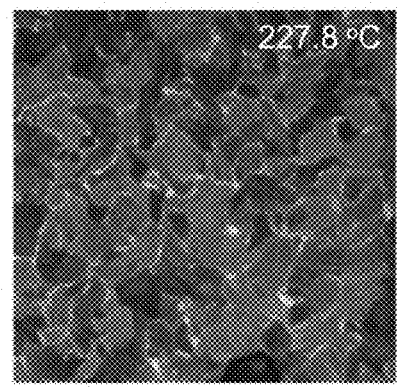
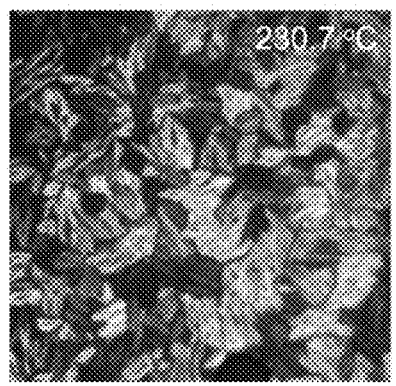
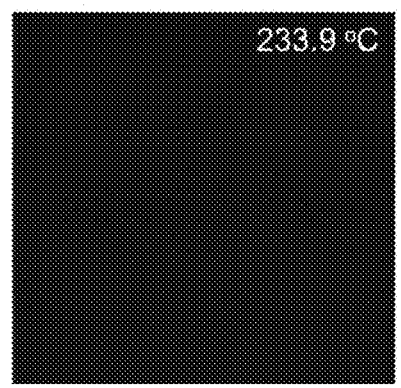
Figs. 22C
Fig. 22D

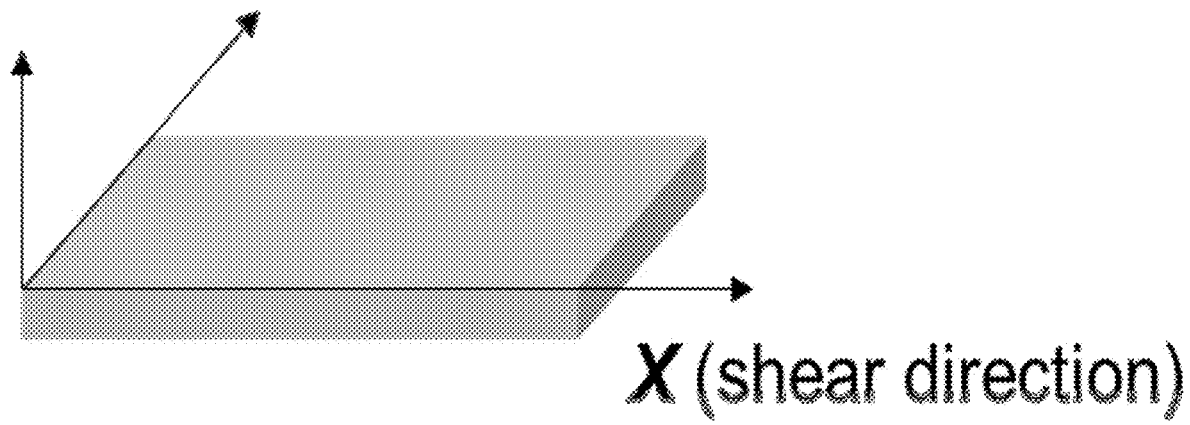
Fig. 32
Fig. 33A  Fig. 33B
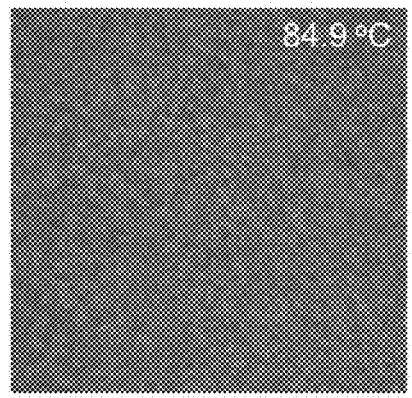 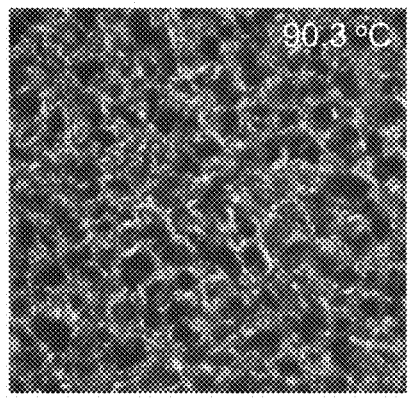
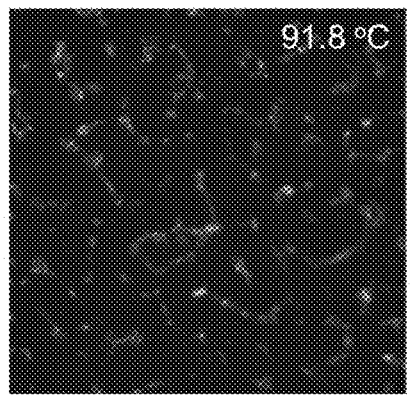 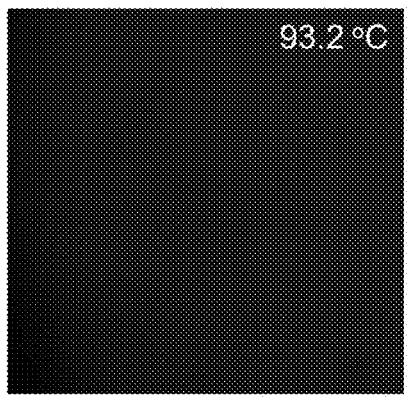
Fig. 33C  Fig. 33D Fig. 34A
Fig. 34B
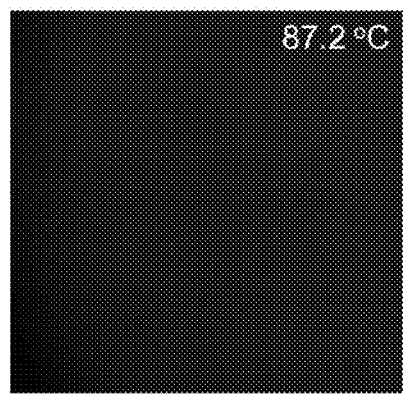
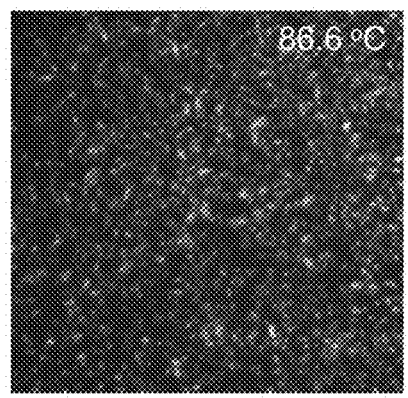
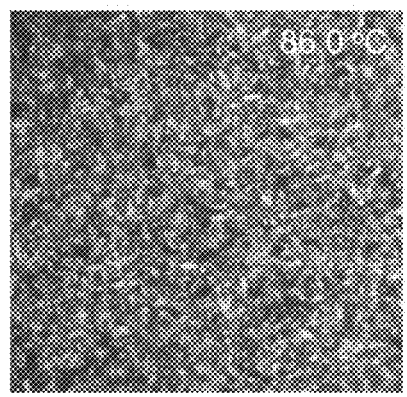
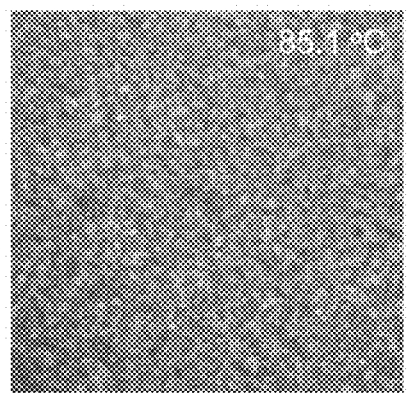
Fig. 34C
Fig. 34D

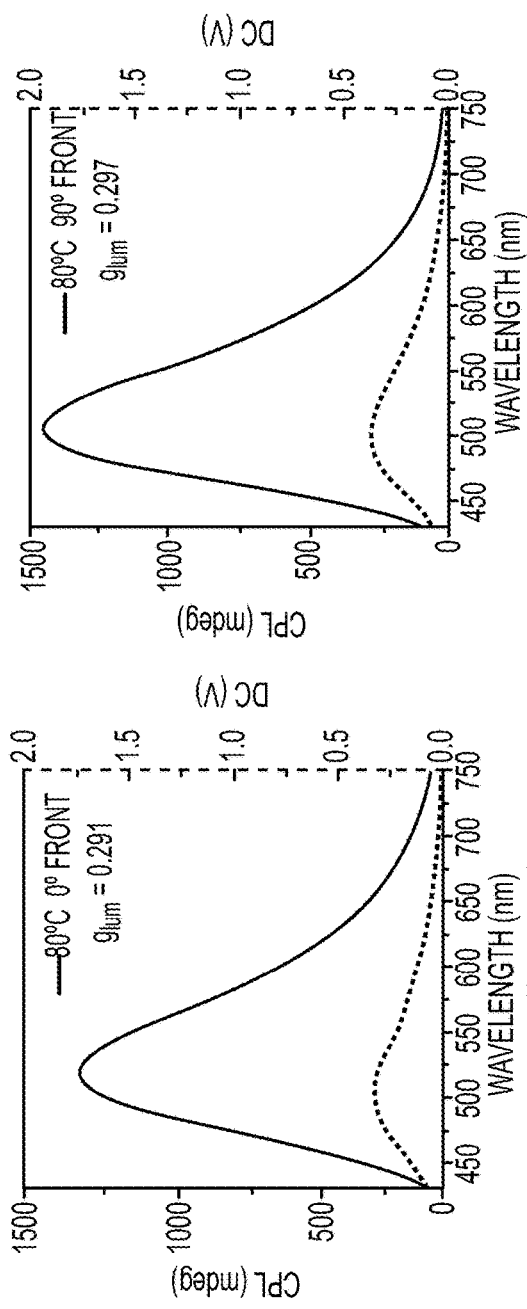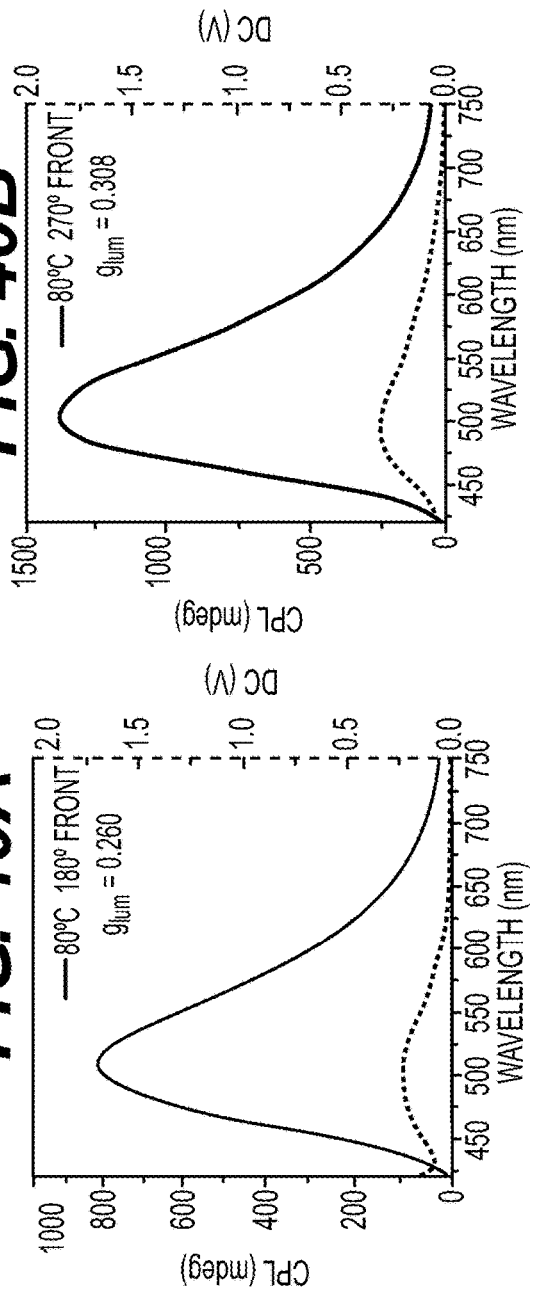

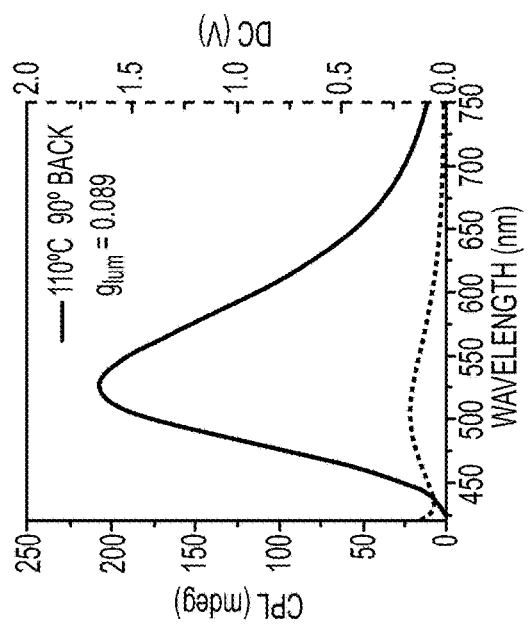
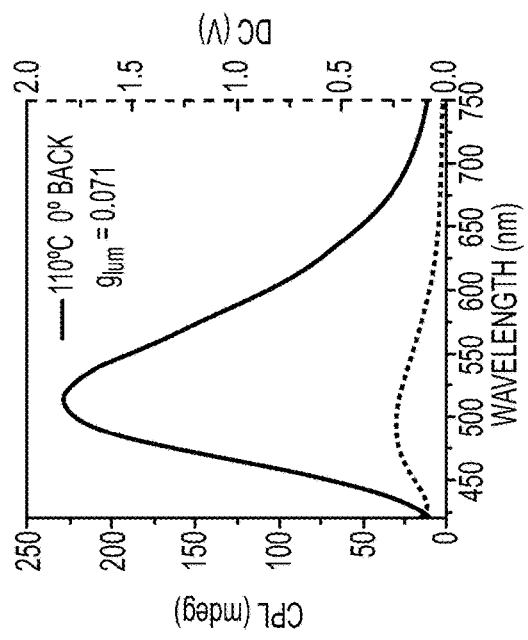
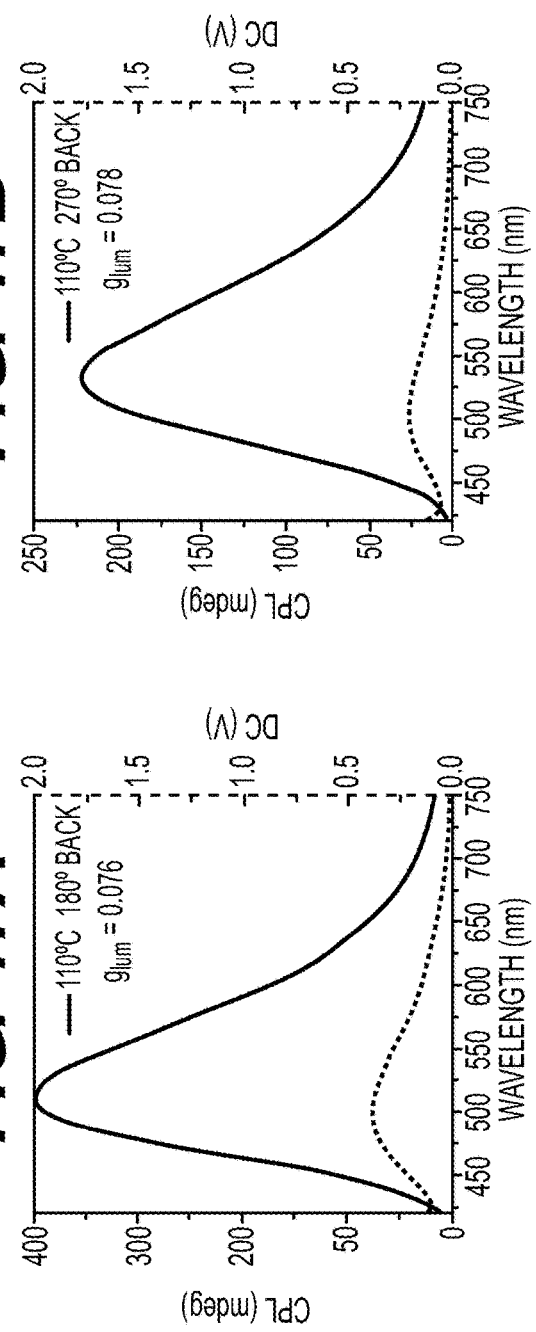
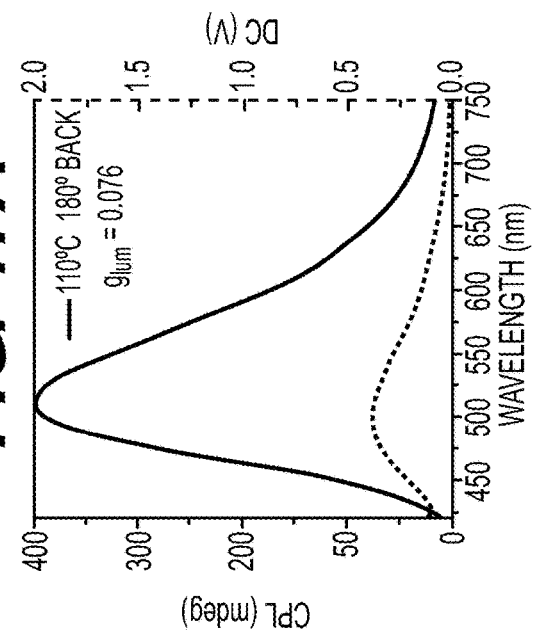
FIG. 47A
FIG. 47B
FIG. 47C
FIG. 47D

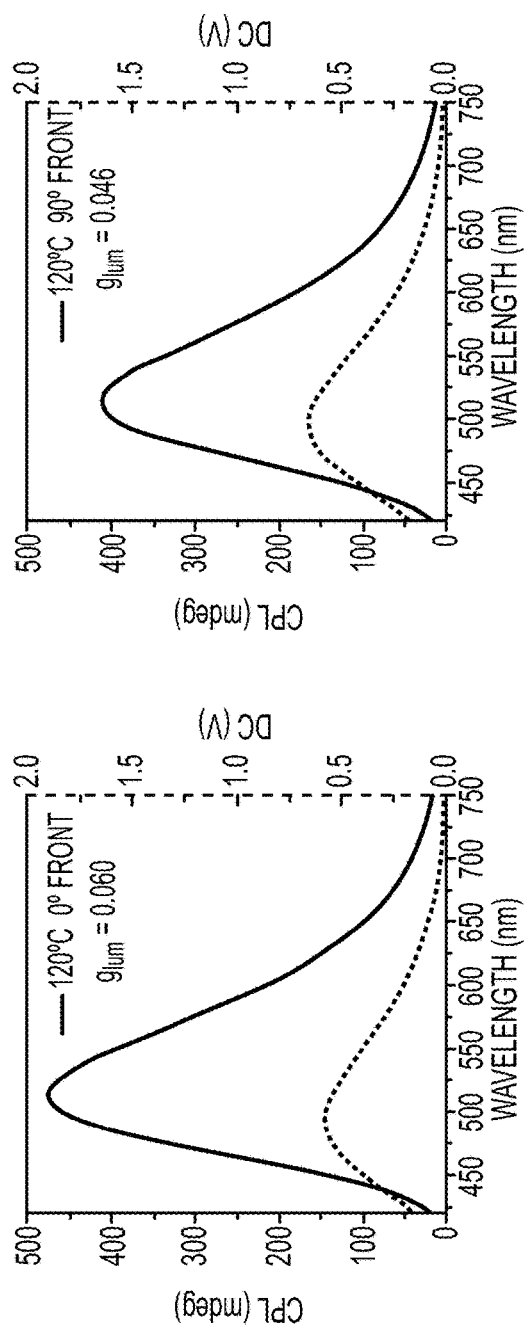
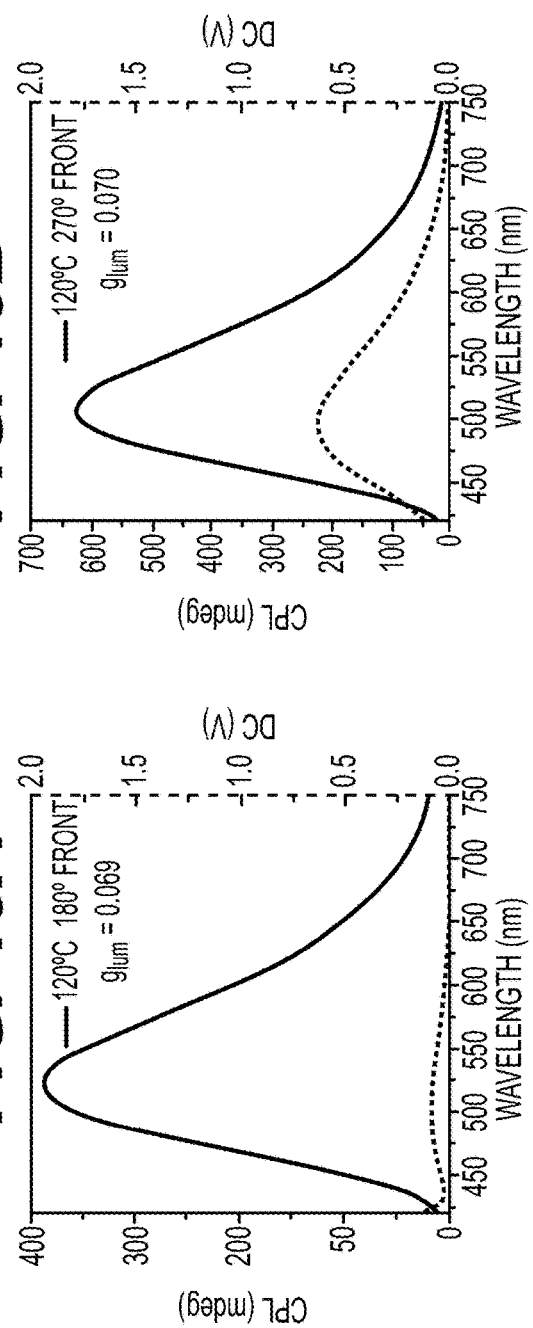

COMPOUNDS WITH CIRCULARLY POLARIZED LUMINESCENCE

CROSS-REFERENCE

The present application claims priority to provisional U.S. Patent Application No. 62/917,021, filed Nov. 16, 2018, which was filed by the inventors hereof and is incorporated herein by reference in its entirety.

FIELD

The present subject matter relates generally to a fluorescent compound with aggregation-induced emission characteristics, and particularly, to a fluorescent compound that exhibits circularly polarized luminescence in the aggregate state.

BACKGROUND

Development of organic systems having circularly polarized luminescence (CPL) has gained increasing importance in various fields, including stereoscopic optical information storage and processing, optical recognition sensor, quantum computing, and circularly polarized electroluminescence for 3D displays. The CPL response of a molecular system is quantified by the dissymmetry factor ($g_{lum}$). Herein, $g_{lum}=2(I_L-I_R)/(I_L+I_R)$, where $I_L$ and $I_R$ denote the emission intensities of left and right circularly polarized luminescence, respectively.

The general strategy for achieving CPL has been to build molecules with a specific chiral configuration that are characterized by fluorescent, delayed fluorescent, or phosphorescent optical properties. However, the CPL property of artifical advanced materials not only depends on molecular functions, but also relies on macroscopic properties of molecular assemblies via hierarchical structures.

Hierarchical self-assembly is ubiquitous in nature and is one of the most sophisticated bottom-up approaches used by living organisms to construct desirable architectures using molecular building blocks. Compared with nonhierarchical self-assembled systems, systems with structural integrity originating from hierarchical self-assemblies are far superior. They exhibit higher stability against environmental changes (e.g. pH, temperature, and pressure) and much greater strength against external stimuli (e.g. mechanical, electric, or magnetic force). Because of these advantages, the strategy of hierarchical self-assembly has been widely used to accomplish the construction of functional materials at nanoscale and microscale levels for application in various fields ranging from optoelectronic materials to biomedicine.

Through a hierarchical self-assembly approach, nanostructured chiral materials are able to transfer and amplify molecular functions to an amplified CPL property at a specific scale. Therefore, an investigation into the hierarchical structure of molecular assemblies and corresponding CPL properties is an important issue for achieving efficient CPL materials.

Normally, the luminescence normalized dissymmetry factor of organic systems ranges between $10^{-4}$ to $10^{-2}$. In rare cases, extremely high g-values exceeding 0.2 or even up to 1 have been reported for polyfluorene thin films or cholesteric organic systems. In polyfluorene systems, circular polarization is largely determined by the anisotropy of the cholesteric dielectric medium. The $g_{lum}$ value is thickness dependent and a strong CPL effect originates from the selective CP reflection due to the long-range cholesteric ordering (Bragg reflection). The helical axis of this system is perpendicular to the direction of the substrate. In cholesteric films, hierarchical chiral mesoscopic structures were found. A strong CPL response can arise from the sum of two main contributions, including the inherent chiral supramolecular structure and birefringence pattern (Bragg reflection). However, these doped cholesteric systems often suffer the problems of incompatibility and instability. Thus, pursuing a strong chiroptical signal from pure organic compounds remains challenging. Prior studies have reported a $g_{lum}$ of +0.29 in chiral bithiophene-phenylene copolymer film annealed in a chiral nematic state and a high $g_{lum}$ of −0.23 in chiral disubstituted polyacetylene without a chiral dopant.

Recently, chiral molecular assemblies with aggregation-induced emission (AIE) have gained attention. Benefiting from the enhanced emission intensity upon aggregation of AIEgens, these assemblies can generate an efficient CPL response in the solid state, making them useful in high performance CPL-based devices at the macroscopic scale. Although significant progress has been made to access efficient $g_{lum}$ values, it has been difficult to achieve a strategy for controlling mesoscopic structure and the ensuing CPL properties.

Accordingly, AIEgens that exhibit CPL properties in a condensed matter state or solid state are highly desirable.

SUMMARY

The present subject matter relates to a fluorescent compound having aggregation-induced emission (AIE) characteristics. The compound can be a rod-like chiral luminogen bearing a chiral moiety at one end and long aliphatic chains at an opposing end. The compound emits circularly polarized light or luminescence (CPL) in the aggregate state. For example, the compound does not exhibit a chiroptical signal when dispersed in solution, but demonstrates tunable CPL signals in the aggregate state.

In an embodiment, the compound has a backbone structural formula selected from the group consisting of

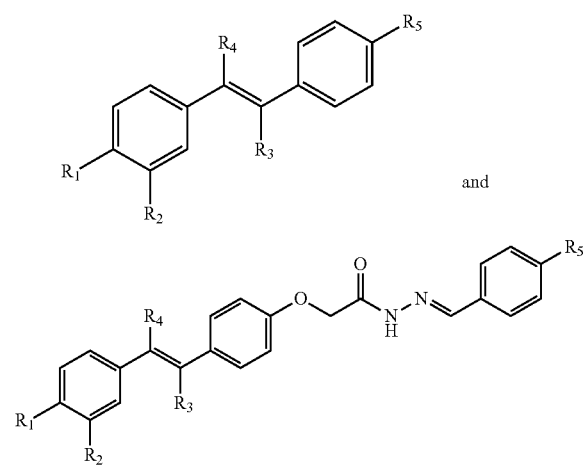

and wherein each of $R_1$ and $R_2$ is independently selected from the group consisting of H, alkyl, alkoxy, and alkanamine;

wherein each of $R_3$ and $R_4$ is independently selected from the group consisting of H,

and an aromatic unit, the aromatic unit being selected from the group consisting of

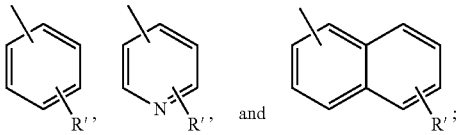

wherein R' is selected from the group consisting of halogen, H, hydroxyl, alkyl, unsaturated alkyl, heteroalkyl, cycloalkyl, heterocycloalkyl, aryl, heteroaryl, a carboxyl containing group, amino, a sulfonyl containing group, thiol, alkylthio, a nitro containing group, nitrone, aldehyde, charged ionic group, and alkoxy;

wherein $R_5$ is a chiral unit, the chiral unit being selected from the group consisting of wherein n is an integer ranging from 0 to 4; and
wherein R" is

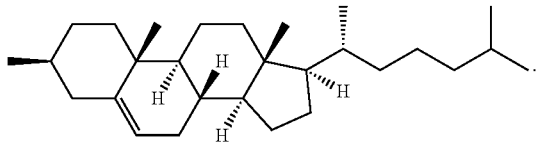

In an embodiment, each of $R_1$ and $R_2$ is independently selected from the group consisting of H, $C_1$-$C_{12}$ alkyl, $OC_1$-$OC_{12}$ alkoxy, $NHC_{1-12}$ alkanamine, and $N(C_{1-12})_2$ alkanamine In an embodiment, R' is a terminal functional group selected from the group consisting of $N_3$, NCS, SH, $NH_2$, COOH, alkyne, N-hydroxysuccinimide ester, maleimide, hydrazide, nitrone group, —CHO, —OH, halide, and a charged ionic group.

An embodiment of the present subject matter relates to a composition capable of providing circularly polarized luminescence. The composition can include the fluorescent compound and at least one peptide conjugated thereto.

In an embodiment the compound is selected from the group consisting of

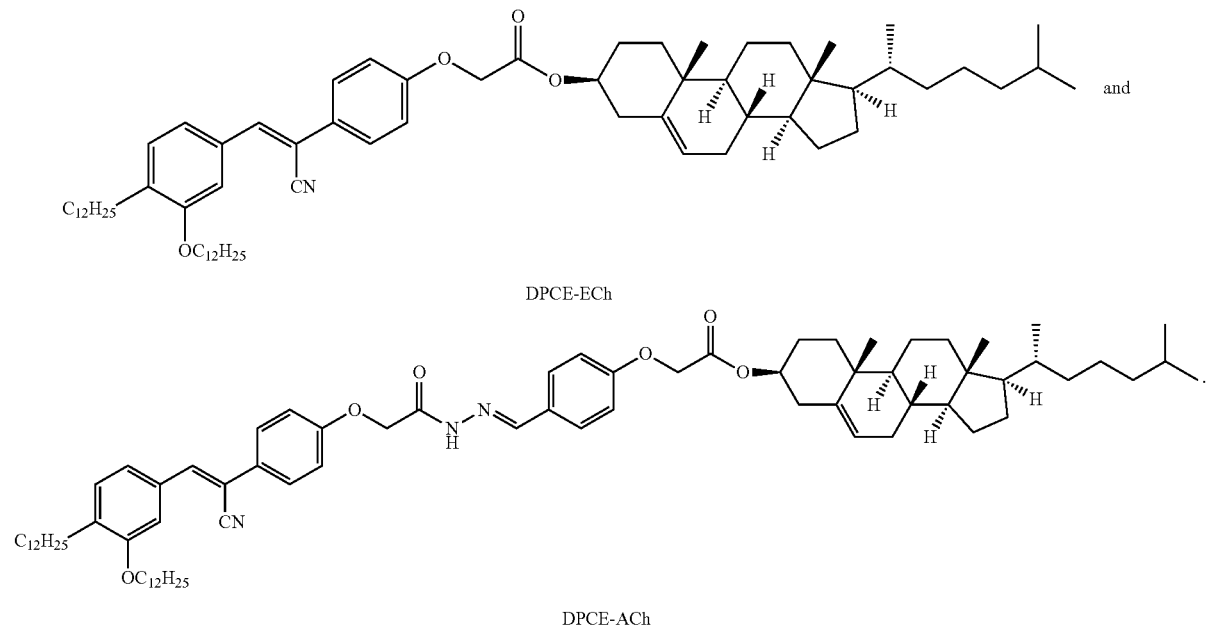

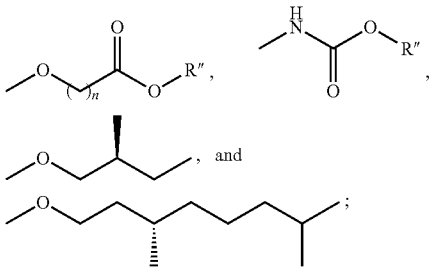

BRIEF DESCRIPTION OF DRAWINGS

Various embodiments will now be described in detail with reference to the accompanying drawings.

FIGS. 3A-3D depict (A) SEM images of DPCE-ACh with M-helical nanofibers obtained from THF/H$_2$O mixture at $f_w$=60% in 500 nm (solution concentration: 1×10$^{-4}$ M); (B) SEM images of DPCE-ACh with M-helical nanofibers obtained from THF/H$_2$O mixture at $f_w$=60% in 200 nm (solution concentration: 1×10$^{-4}$ M); (C) temperature-dependent CD for DPCE-ACh in THF/H$_2$O when $f_w$=60% (solution concentration: 1×10$^{-5}$ M); and (D) and temperature-dependent $g_{abs}$ factor changes for DPCE-ACh in THF/H$_2$O when $f_w$=60% (solution concentration: 1×10$^{-5}$ M).

FIGS. 4A-4F depict (A) top: phase transition of DPCE-ACh recorded during the first cooling scan at a rate of 5° C. min$^{-1}$ (abbreviation: cry=solid crystal; S+H: smectic (S)+hexagonal (H) columnar phase; iso: isotropic liquid bottom: POM texture of DPCE-ACh at 174° C. (B) 1D WAXD pattern of DPCE-ACh recorded during the first cooling process at temperature of 150-210° C. (2θ=2°-10°; inset: low-angle diffractions); (C) reconstructed electron density map of columnar phase generated from FIG. 6C (color scale is shown at the right column); (D) the proposed molecular stacking of hexagonal columns for DPCE-Ach; (E) CD spectra of front and back sides of DPCE-ACh films annealed at 180° C. for 45 min at different rotation angles perpendicular to the light axis (film thickness is 50 nm for CD detection); and (F) $g_{lum}$ (500 nm) of front and back sides of DPCE-ACh films annealed at 180° C. for 45 min at different rotation angles perpendicular to the light axis.

FIGS. 5A-5H depict (A) DSC thermograms of DPCE-ECh recorded at the second heating and first cooling scans (5° C. min$^{-1}$) (inset: phase transition of DPCE-ECh determined from the first cooling DSC scans at a rate 5° C. min$^{-1}$); (B) 1D WAXD pattern of DPCE-ECh recorded at the first cooling process at temperature of 60-90° C. (2θ=2°-6°, inset: high-order diffractions); (C) 2D SAXS; (D) 2D WAXS patterns of the mechanically aligned DPCE-ECh with X-ray beam perpendicular to the shear direction; (E) CD spectra (404 nm) of front and back sides of DPCE-ECh films annealed at 70° C. recorded for 45 min at different rotation angles perpendicular to the light axis (the film thickness is 50 nm for CD detection); (F) $g_{CD}$ of DPCE-ECh at different temperatures (G) $g_{lum}$ (510 nm) of front and back sides of DPCE-ECh films annealed at temperature of 70° C. for 45 min at different rotation angles perpendicular to the light axis (the film thickness is 7 μm for CPL detection; and (H) $g_{lum}$ of DPCE-ECh at different temperatures.

FIGS. 20A-20B depict (A) ID wide angle X-ray diffraction (ID WAXD) pattern of DPCE-ACh on the 1$^{st}$ cooling process in different temperatures (2θ=2°-10°) and (B) ID wide angle X-ray diffraction (ID WAXD) pattern of DPCE-ACh on the 1$^{st}$ cooling process in different temperatures (2θ=2°-3.5)

FIGS. 22A-22D depict polarized optical microscopy (POM) images of DPCE-ACh under crossed polarizers during heating and cooling process (rate=10 C. °/min).

FIG. 32 depicts an illustration of the shearing geometry.

FIGS. 33A-33D depict polarized optical microscopy (POM) images of DPCE-ECh under crossed polarizers during heating (rate 10 C/min).

FIGS. 34A-34D depict polarized optical microscopy (POM) images of DPCE-ECh under crossed polarizers during cooling (rate 10 C/min).

FIGS. 40A-40D depict CPL spectra of DPCE-ECh films annealed at 80° C. for 45 minutes at different rotation angles perpendicular to the light axis (front side).

FIGS. 47A-47D depict CPL spectra of DPCE-ECh films annealed at 110° C. for 45 minutes at different rotation angles perpendicular to the light axis (back side).

FIGS. 48A-48D depict CPL spectra of DPCE-ECh films annealed at 120° C. for 45 minutes at different rotation angles perpendicular to the light axis (front side).

DETAILED DESCRIPTION

Figure 1A:
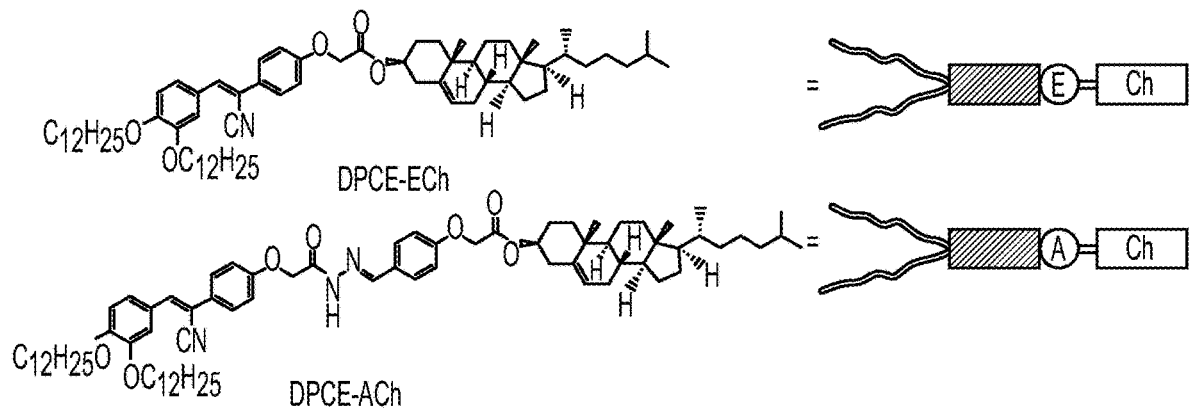
FIGS. 1A-1B depict (A) molecular structures of DPCE-ECh and DPCE-Ach and (B) schematic illustration of chiral supramolecular assemblies in solution and liquid crystalline states and their corresponding $g_{lum}$ values.

The following definitions are provided for the purpose of understanding the present subject matter and for constructing the appended patent claims.

Definitions

It should be understood that the drawings described above or below are for illustration purposes only. The drawings are not necessarily to scale, with emphasis generally being placed upon illustrating the principles of the present teachings. The drawings are not intended to limit the scope of the present teachings in any way.

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition, an apparatus, or a method described herein can be combined in a variety of ways without departing from the spirit and scope of the present teachings, whether explicit or implicit herein The use of the terms "include," "includes", "including," "have," "has," or "having" should be generally understood as open-ended and non-limiting unless specifically stated otherwise.

The use of the singular herein includes the plural (and vice versa) unless specifically stated otherwise.

It should be understood that the order of steps or order for performing certain actions is immaterial so long as the present teachings remain operable. Moreover, two or more steps or actions may be conducted simultaneously.

The term "$\lambda_{ex}$" as used herein refers to excitation wavelength.

The phrase "aggregation caused quenching" or "ACQ" as used herein refers to the phenomenon wherein the aggregation of π-conjugated fluorophores significantly decreases the fluorescence intensity of the fluorophores. The aggregate formation is said to "quench" light emission of the fluorophores.

The phrase "aggregation induced emission" or "AIE" as used herein refers to the phenomenon manifested by compounds exhibiting significant enhancement of light-emission upon aggregation in the amorphous or crystalline (solid) states whereas they exhibit weak or almost no emission in dilute solutions.

"Emission intensity" as used herein refers to the magnitude of fluorescence/phosphorescence normally obtained from a fluorescence spectrometer or fluorescence microscopy measurement; "fluorophore" or "fluorogen" as used herein refers to a molecule which exhibits fluorescence; "luminogen" or "luminophore" as used herein refers to a molecule which exhibits luminescence; and "AIEgen" as used herein refers to a molecule exhibiting AIE characteristics.

As used herein, "halo" or "halogen" refers to fluoro, chloro, bromo, and iodo.

As used herein, "alkyl" refers to a straight-chain or branched saturated hydrocarbon group. Examples of alkyl groups include methyl (Me), ethyl (Et), propyl (e.g., n-propyl and z'-propyl), butyl (e.g., n-butyl, z'-butyl, sec-butyl, tert-butyl), pentyl groups (e.g., n-pentyl, z'-pentyl, -pentyl), hexyl groups, and the like. In various embodiments, an alkyl group can have 1 to 40 carbon atoms (i.e., C1-40 alkyl group), for example, 1-30 carbon atoms (i.e., C1-30 alkyl group). In some embodiments, an alkyl group can have 1 to 6 carbon atoms, and can be referred to as a "lower alkyl group". Examples of lower alkyl groups include methyl, ethyl, propyl (e.g., n-propyl and z'-propyl), and butyl groups (e.g., n-butyl, z'-butyl, sec-butyl, tert-butyl). In some embodiments, alkyl groups can be substituted as described herein. An alkyl group is generally not substituted with another alkyl group, an alkenyl group, or an alkynyl group.

As used herein, "alkenyl" refers to a straight-chain or branched alkyl group having one or more carbon-carbon double bonds. Examples of alkenyl groups include ethenyl, propenyl, butenyl, pentenyl, hexenyl, butadienyl, pentadienyl, hexadienyl groups, and the like. The one or more carbon-carbon double bonds can be internal (such as in 2-butene) or terminal (such as in 1-butene). In various embodiments, an alkenyl group can have 2 to 40 carbon atoms (i.e., C2-40 alkenyl group), for example, 2 to 20 carbon atoms (i.e., C2-20 alkenyl group). In some embodiments, alkenyl groups can be substituted as described herein. An alkenyl group is generally not substituted with another alkenyl group, an alkyl group, or an alkynyl group.

As used herein, "unsaturated alkyl" refers to an alkyl group, as defined herein, including at least one double or triple bond.

As used herein, "heteroatom" refers to an atom of any element other than carbon or hydrogen and includes, for example, nitrogen, oxygen, silicon, sulfur, phosphorus, and selenium.

As used herein, "heteroalkyl" refers to an alkyl group, as defined herein, in which one or more of the constituent carbon atoms have been replaced by a heteroatom, as defined herein.

As used herein, "cycloalkyl" refers to a saturated, non-aromatic, monovalent mono- or polycarbocyclic radical of three to ten, preferably three to six carbon atoms.

As used herein, "heterocycloalkyl" refers to a cycloalkyl, as defined herein, in which one or more of the constituent carbon atoms have been replaced by a heteroatom, as defined herein.

As used herein, "aryl" refers to an aromatic monocyclic hydrocarbon ring system or a polycyclic ring system in which two or more aromatic hydrocarbon rings are fused (i.e., having a bond in common with) together or at least one aromatic monocyclic hydrocarbon ring is fused to one or more cycloalkyl and/or cycloheteroalkyl rings. An aryl group can have 6 to 24 carbon atoms in its ring system (e.g., C6-24 aryl group), which can include multiple fused rings. In some embodiments, a polycyclic aryl group can have 8 to 24 carbon atoms. Any suitable ring position of the aryl group can be covalently linked to the defined chemical structure. Examples of aryl groups having only aromatic carbocyclic ring(s) include phenyl, 1-naphthyl (bicyclic), 2-naphthyl (bicyclic), anthracenyl (tricyclic), phenanthrenyl (tricyclic), pentacenyl (pentacyclic), and like groups. Examples of polycyclic ring systems in which at least one aromatic carbocyclic ring is fused to one or more cycloalkyl and/or cycloheteroalkyl rings include, among others, benzo derivatives of cyclopentane (i.e., an indanyl group, which is a 5,6-bicyclic cycloalkyl/aromatic ring system), cyclohexane (i.e., a tetrahydronaphthyl group, which is a 6,6-bicyclic cycloalkyl/aromatic ring system), imidazoline (i.e., a benzimidazolinyl group, which is a 5,6-bicyclic cycloheteroalkyl/aromatic ring system), and pyran (i.e., a chromenyl group, which is a 6,6-bicyclic cycloheteroalkyl/aromatic ring system). Other examples of aryl groups include benzodioxanyl, benzodioxolyl, chromanyl, indolinyl groups, and the like. In some embodiments, aryl groups can be substituted as described herein. In some embodiments, an aryl group can have one or more halogen substituents, and can be referred to as a "haloaryl" group. Perhaloaryl groups, i.e., aryl groups where all of the hydrogen atoms are replaced with halogen atoms (e.g., —$C_6F_5$), are included within the definition of "haloaryl". In certain embodiments, an aryl group is substituted with another aryl group and can be referred to as a biaryl group. Each of the aryl groups in the biaryl group can be substituted as disclosed herein.

As used herein, "heteroaryl" refers to an aromatic monocyclic ring system containing at least one ring heteroatom selected from oxygen (O), nitrogen (N), sulfur (S), silicon (Si), and selenium (Se) or a polycyclic ring system where at least one of the rings present in the ring system is aromatic and contains at least one ring heteroatom. Polycyclic heteroaryl groups include those having two or more heteroaryl rings fused together, as well as those having at least one monocyclic heteroaryl ring fused to one or more aromatic carbocyclic rings, non-aromatic carbocyclic rings, and/or non-aromatic cycloheteroalkyl rings. A heteroaryl group, as a whole, can have, for example, 5 to 24 ring atoms and contain 1-5 ring heteroatoms (i.e., 5-20 membered heteroaryl group). The heteroaryl group can be attached to the defined chemical structure at any heteroatom or carbon atom that results in a stable structure. Generally, heteroaryl rings do not contain O—O, S—S, or S-0 bonds. However, one or more N or S atoms in a heteroaryl group can be oxidized (e.g., pyridine Noxide thiophene S-oxide, thiophene S,S-dioxide). Examples of heteroaryl groups include, for example, the 5- or 6-membered monocyclic and 5-6 bicyclic ring systems shown below:

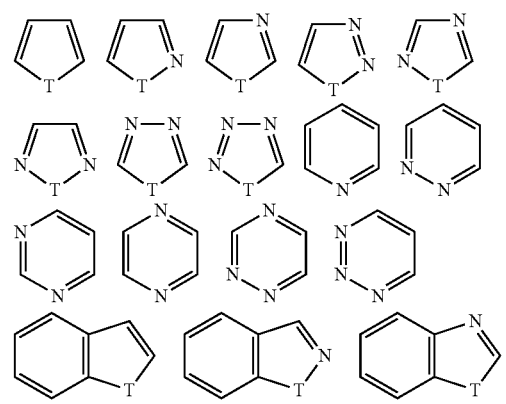

-continued

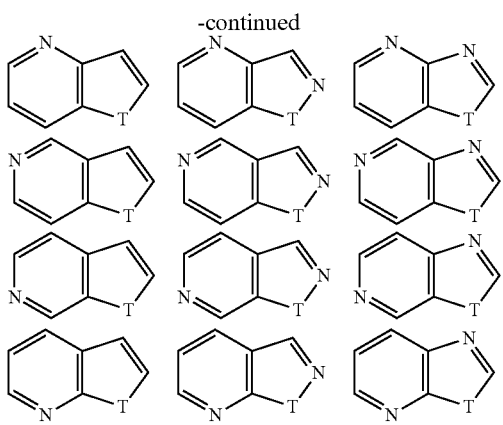

where T is O, S, NH, N-alkyl, N-aryl, N-(arylalkyl) (e.g., N-benzyl), SiH2, SiH(alkyl), Si(alkyl)2, SiH(arylalkyl), Si(arylalkyl)2, or Si(alkyl)(arylalkyl). Examples of such heteroaryl rings include pyrrolyl, furyl, thienyl, pyridyl, pyrimidyl, pyridazinyl, pyrazinyl, triazolyl, tetrazolyl, pyrazolyl, imidazolyl, isothiazolyl, thiazolyl, thiadiazolyl, isoxazolyl, oxazolyl, oxadiazolyl, indolyl, isoindolyl, benzofuryl, benzothienyl, quinolyl, 2-methylquinolyl, isoquinolyl, quinoxalyl, quinazolyl, benzotriazolyl, benzimidazolyl, benzothiazolyl, benzisothiazolyl, benzisoxazolyl, benzoxadiazolyl, benzoxazolyl, cinnolinyl, 1H-indazolyl, 2H-indazolyl, indolizinyl, isobenzofuyl, naphthyridinyl, phthalazinyl, pteridinyl, purinyl, oxazolopyridinyl, thiazolopyridinyl, imidazopyridinyl, furopyridinyl, thienopyridinyl, pyridopyrimidinyl, pyridopyrazinyl, pyridopyridazinyl, thienothiazolyl, thienoxazolyl, thienoimidazolyl groups, and the like. Further examples of heteroaryl groups include 4,5,6,7-tetrahydroindolyl, tetrahydroquinolinyl, benzothienopyridinyl, benzofuropyridinyl groups, and the like. In some embodiments, heteroaryl groups can be substituted as described herein.

As used herein, a "donor" material refers to an organic material, for example, an organic nanoparticle material, having holes as the majority current or charge carriers.

As used herein, an "acceptor" material refers to an organic material, for example, an organic nanoparticle material, having electrons as the majority current or charge carriers.

As used herein, a "carboxyl containing group" refers to a compound including one or more carboxyl (RCOOR) functional groups.

As used herein, a "nitro containing group" refers to a compound including one or more nitro ($NO_2$) functional groups.

As used herein, a "sulfonyl containing group" refers to a compound including one or more sulfonyl ($RSO_2R'$) functional groups.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

Fluorescent Compounds

The present subject matter relates to a fluorescent compound having aggregation-induced emission (AIE) characteristics. The compound can be a chiral luminogen, bearing a chiral moiety at one end. In an embodiment, the compound includes a rigid core including an ester, amide, or ether linkage with a cholesterol moiety at one end. The compound emits circularly polarized light (CPL) in the aggregate state. For example, the compound does not exhibit a chiroptical signal when dispersed in solution, but demonstrates tunable CPL signals in the aggregate state. In an embodiment, the compound can take the form of a circularly polarized organic light-emitting crystal. The compound can be a chiral dye.

An embodiment of the present subject matter relates to a composition capable of providing circularly polarized luminescence. The composition can include the fluorescent compound and at least one peptide conjugated thereto.

In an embodiment, the fluorescent compound comprises a backbone structural formula selected from the group consisting of

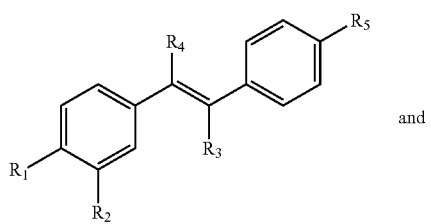

and

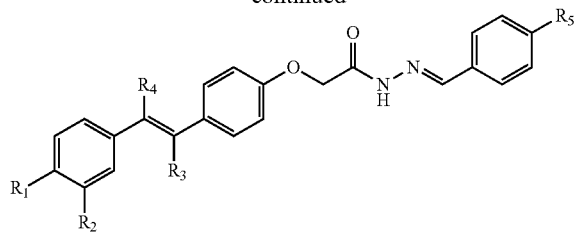

wherein each of $R_1$ and $R_2$ is independently selected from the group consisting of H, alkyl, alkoxy, and alkanamine;

wherein each of $R_3$ and $R_4$ is independently selected from the group consisting of H,

and an aromatic unit, the aromatic unit being selected from the group consisting of

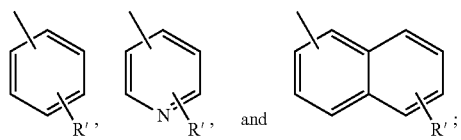

wherein R' is selected from the group consisting of halogen, H, hydroxyl, alkyl, unsaturated alkyl, heteroalkyl, cycloalkyl, heterocycloalkyl, aryl, heteroaryl, a carboxyl containing group, amino, a sulfonyl containing group, thiol, alkylthio, a nitro containing group, nitrone, aldehyde, charged ionic group, and alkoxy;

wherein $R_5$ is a chiral unit, the chiral unit being selected from the group consisting of

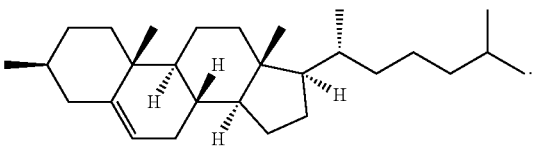

wherein n is an integer ranging from 0 to 4; and wherein R" is

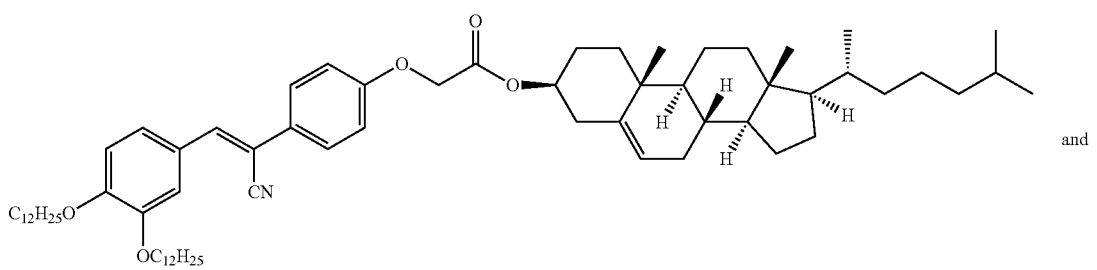

In an embodiment, each of $R_1$ and $R_2$ is independently selected from the group consisting of H, $C_1$-$C_{12}$ alkyl, $OC_1$-$OC_{12}$ alkoxy, $NHC_{1-12}$ alkanamine, and $N(C_{1-12})_2$ alkanamine In an embodiment, R' is a terminal functional group selected from the group consisting of $N_3$, NCS, SH, $NH_2$, COOH, alkyne, N-hydroxysuccinimide ester, maleimide, hydrazide, nitrone group, —CHO, —OH, halide, and a charged ionic group.

In an embodiment the compound is selected from the group consisting of

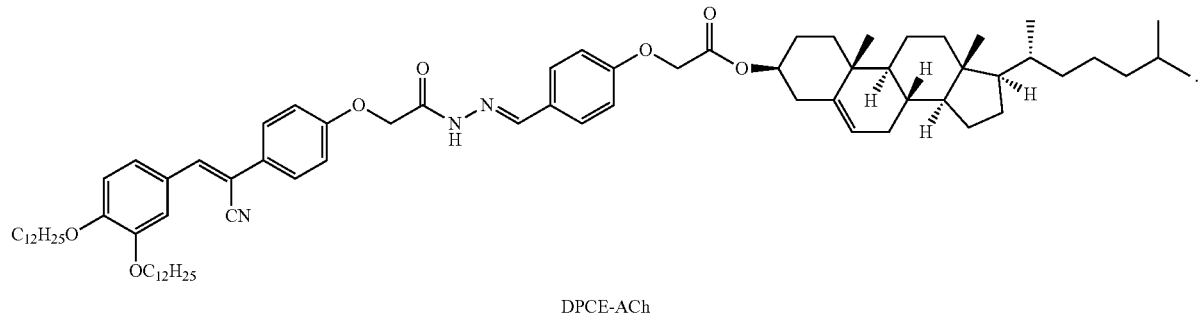

Chiral Liquid Crystalline Phase

The compound can form a liquid-crystalline phase in a chiral fashion. In the solid state, for example, DPCE-ECh self-assembles into supramolecular liquid-crystalline smectic C* (SC*) phase and shows an impressive high positive CPL response with a $g_{lum}$ of +0.380±0.011 and $g_{CD}$ of −0.20. An intense CD and CPL of the film stems from the intrinsic helical structure of the molecular assemblies with a small contribution of Bragg reflection, where the helical axis is parallel to the direction of the glass substrate. This large $g_{lum}$ factor is very rare for organic compounds even in the assembled state and is formed by annealing at smectic liquid crystalline temperature. On the other hand, DPCE-ACh can form two coexistent phases of hexagonal and smectic liquid-crystalline phases with a weak negative CPL response. The $g_{lum}$ falls in the range of $-0.61 \times 10^{-3}$ to $-5.96 \times 10^{-3}$. Such non-periodic molecular orientations give a weak CPL signal in the order of $10^{-3}$. The large different $|g_{lum}|$ is attributed to the amplified artifact induced by the birefringent domains of the thick film.

The present teachings are illustrated by the following examples.

EXAMPLES

Materials and Methods

All chemicals were purchased from Sigma-Aldrich, J&K Chemical Co. and used as received without further purification unless otherwise specified. Anhydrous THF and $CH_3CN$ were used for fluorescence property investigation. Deionized water was used throughout this study. Pre-coated glass plates were used for TLC analysis. Column chromatography was carried out by using silica gel (200-300 mesh) as adsorbent.

$^1H$ and $^{13}C$ NMR spectra were measured on a Bruker ARX 400 NMR spectrometer and reported as parts per million (ppm) from the internal standard TMS. High-resolution mass spectra (HR-MS) were obtained on a Finnigan MAT TSQ 7000 Mass Spectrometer System operated in a MALDI-TOF mode. Thermogravimetric analysis (TGA) was performed on a TA TGA Q5000 under nitrogen at a heating rate of $10°C \cdot min^{-1}$. Differential scanning calorimetry (DSC) analysis was performed on a TA Instruments DSC Q1000 at a heating rate of $5°C \cdot min^{-1}$. A sample size of about 2 mg was encapsulated in hermetically sealed aluminum pans. The pan weights were kept constant. The temperature and heat flow were calibrated using standard materials such as indium and benzoic acid. Polarized optical microscopy (POM) was carried out to observe the liquid crystalline textures of the samples on a Leitz Laborlux 12 microscope with a Leitz 350 hot stage.

The morphological structures of the aggregates were investigated by a HITACHI-SU8010 scanning electron microscope (SEM) at accelerating voltages of 200 and 5 kV. Stock solutions of DPCE-ECh and DPCE-ACh in THF ($10^{-3}$ mol $L^{-1}$) were prepared. A certain volume (30 μL) of such stock solutions was transferred to small glass vials (5 mL). After addition of appropriate amounts of THF, distilled water was added dropwise under vigorous stirring to afford $5 \times 10^{-5}$ mol $L^{-1}$ of DPCE-ECh and DPCE-ACh solutions. The mixtures were dropped on silicon wafers. The solvents were removed under reduced pressure at room temperature, and the SEM images of the aggregates on silicon wafers were taken.

To identify the liquid crystalline structure of DPCE-ECh and DPCE-ACh, 1D XRD experiments were performed on a Philips X'Pert Pro diffractometer equipped with a 3 kW ceramic tube as the X-ray source (Cu Kα), an X'celerator detector, and a temperature control unit of Paar Physica TCU 100. The sample stage was set horizontally. The diffraction peak positions of the 1D XRD were calibrated with silicon powder for a wide-angle region and silver behenate for a small-angle region, respectively. The data was collected by a Mar165 detector and calibrated by $CeO_2$ powder. The sample temperature was controlled by a Linkman THMSE600 hot stage. The heating and cooling rates in the experiments were $5°C./min$. The data were collected using an exposure time of 120 s. The 2D SAXS and WAXS data of DPCE-ECh were collected on Xeuss 2.0 (Xenocs, France), and the measurement details are listed in Table 1 below.

TABLE 1

The measurement conditions of WAXS and SAXS

|  | WAXS | SAXS |
| --- | --- | --- |
| SDD | 225.831 nm | 1219.49 mm |
| Beam Size | 0.8 × 0.8 $mm^2$ | 0.8 × 0.8 $mm^2$ |
| Beam Center | 623.176, 923.1842 | 620.132, 918.9432 |
| Pixel Size | 0.172 × 0.172 $mm^2$ | 0.172 × 0.172 $mm^2$ |
| Wavelength | 0.134144 nm | 0.134144 nm |
| Virtual Detector Mode | 4 images combined | 4 images combined |
| Exposure Time | 1800 s × 4 | 1800 s × 4 |

Absorption spectra were measured on a Milton Roy Spectronic 3000 Array spectrophotometer. Steady-state photoluminescence (PL) spectra were measured on a Perkin-Elmer spectrofluorometer LS 55. The lifetime and the absolute luminescence quantum yield were measured on an Edinburgh FLSP 920 fluorescence spectrophotometer equipped with an integrating sphere (0.1 nm step size, 0.3 second integration time, 5 repeats).

Absorption spectra were measured on a Milton Roy Spectronic 3000 Array spectrophotometer. Steady-state photoluminescence (PL) spectra were measured on a Perkin-Elmer spectrofluorometer LS 55. The lifetime and the absolute luminescence quantum yield were measured on an Edinburgh FLSP 920 fluorescence spectrophotometer equipped with an integrating sphere (0.1 nm step size, 0.3 second integration time, 5 repeats).

Circular dichroism (CD) spectra were recorded with a Chirascan spectrometer (Applied Photophysics, England). Circularly polarized photoluminescence (CPPL) spectra of the films and solution were recorded at 50 nm $min^{-1}$ scan speed with a commercialized instrument JASCO CPL-300 at room temperature with the resolution of 15 nm. The film samples for CD and CPL measurement were prepared by drop-casting on the quartz substrate from the $CHCl_3$ solution (5 mg/mL) of DPCE-ECh and DPCE-ACh, and subsequently, by volatilization of $CHCl_3$ solvent at room temperature. Samples were subsequently thermally annealed for 45 min at the indicated temperatures. Preparation took place under inert atmosphere in a nitrogen filled glove box. To freeze temporarily the phase of the DPCE-ECh and DPCE-ACh, the film sample was quenched from the indicated temperatures with liquid nitrogen. The CD and CPL response of the quenched sample was recorded over the same time interval (per 3 min) at room temperature.

The magnitude of circular polarisation in the excited state is defined as $g_{lum}=2(I_L-I_R)/(I_L+I_R)$, where $I_L$ and $I_R$ indicate the output signals for left and right circularly polarized light, respectively. Experimentally, the value of glum is defined as $\Delta I/I=[ellipticity/(32980/ln10)]/(unpolarized$ PL intensity) at the CPL extremum.

Example 1

Synthesis

DPCE-ECh and DPCE-ACh were prepared using the following synthetic route:

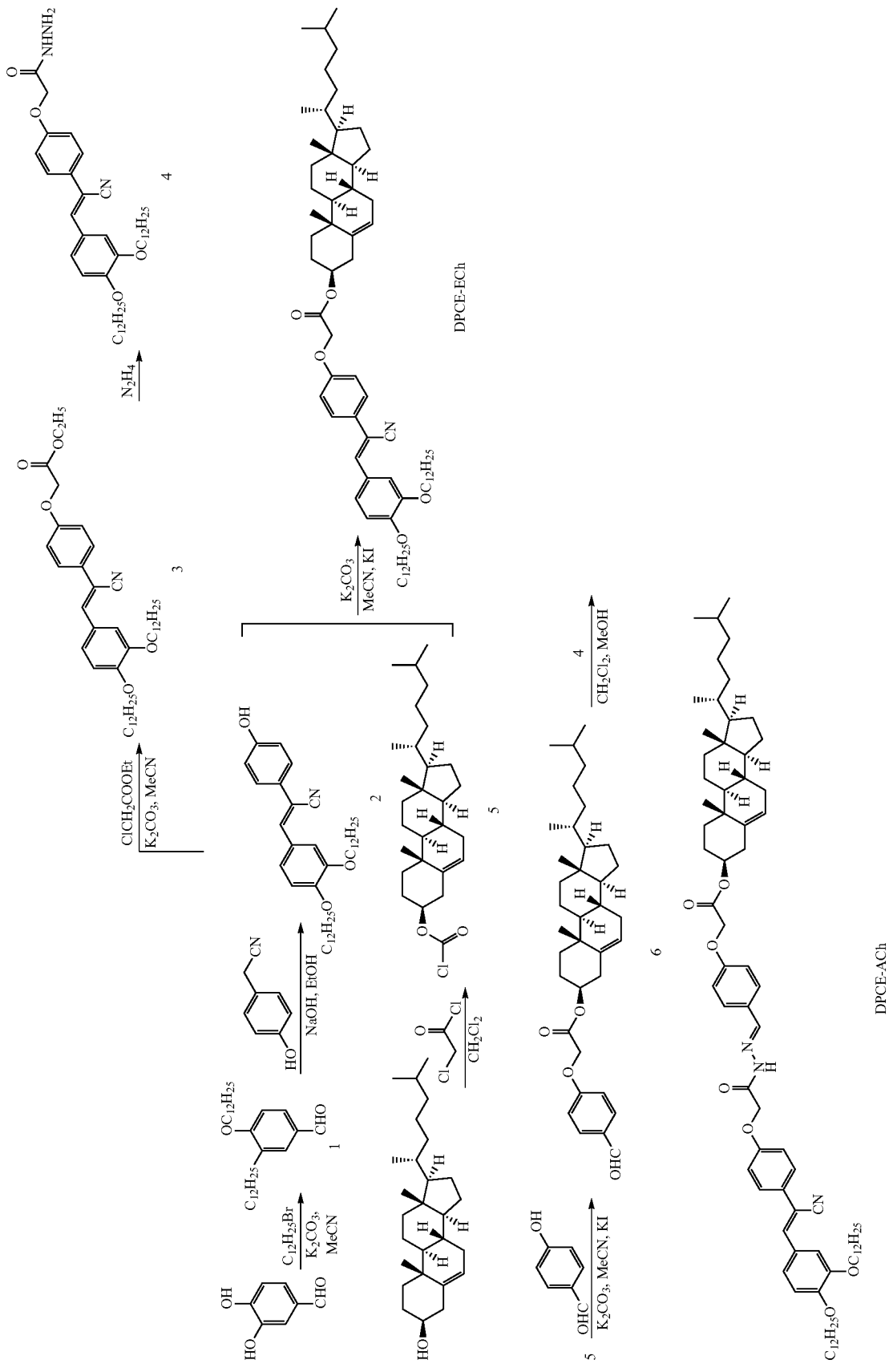

Figure 1B:
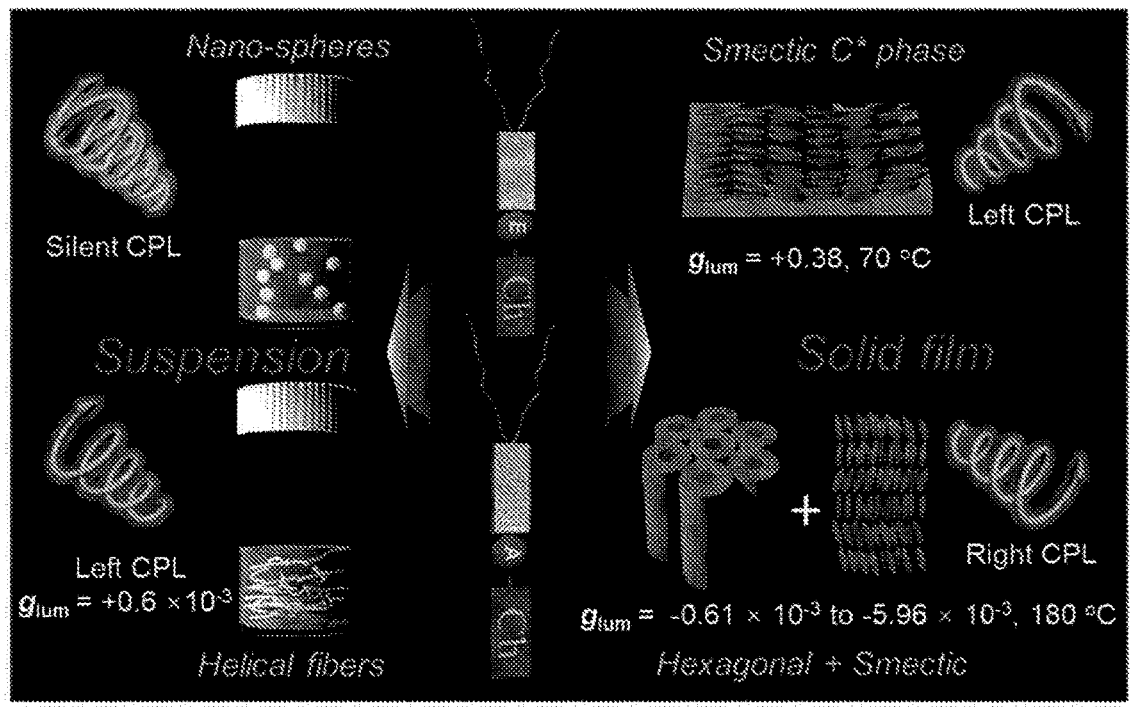

FIG. 1A depicts molecular structures of DPCE-ECh and DPCE-Ach. FIG. 1B depicts a schematic illustration of the chiral supramolecular assemblies in solution and liquid crystalline states and their corresponding $g_{lum}$ values. The structures of DPCE-ECh and DPCE-ACh were confirmed by NMR, high resolution mass spectrum (FIGS. 6-11).

Synthesis of 3-(3,4-bis(dodecyloxy)phenyl)-2-(4-hydroxyphenyl)acrylonitrile (Compound 2)

A mixture of 4-hydroxyphenylacetonitrile (1.62 g, 12.0 mmol), compound 1 (5.7 g, 12.0 mmol) and NaOH (0.96 g, 24.0 mmol) in 60 mL of EtOH and 30 mL THF mixture solution was refluxed for 24 h. After cooling to room temperature, 24 mL of HCl solution (1 M) was poured into the reaction mixture, then the solvent of $C_2H_5OH$ was removed by a rotary evaporator and water (60 mL) was added. The mixture was extracted with ethyl acetate (3×50 mL). The combined organic layers were dried with anhydrous $Na_2SO_4$ and evaporated under reduced pressure to obtain the crude product. The residue was purified by silica-gel column chromatography using hexane/ethyl acetate (15:1) as an eluent. Compound 2 was obtained as a light brown powder with 35% yield. (2.48 g, 4.2 mmol). $^1$H NMR (400 MHz, CDCl$_3$) δ (ppm): 7.62 (s, 1H), 7.52 (d, J=8.4 Hz, 2H), 7.34-7.31 (m, 2H), 6.94-6.90 (m, 3H), 4.63 (s, 1H), 4.10-4.04 (m, 4H), 1.86-1.79 (m, 4H), 1.58-1.43 (m, 4H), 1.34-1.27 (m, 32H), 0.89 (t, J=6.0 Hz, 6H); $^{13}$C NMR (100 MHz, CDCl$_3$) δ (ppm): 155.93, 150.37, 148.67, 139.77, 126.62, 126.19, 123.17, 119.09, 118.21, 115.32, 112.38, 112.19, 107.38, 68.65, 68.48, 64.81, 31.32, 29.093, 29.059, 29.028, 28.827, 28.795, 28.769, 28.552, 28.481, 25.435, 22.092, 13.52. MALDI-TOF-MS ($C_{39}H_{59}NO_3$) Calcd. for m/z=589.9050, found: m/z=589.4465 (M+H$^+$).

Preparation of ethyl-2-(4-(2-(3,4-bis(dodecyloxy)phenyl)-1-cyanovinyl)phenoxy)acetate (Compound 3)

A mixture of compound 2 (2.09 g, 3.55 mmol), excess ethyl choroacetate (0.80 mL, 7.10 mmol), and $K_2CO_3$ (2.45 g, 17.75 mmol) was stirred and refluxed in 60 mL MeCN and 30 mL THF for 12 h at 90° C. After cooling to room temperature, the solvent was removed by a rotary evaporator and then water (60 mL) was added. The mixture was extracted with $CH_2Cl_2$ (3×40 mL). The combined organic layers were dried with anhydrous $Na_2SO_4$ and evaporated under reduced pressure to obtain the crude product. The residue was purified by silica-gel column chromatography (hexane/ethyl acetate=20:1) to yield 2.01 g (84%) of the product as a yellow powder after removal of the solvent. $^1$H NMR (400 MHz, CDCl$_3$) δ (ppm): 7.63 (s, 1H), 7.59 (d, J=9.2 Hz, 2H), 7.34-7.32 (m, 2H), 6.97 (d, J=8.8 Hz, 2H), 6.91 (d, J=8.4 Hz, 1H), 4.67 (s, 2H), 4.30 (q, J=6.8 Hz, 2H), 4.10-4.05 (m, 4H), 1.89-1.82 (m, 4H), 1.59-1.45 (m, 4H), 1.39-1.27 (m, 35H), 0.89 (t, J=6.0 Hz, 6H); $^{13}$C NMR (100 MHz, CDCl$_3$) δ (ppm): 167.96, 157.57, 150.53, 148.35, 140.30, 127.93, 126.53, 126.05, 123.28, 118.10, 114.46, 112.37, 112.15, 107.08, 68.63, 68.44, 64.78, 60.91, 31.32, 29.08, 29.057, 29.012, 28.822, 28.789, 28.767, 28.554, 28.487, 25.436, 25.378, 22.089, 13.564, 13.517. MALDI-TOF-MS ($C_{43}H_{65}NO_5$) Calcd. for m/z=675.9950, found: m/z=675.4874 (M$^+$).

Preparation of 2-(4-(2-(3,4-bis(dodecyloxy)phenyl)-1-cyanovinyl)phenoxy)acetohydrazide (Compound 4)

A mixture of excess $NH_2NH_2$ (0.49 mL, 10.0 mmol) and compound 3 (0.66 g, 1.0 mmol) in 40 mL of EtOH solution was stirred for 10 h at room temperature. The reaction was examined by TLC technique, which suggested the disappearance of the starting materials. After reaction, the precipitate was formed and filtered. The obtained precipitate was purified by recrystallization. After dryness, compound 4 was collected as a dark yellow solid with a yield of 77%. $^1$H NMR (400 MHz, CDCl$_3$) δ (ppm): 7.77 (s, 1H, NH), 7.64-7.60 (m, 3H), 7.33-7.32 (m, 2H), 6.97 (d, J=8.8 Hz, 2H), 6.91 (d, J=8.8 Hz, 1H), 4.62 (s, 2H), 4.06 (t, J=8.2 Hz, 4H), 3.97 (br, 2H, NH$_2$), 1.87-1.84 (m, 4H), 1.50-1.27 (m, 36), 0.89 (t, J=6.4 Hz, 6H). $^{13}$C NMR (100 MHz, CDCl$_3$) δ (ppm): 167.5, 156.7, 150.7, 148.4, 140.7, 128.6, 126.7, 125.9, 123.4, 118.0, 114.4, 112.4, 112.2, 106.7, 68.7, 68.4, 66.4, 31.31, 29.08, 29.05, 29.01, 28.81, 28.78, 28.75, 28.56, 28.49, 25.43, 25.37, 22.07, 13.50. MALDI-TOF-MS: ($C_{41}H_{63}N_3O_4$) Calcd. for m/z=662.0, found: m/z=662.3 (M), m/z=685.2 (M+Na$^+$), m/z=701.3 (M+K$^+$).

Preparation of DPCE-ECh (Scheme 1)

Under $N_2$ atmosphere, a mixture of compound 2 (0.3 g, 0.5 mmol), compound 5 (0.23 mL, 0.5 mmol), and $K_2CO_3$ (0.28 g, 2.0 mmol) was stirred and refluxed in 30 mL of dry MeCN for 24 h at 90° C. The reaction was monitored by TLC technique, implying the disappearance of reactants. After reaction, the mixture was treated with 40 mL of HCl (1 M) and extracted with 50 mL of CHCl$_3$. The CHCl$_3$ layer was partitioned, washed by 20×3 mL of distilled water, dried over anhydrous MgSO$_4$, and then concentrated. The crude product was purified by recrystallization in CH$_2$Cl$_2$/MeOH (1:5, v/v). After dryness, compound 6 was collected as a dark yellow solid with a yield of 90%. $^1$H NMR (400 MHz, CDCl$_3$) δ (ppm): 7.64 (s, 1H), 7.60 (d, J=8.0 Hz, 2H), 7.35 (m, 2H), 6.97 (d, J=8.0 Hz, 2H), 6.92 (d, J=8.0 Hz, 1H), 5.40 (br, 1H), 4.77 (br, 1H), 4.65 (s, 2H), 4.04-4.11 (m, 4H), 0.69~2.41 (m, 89H); $^{13}$C NMR (100 MHz, CDCl$_3$) δ (ppm): 168.01, 158.28, 151.12, 149.02, 140.84, 139.19, 130.46, 128.44, 126.95, 126.72, 124.01, 123.12, 118.57, 115.01, 112.85, 107.64, 75.41, 69.72, 69.09, 65.58, 56.61, 56.15, 50.01, 39.53, 36.20, 31.85, 29.72, 29.39, 28.02, 23.95, 22.71, 19.30, 18.73, 14.13, 11.87. MALDI-TOF-MS: Calcd. for m/z=1054.7, found: m/z=1055.9 (M+K$^+$). HR-MS(ESI) ($C_{68}H_{105}NO_5$) [M+K]$^+$: Calcd.: 1054.7624. found: 1154.7697 (M+K)$^+$.

Preparation of DPCE-ACh (Scheme 1)

Under $N_2$ atmosphere, a mixture of compound 4 (0.17 g, 0.25 mmol) and compound 6 (0.25 mmol) was stirred and refluxed in 30 mL of CH$_2$Cl$_2$-MeOH solution (3:1, v/v). Several drops of glacial acetic acid were added as catalyst. The reaction was examined by TLC technique, implying the disappearance of reactants. After reaction, most of the solvents were distilled under reduced pressure at room temperature. The obtained residue was further purified by recrystallization in CH$_2$Cl$_2$/MeOH (1:5, v/v) three times. DPCE-ACh was collected as a yellow solid with a yield of 88%. $^1$H NMR (400 MHz, CDCl$_3$) δ (ppm): 9.45 (br, 1H), 8.17 (s, 1H), 6.90-7.78 (m, 12H), 5.40 (br, 1H), 5.20 (br, 1H), 4.72 (br, 2H), 4.65 (s, 2H), 4.08 (br, 4H), 0.68~2.42 (m, 89H); $^{13}$C NMR (100 MHz, CDCl$_3$) δ (ppm): 167.98, 163.71, 160.00, 159.69, 158.68, 149.16, 148.98, 144.91, 141.28, 140.70, 139.07, 129.58, 128.92, 127.36, 127.10, 126.64, 123.99, 123.16, 115.19, 114.90, 112.99, 112.85, 107.83, 107.22, 75.47, 69.21, 69.08, 67.22, 65.20, 56.82, 55.98, 55.43, 49.98, 42.31, 39.35, 37.96, 36.88, 36.56, 36.09, 35.80, 31.95, 29.66, 29.40, 27.88, 27.75, 26.07, 24.07, 23.67, 22.58, 21.03, 19.18, 18.46, 14.15, 11.69. MALDI-TOF-MS: Calcd. for m/z=1192.7, found: m/z=1194.0 (M+H$^+$). HR-MS(ESI) ($C_{77}H_{113}N_3O_7$) [M+H]$^+$: Calcd.: 1192.8651. found: 1192.8643 (M+H)$^+$.

Example 2

Photophysical Properties

Figure 2A:
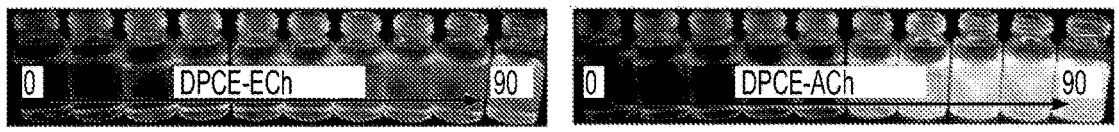
FIGS. 2A-2E depict (A) fluorescent photographs of DPCE-ECh and DPCE-ACh in THF/$H_2O$ mixtures with different water fraction ($f_w$); (B) CD spectra of DPCE-ACh in THF/$H_2O$ mixtures with different $f_w$; (C) corresponding $g_{abs}$ factor of DPCE-ACh in THF/$H_2O$ mixtures with different $f_w$; (D) CPL spectra of DPCE-ACh in THF/H$_2$O mixtures at $f_w$=60%; and (E) $g_{lum}$ factor of DPCE-ACh in THF/H$_2$O mixtures from $f_w$=40% to 90%.
Figure 12A:
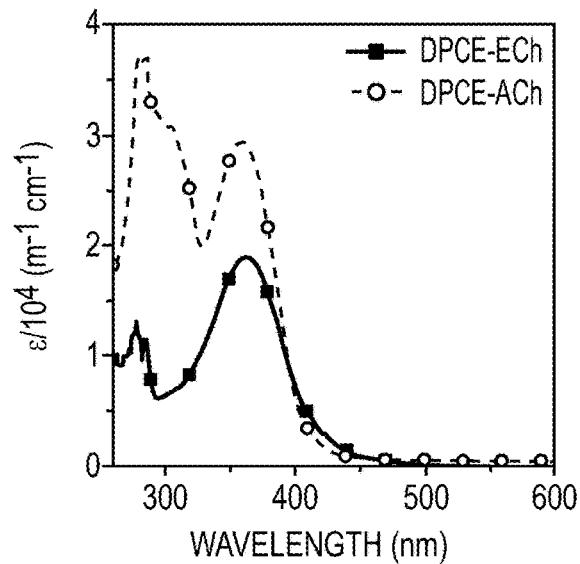
FIGS. 12A-12B depict (A) UV-Vis absorption of DPCE-ECh and DPCE-ACh in THF at room temperature (concentration 10 μM) and (B) photoluminescence (PL) spectra of DPCE-ECh and DPCE-Ach in THF at room temperature (concentration 10 μM).
Figure 12B:
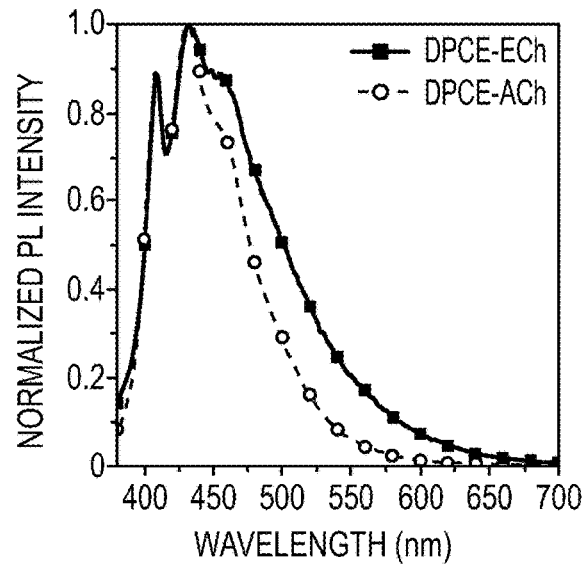
Figure 13A:
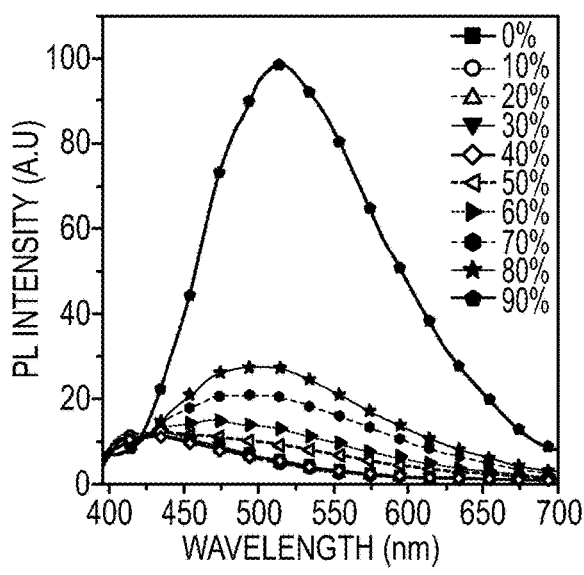
FIGS. 13A-13B depict (A) PL spectra of the relative PL intensity peak intensity (I/I$_0$) versus the composition of the THF/H$_2$O mixture of DPCE-ECh and (B) plot of the relative PL intensity peak intensity versus the composition of the THF/H$_2$O mixture of DPCE-ECH
Figure 13B:
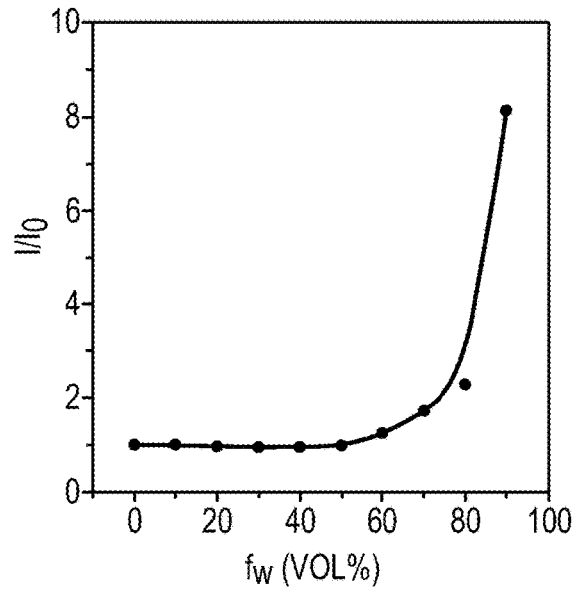
Figure 14A:
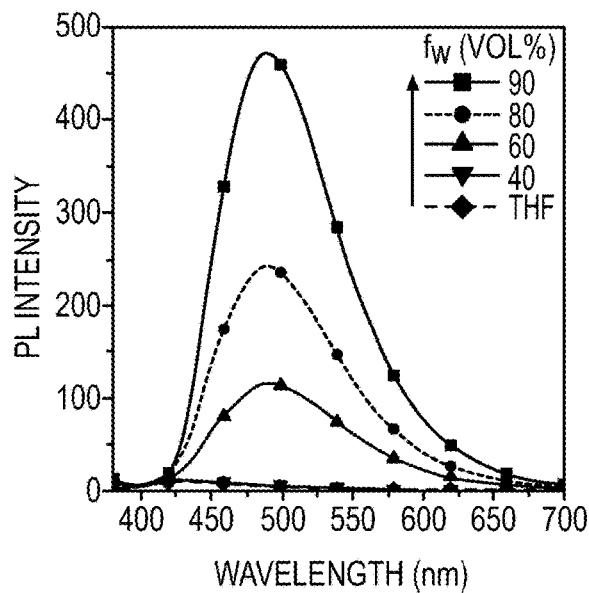
FIGS. 14A-14B depict (A) PL spectra of the relative PL intensity peak intensity (I/I$_0$) versus the composition of the THF/H$_2$O mixture of DPCE-ACh and (B) plot of the relative PL intensity peak intensity versus the composition of the THF/H$_2$O mixture of DPCE-ACH
Figure 14B:
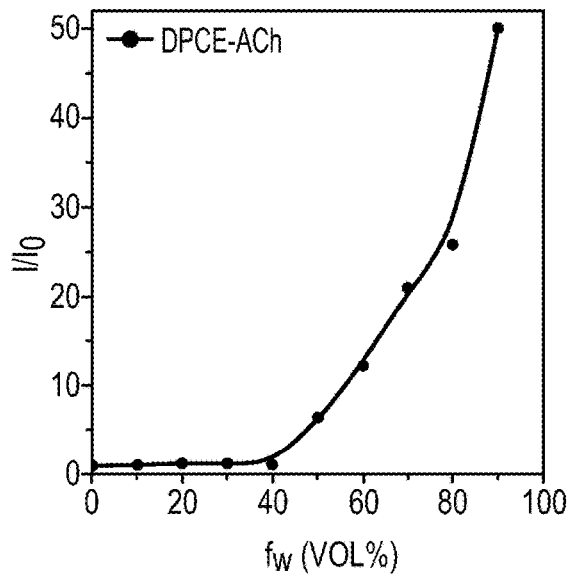
Figure 15A:
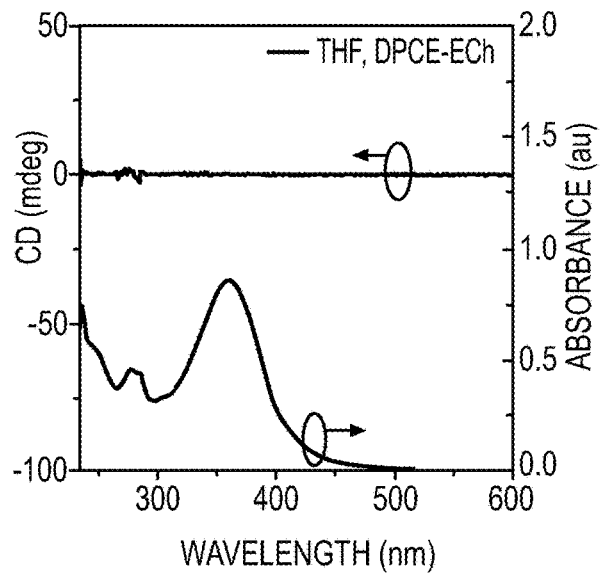
FIGS. 15A-15B depict (A) CD spectra of DPCE-ECh in THF (50 μM) and (B) DPCE-Ach in THF (50 μM).
Figure 15B:
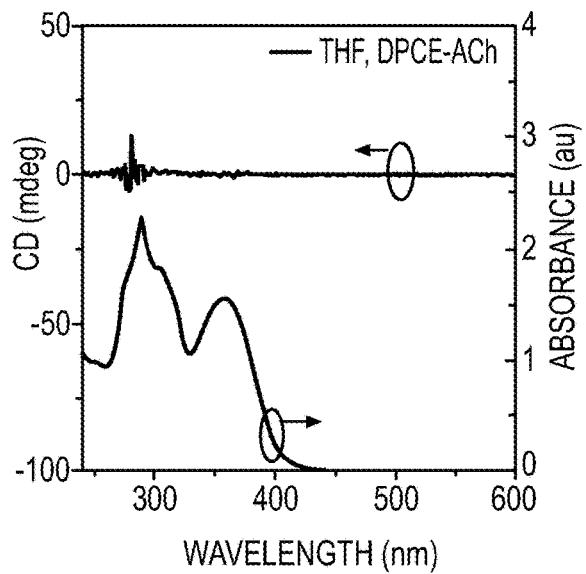
Figure 16:
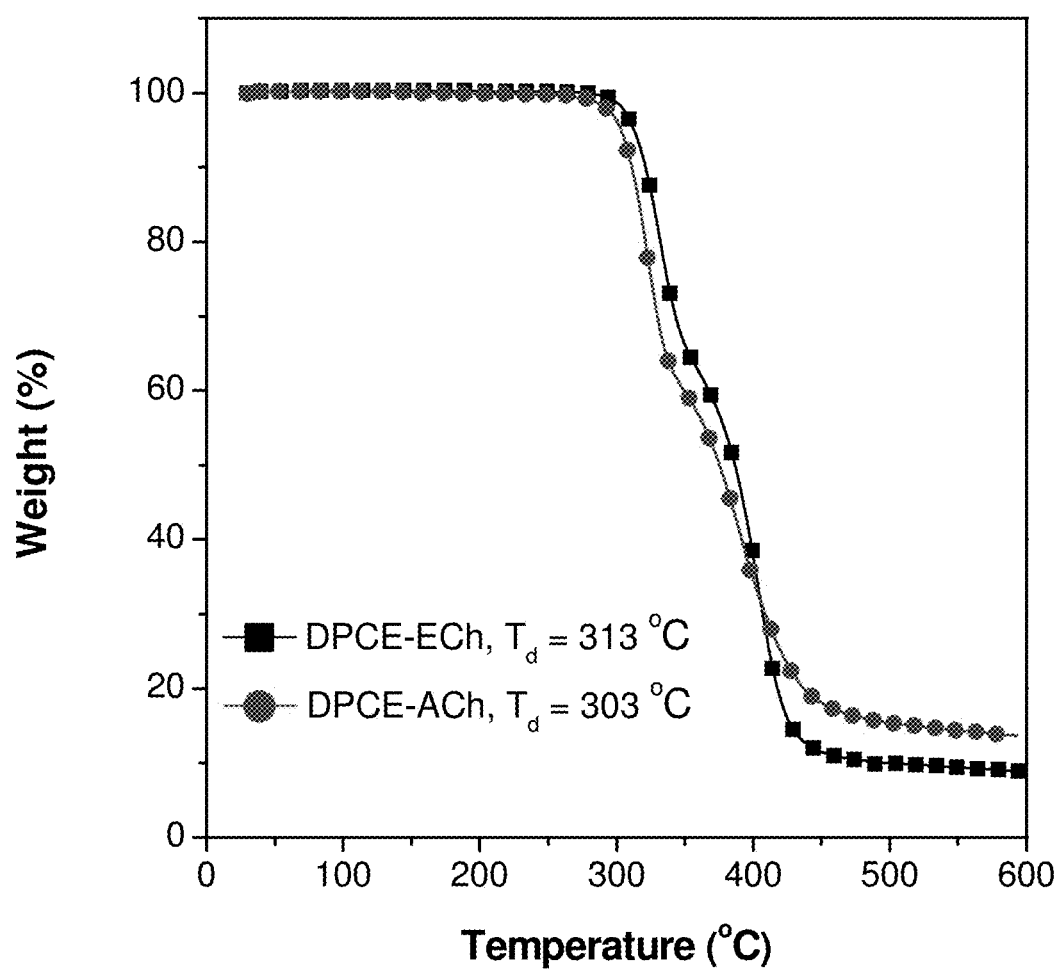
FIG. 16 depicts TGA curves of DPCE-ECh and DPCE-ACh.

DPCE-ECh and DPCE-ACh showed an absorption peak centered at 362 nm and 359 nm in THF solution, respectively (FIGS. 12A-12B). DPCE-ECh and DPCE-ACh exhibited similar fluorescence spectra with the peak centered at 430 nm in dilute THF solution (FIG. 12B). As for DPCE-ECh, the non-luminescent THF solution of DPCE-ECh progressively became highly luminescent upon adding water (FIG. 2A). With gradual increasing of the water fraction (fw) until the fw=90%, the emission intensity increased dramatically, demonstrating that DPCE-ECh possesses AIE properties. DPCE-ACh shows similar emission behaviors (FIG. 2A). Table 2 summarizes the photophysical properties of the chiral AIEgens.

TABLE 2

Photophysical Properties of Chiral AIEgens$^a$

| AIEgens | Solution | | | | Solid | | |
| --- | --- | --- | --- | --- | --- | --- | --- |
|  | $\lambda_{abs}$ [nm] | $\lambda_{em}$ [nm] | Stoke shift [nm] | $\Phi_{F,S}$ [%] | $\lambda_{em}$ [nm] | $\Phi_{F,P}$ [%] | τ [ns] |
| DPCE-ECh | 360 | 430 | 70 | 0.5 | 515 | 12.0% | 4.43 |
| DPCE-ACh | 352 | 430 | 78 | 0.3 | 500 | 11.4% | 3.28 |

$^a$Abbreviation:
$\lambda_{abs}$ = absorption maximum;
$\lambda_{em}$ = emission maximum;
$\Phi_{F,S}$ and $\Phi_{F,P}$ = fluorescence quantum yield in solution and solid powder, respectively;
τ (ns) = fluorescence lifetime.

Example 3

Chiroptical and Morphology

Figure 2B:
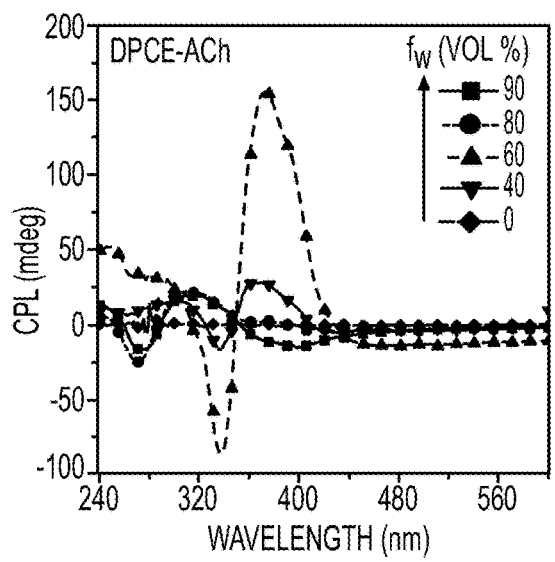
Figure 2C:
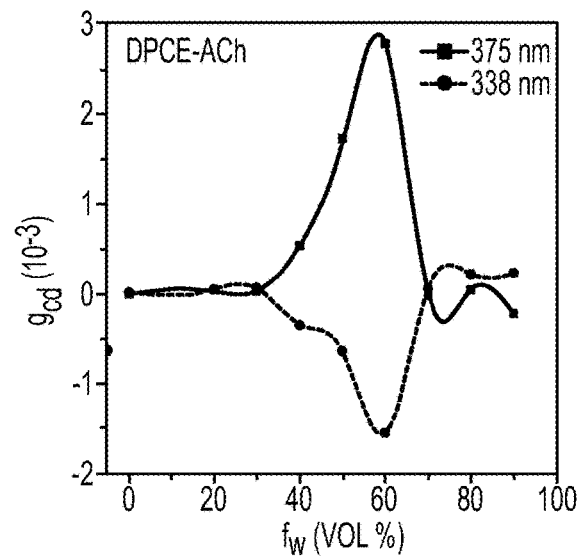

Chiroptical properties of the two chiral AIEgens (DPCE-ECh and DPCE-Ach) in suspension were investigated (FIGS. 13A-30B). DPCE-ECh and DPCE-ACh were well dispersed in THF solution, but no circulardichroism (CD) signal was observed at a concentration of 5×10$^{-5}$ M. Upon addition of water in the THF solution of DPCE-ECh, still no CD signals were found. Interestingly, with gradual increasing of water fraction ($f_w$) until the $f_w$=40%, DPCE-ACh exhibited obvious CD signals with negative and positive cotton effects (changes in optic rotary dispersion and/or circular dichroism in the vicinity of the absorption band) at the wavelengths ranging from 300 nm to 400 nm in the CD spectra (FIGS. 2A-2B). When the $f_w$=60%, it was also found that DPCE-ACh has a stronger cotton effect at long wavelengths of 338 nm and 375 nm, which can be regarded as an organized helical self-assembled structure. Impressively, the maximum absorption anisotropy factor ($g_{CD}$) reached 2.78×10$^{-3}$ at 375 nm (FIG. 2C). This phenomenon indicated that the large size chiral organic assemblies were formed through adding water as antisolvent at $f_w$=60%. When the water fraction exceeded 70%, the maximum $g_{cD}$ decreased. When the $f_w$=90%, the value of $g_{CD}$ was lowered to 2.3×10$^{-4}$ at 375 nm, demonstrating that the chiral self-assembled structure was destroyed (FIG. 2B).

Figure 2D:
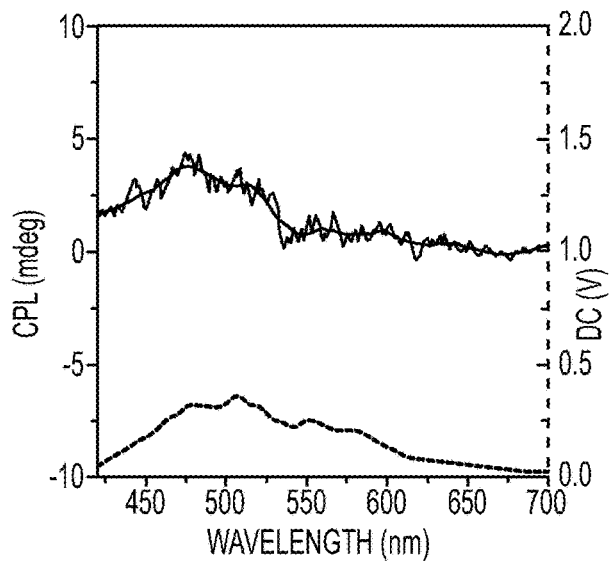
Figure 2E:
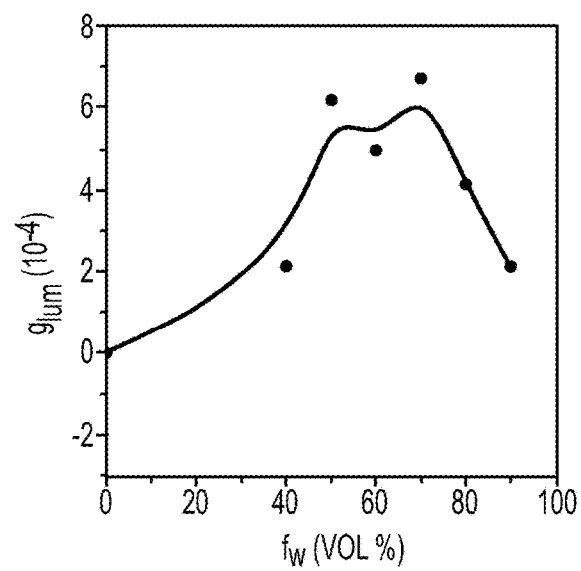

CPL is the emission analog of CD that reflects the chiroptical properties of the luminescent molecules upon excitation. For a comprehensive investigation, the CPL properties of DPCE-ECh and DPCE-ACh were investigated in THF/H$_2$O mixtures for different $f_w$ values. There were also no CPL signals for DPCE-ECh and DPCE-ACh in THF solution and no CPL signals for DPCE-ECh in the aggregated state. More intriguingly, a positive CPL signal was observed after the large organized self-assembled structure formed when the $f_w$=40% for DPCE-ACh. The maximum $g_{lum}$ was about 6.0×10$^{-4}$ when the $f_w$=50-70% (FIG. 2D). The detailed $g_{lum}$ data of DPCE-ACh is depicted in FIG. 2E. Considering the difference of the two chemical structures, the intermolecular hydrogen bonding is the external driving force for chiral self-assembled structures, thus generating CD and CPL signals.

To better understand the origins of the chiroptical properties of DPCE-ECh and DPCE-ACh aggregates, scanning electron microscopy (SEM) was employed to study their assembled structures in THF/H$_2$O mixtures with $f_w$ varying from 40%-90%. For DPCE-ECh, its aggregates retained a spherical structure regardless of the water fraction variation. Such a symmetrical morphology leads to a silent CPL response. For DPCE-ACh, its aggregates show an obvious morphological evolution from intertwined network ($f_w$=40%, FIG. 17) to left-handed helical nanofibers ($f_w$=60%, FIGS. 3A, 3B). Benefited from the helical fibrous morphology, DPCE-ACh aggregates show higher dissymmetry factors compared than those of the spherical aggregates. On the other hand, M-helices and P-supra-helices are found in DPCE-ACh suspension (FIGS. 3A, 3B). It was believed that the measured g value in disperse phase represents a weighted average of all possible orientations and interaction with the host. As for DPCE-ACh in suspension, the |$g_{lum}$| value detected in this system can be attributed to cancellation effects in ensemble measurements of a randomly oriented (M-helices and P-suprahelices) bulk sample. As seen in FIG. 3A, M-helices structures account for most of the sample, thus leading to a positive CPL signal. Careful examination of the chemical structures of the AIEgens may indicate that intermolecular hydrogen bonding between the amide linkages and the chiral nature of cholesterol moiety of DPCE-ACh serve as the external driving forces for forming the helical self-assembled structure to generate CD and CPL signals. To gain further insight into the dynamic nature of hydrogen bonding within the induced helical fibrous structure, temperature-dependent CD spectra are monitored on the DPCE-ACh-based aggregates ($f_w$=60%, FIGS. 3C, 3D). At the low temperature of 5° C., the CD spectrum of DPCE-ACh aggregates shows an obvious positive Cotton effect with absorption peak at 375 nm and gives a corresponding $g_{CD}$ value of +2.58×10$^{-3}$. The peak at 375 nm is ascribed to the achiral aromatic rigid core of DPCE-ACh, which is induced by the molecular helical arrangement. It was found that the CD signals of helical aggregates were sensitive to temperature. The CD signals gradually decreased and completely disappeared upon heating to 49° C. (FIG. 3C). Such temperature dependent $g_{abs}$ factor variations are summarized and plotted in FIG. 3D. It was noted that the $g_{CD}$ of 375 nm was only +2.5×10$^{-4}$ at the high temperature of 49° C., indicating that the hydrogen bonding became very weak, thus leading to the dissociation of the helical assembled structure of DPCE-ACh.

Chiroptical Properties of Thin Film and Liquid Crystal Behavior

Figure 17:
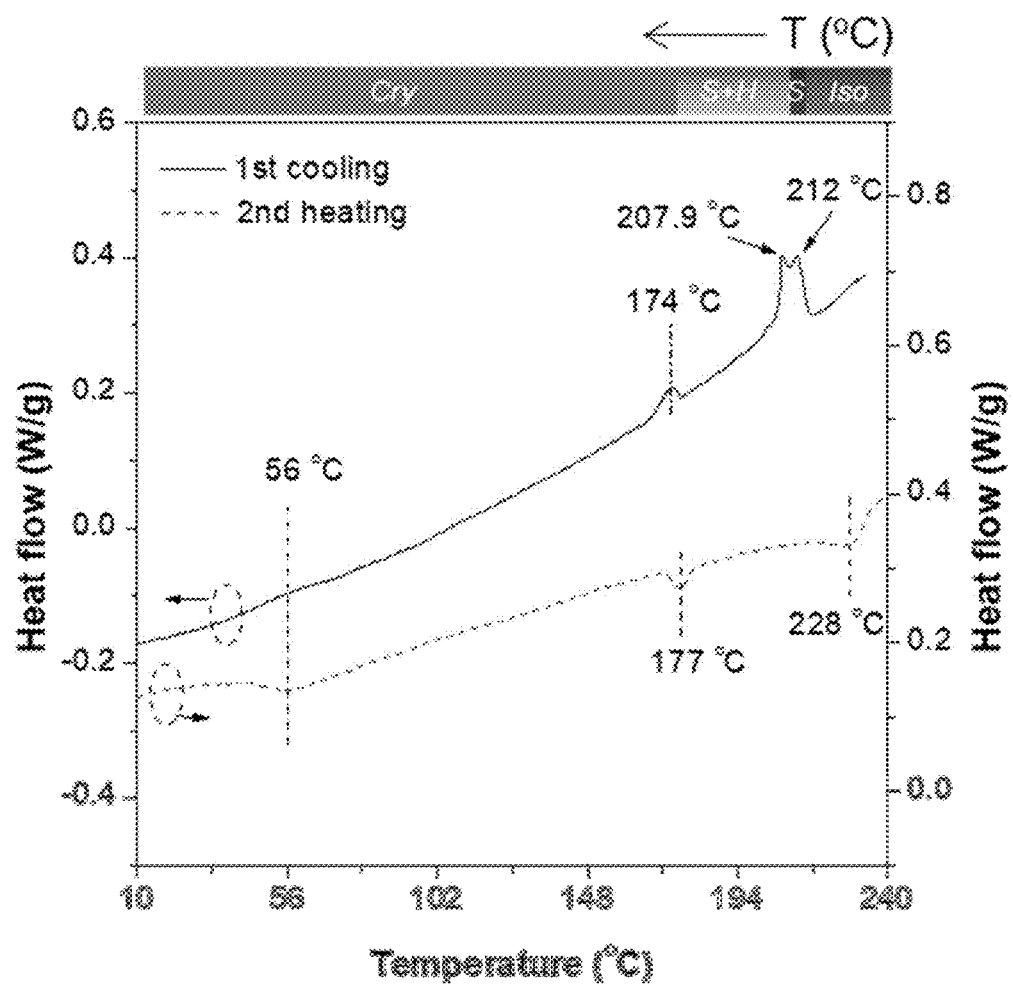
FIG. 17 depicts phase transition of DPCE-ACh as determined from the first cooling (upper columns); DSC scans with rate 5 K min$^{-1}$. (Abbreviations: Cry=solid crystal; S+H: smectic+hexagonal columnar phase; S: smectic phase: iso: isotropic liquid) DSC scans of the second heating and first cooling of DPCE-ECh (5° C./min).
Figure 18:
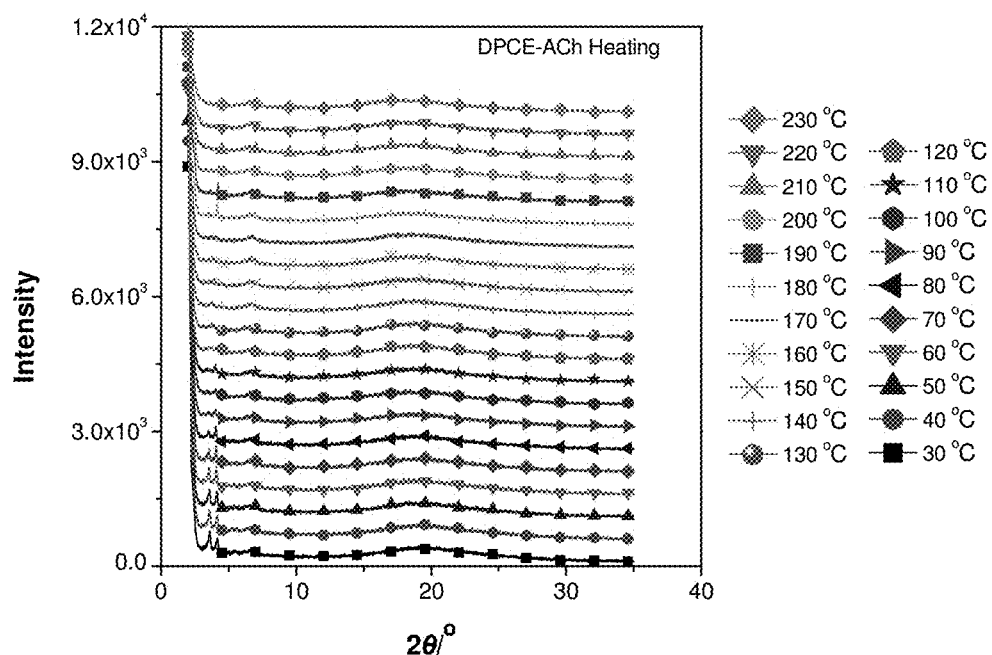
FIG. 18 depicts ID wide angle X-ray diffraction (ID WAXD) pattern of DPCE-ACh on the 1$^{st}$ heating process in different temperatures (2θ=2°-35°).
Figure 19:
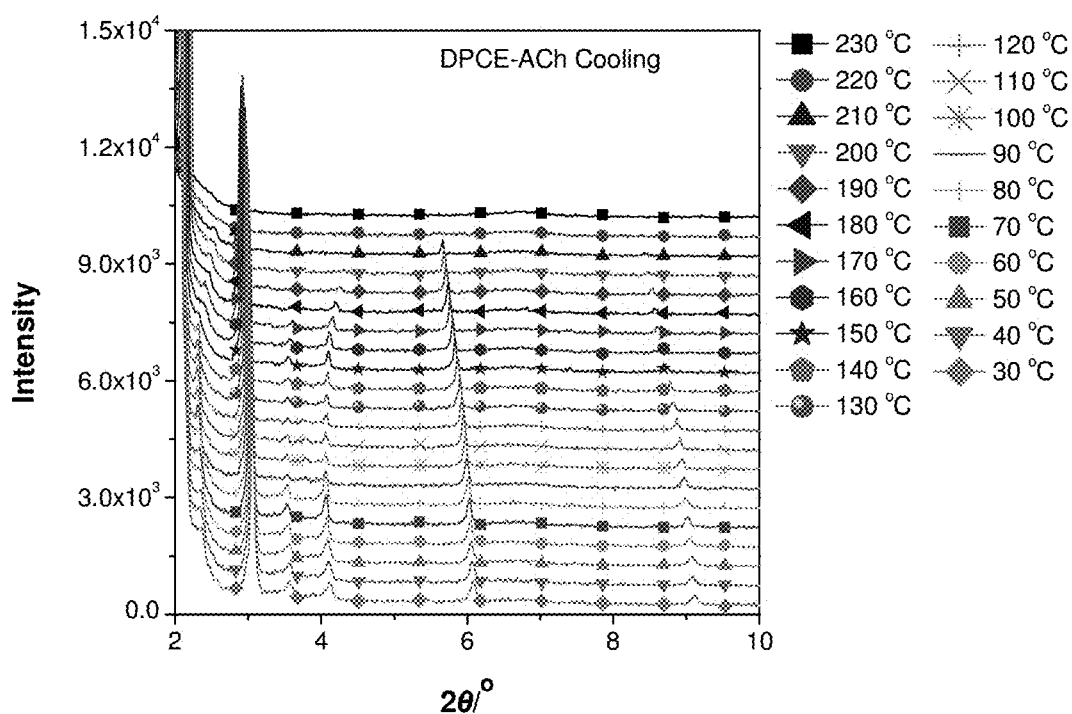
FIG. 19 depicts ID wide angle X-ray diffraction (ID WAXD) pattern of DPCE-ACh on the 1$^{st}$ cooling process in different temperatures (2θ=2°-35°).

DPCE-ACh was first explored with respect to its capability to form helical fibers mentioned above. The phase transition temperatures of DPCE-ACh in solid film are shown graphically in FIG. 4A (top). Upon cooling the isotropic liquid of DPCE-ACh to 210° C., a smectic liquid-crystalline phase with a fan-shaped texture followed by a columnar liquid-crystalline phase with a mosaic texture were observed (FIG. 4A, bottom; FIG. 17). The molecular orientations in the liquid-crystalline phases were revealed by 1D wide angle X-ray diffraction (1D WAXD, FIGS. 29A-30B).

Figure 21:
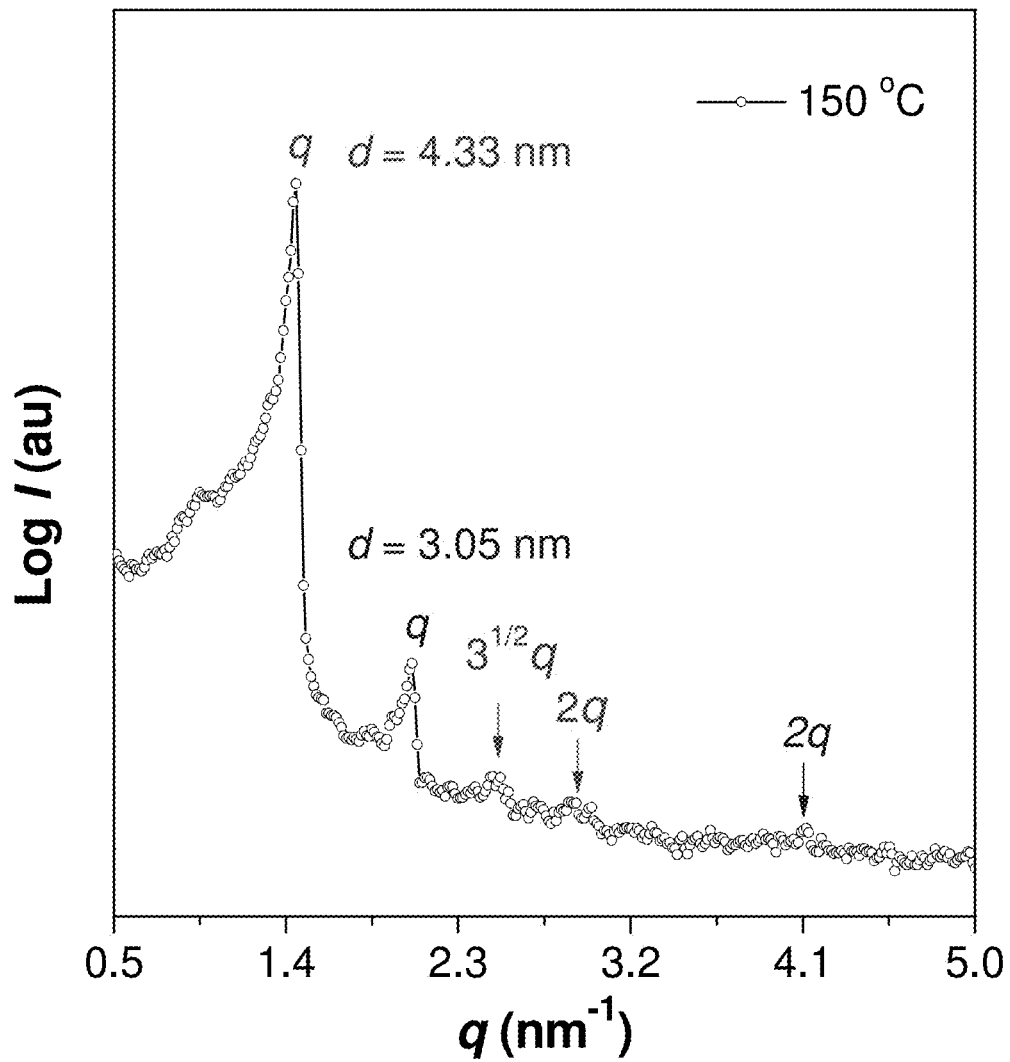
FIG. 21 depicts small angle X-ray scattering (SAXS) pattern for DPCE-ACh at 150° C. in detailed q=0.5-5.0 nm$^{-1}$.
Figure 23A:
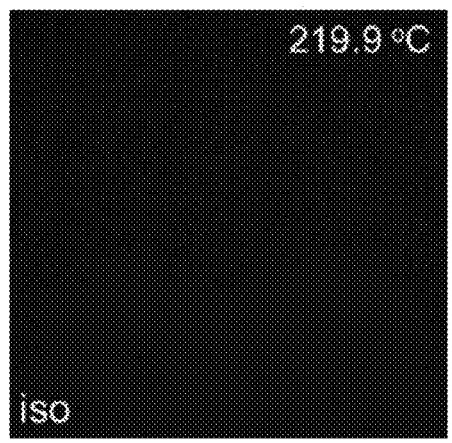
FIGS. 23A-23D depict polarized optical microscopy (POM) images of DPCE-ACh under crossed polarizers during heating and cooling process (rate=10° C./min).
Figure 23B:
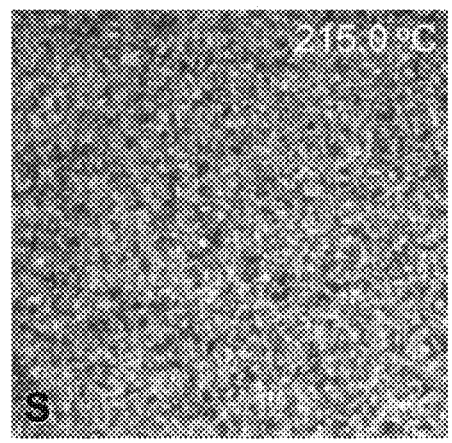
Figure 23C:
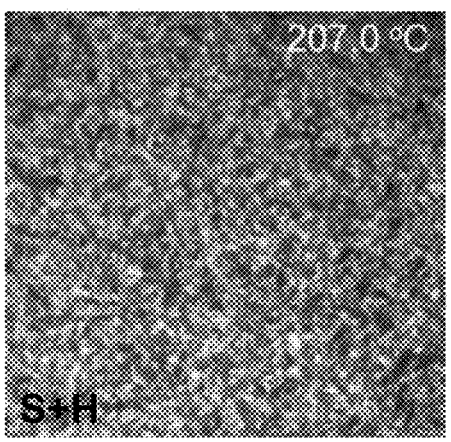
Figure 23D:
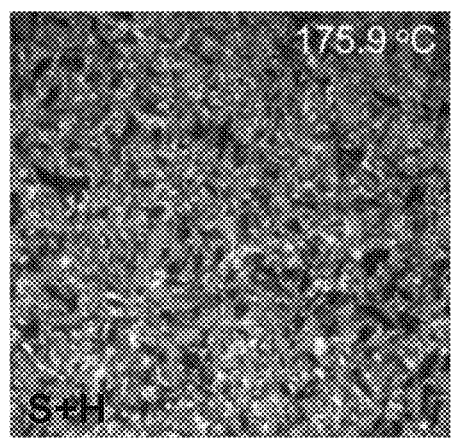
Figures 24A, 24B, 24C:
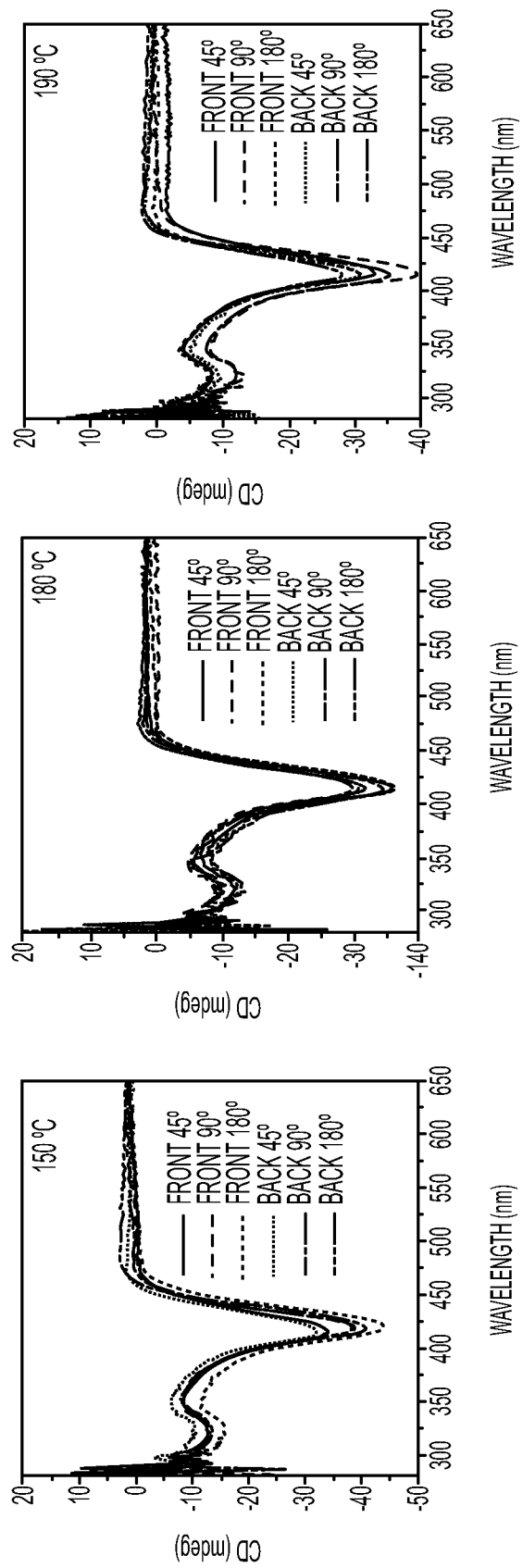
FIGS. 24A-24C depict (A) CD spectra of front and back sides of DPCE-ACh films annealed for 45 minutes at different temperatures at 150° rotation angle perpendicular to the light axis; (B) CD spectra of front and back sides of DPCE-ACh films annealed for 45 minutes at different temperatures at 180° rotation angle perpendicular to the light axis; and (C) CD spectra of front and back sides of DPCE-ACh films annealed for 45 minutes at different temperatures at 190° rotation angle perpendicular to the light axis. The film thickness of DPCE-ACh is 50 nm for CD detection.
Figure 25:
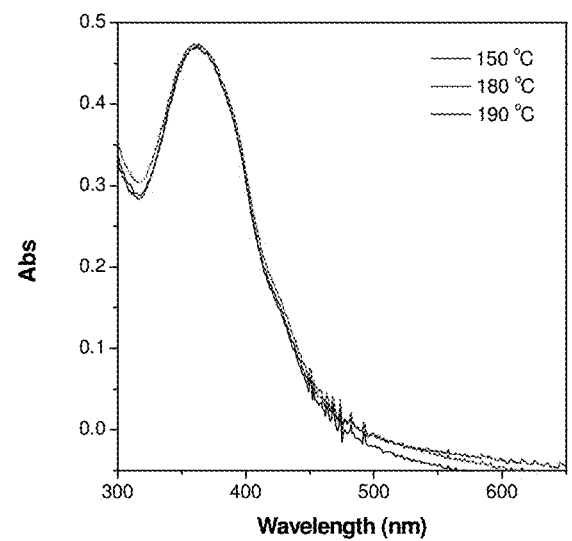
FIG. 25 depicts a UV spectra of front and back sides of DPCE-ACh films annealed at different temperatures for 45 min.
Figure 26:
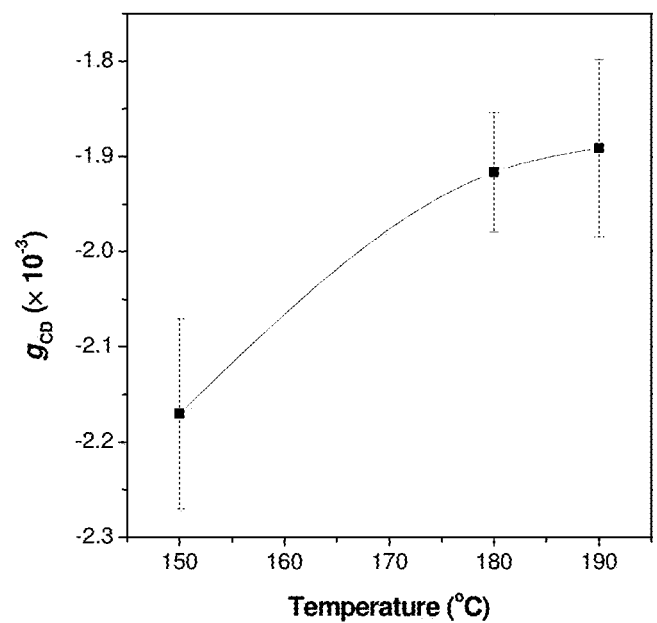
FIG. 26 depicts $g_{CD}$ (415 nm) of DPCE-ACh films annealed for 45 min at temperatures of 150° C.-190° C.
Figure 27A:
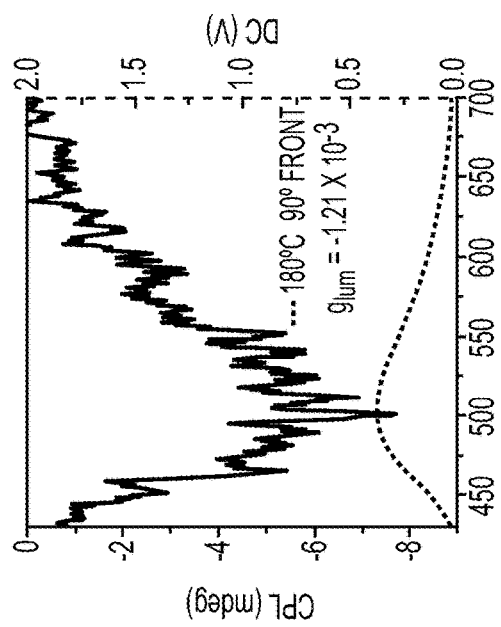
FIGS. 27A-27D depict CPL spectra of DPCE-Ach films annealed at 180° C. for 45 min at different rotation angles perpendicular to the light axis (front side).
Figure 27B:
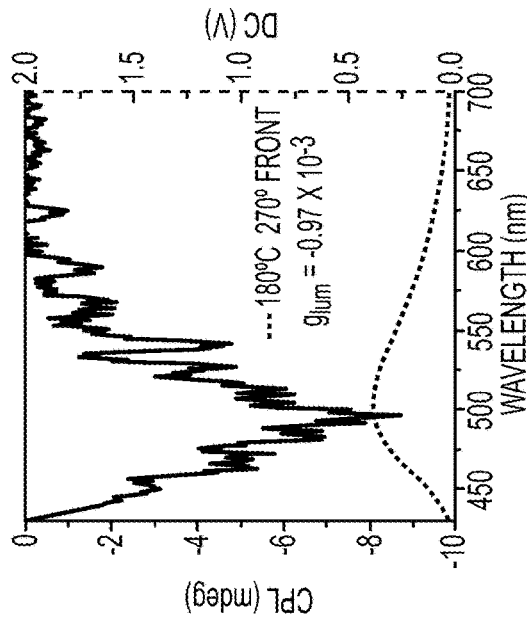
Figure 27C:
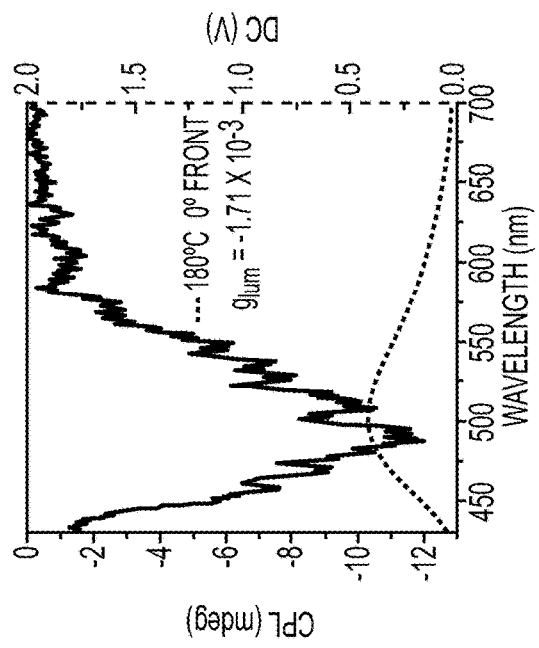
Figure 27D:
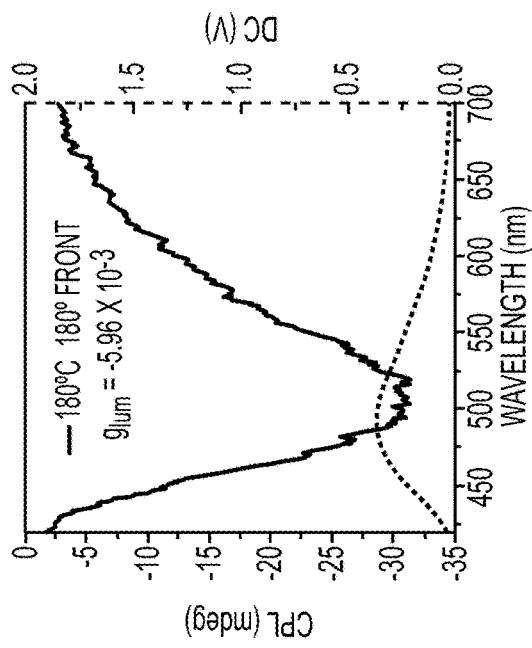
Figure 28A:
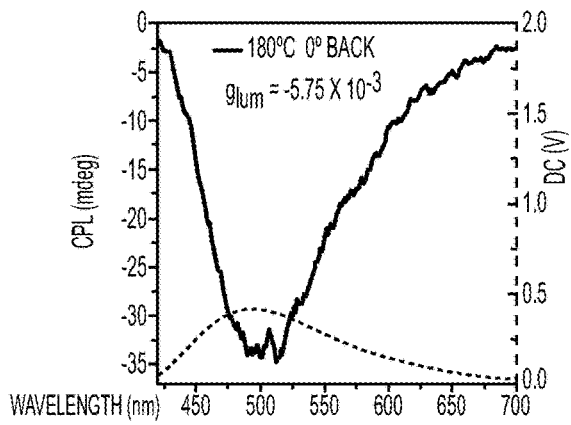
FIGS. 28A-28D depict CPL spectra of DPCE-Ach films annealed at 180° C. for 45 min at different rotation angles perpendicular to the light axis (back side).
Figure 28B:
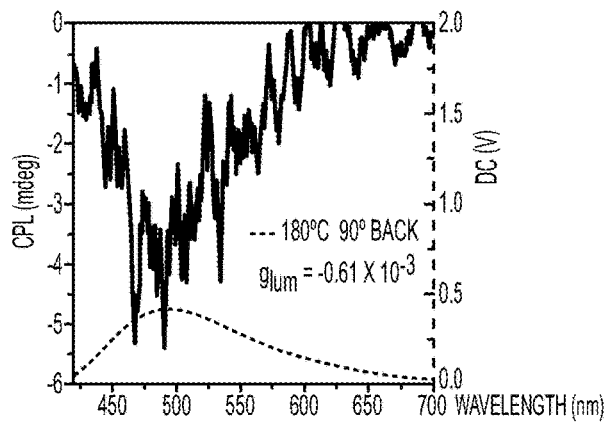
Figure 28C:
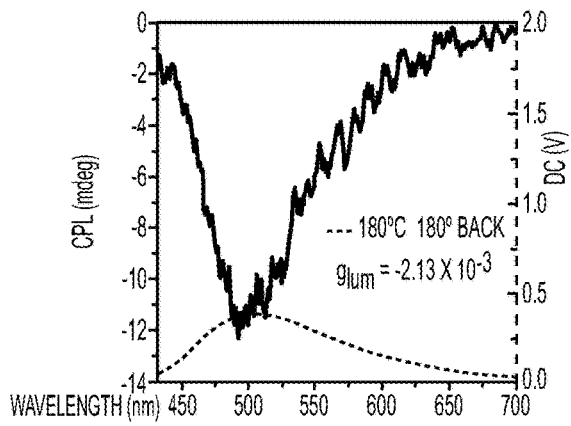
Figure 28D:
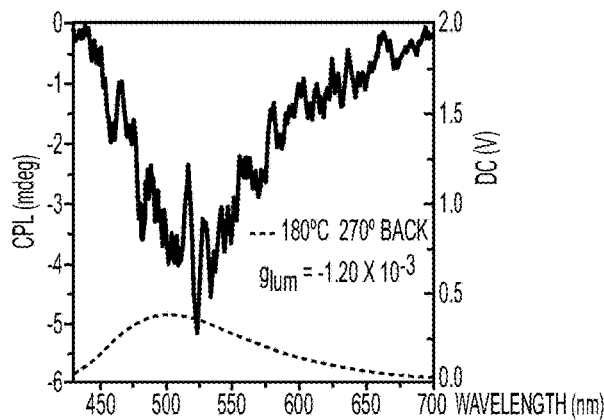
Figure 29A:
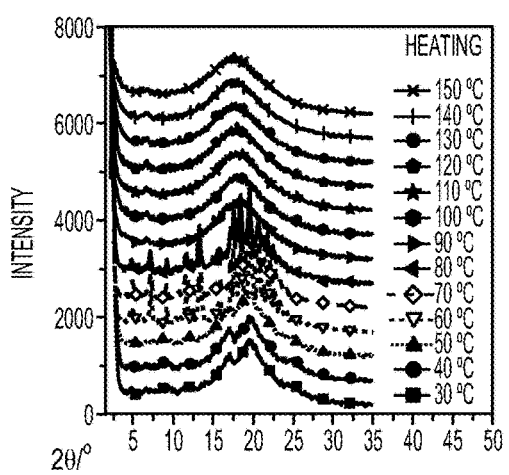
FIGS. 29A-29B depict (A) wide angle X-ray diffraction (ID WAXD) pattern of DPCE-ECh on the 2$^{nd}$ heating process at (2θ=2°-35°) and (B) wide angle X-ray diffraction (ID WAXD) pattern of DPCE-ECh on the 2$^{nd}$ heating process at (2θ=2°-6°).
Figure 29B:
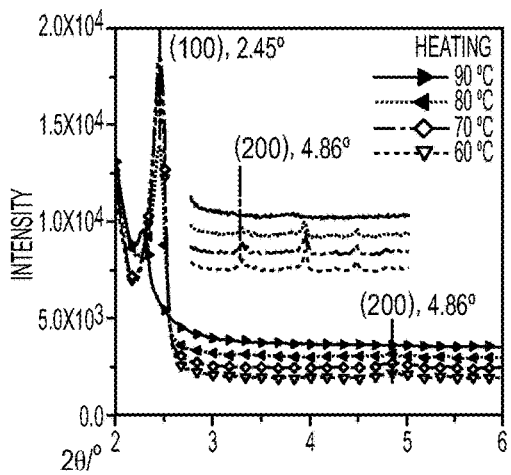
Figure 30A:
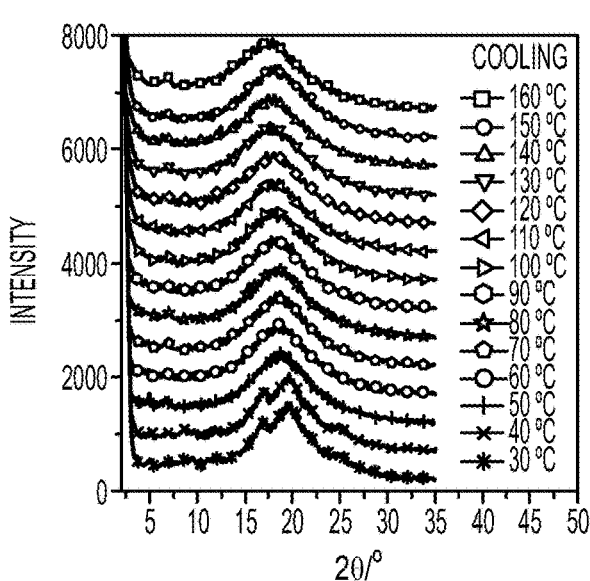
FIGS. 30A-30B depict (A) wide angle X-ray diffraction (ID WAXD) pattern of DPCE-ECh on the 1$^{st}$ cooling process at (2θ=2°-35°) and (B) wide angle X-ray diffraction (ID WAXD) pattern of DPCE-ECh on the 1st cooling process at (2θ=2°-6°).
Figure 30B:
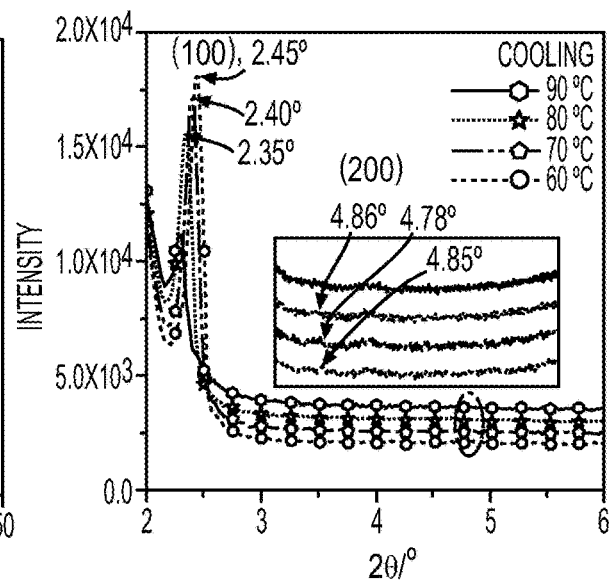

The 1D WAXD pattern at 210° C. shows a sharp peak at $2\theta=2.97°$ and a high-order diffraction peak at $2\theta=5.66°$. These two diffraction peaks are associated with a smectic phase structure with a layer thickness of 3.05 nm (FIG. 21). The 1D WAXD diagrams at 200° C., 170° C. and 150° C. show the appearance of three new peaks with scattering vectors of approximately $1:\sqrt{3}:2$, which are the typical reflection mode for (100), (110) and (200) planes of the hexagonal columnar liquid crystals. Analysis of small-angle X-ray scattering (SAXS) confirms the lamellar and columnar organization of DPCE-ACh with a lamellar thickness of 3.05 nm and a columnar diameter of 4.33 nm, respectively (FIG. 21). Electron density reconstruction was calculated according to known methods. The electron density map (FIG. 4C) of the phase based on the XRD result shows that the high electron density (red) is concentrated at the center of columns and low-density areas (green and blue) are located at the column periphery associated with the alkyl chains and the cholesterol side chains, respectively. On the other hand, as DPCE-ACh is a hexagonal columnar mesophase, the average number (n) of molecules per slice of the column could be obtained by the following formula.

$$n=(a^2)(\sqrt{3}/2)(h\rho N_A/M)$$

where the notation "a" is the hexagonal lattice parameter, $N_A$ is Avogadro's number, M is the molecular mass of the compound and the density ($\rho$) of these samples is set as 1 g/cm$^3$. After calculation, the number of molecules (n) in one disk is approximately 2 for DPCE-ACh. Thus, the possible molecular stacking mode for the hexagonal columns is suggested in FIG. 4D, in which a slice is composed of two molecules based on the hydrogen-bonding action between N—H and C=O groups. These results certainly support the notion that the hydrogen bond plays a crucial role for inducing the columnar mesophase of the asymmetrical diphenylacrylonitrile derivatives.

As illustrated in FIG. 4E, the film exhibited a negative signal at 415 nm with a $g_{CD}$ of $-(1.92\pm0.063)\times10^{-3}$ after annealing at 180° C. Moderate profile change in the CD spectrum was obtained by rotating the sample at different angles around the optical axis (FIGS. 4F, 24A-24C), suggesting that the LDLB (linear dichroism and linear birefringence) effect (birefringent phenomenon) contributes to the final CD. Because DPCE-ACh formed both the hexagonal and smectic phases, the non-periodic molecular orientations break its helical structure to give a weak CD signal in the order of $10^{-3}$ order. On the other hand, the CPL spectra at different angles in both sides of a 7 μm of liquid crystal cell were investigated. However, a large difference in $|g_{lum}|$ was observed at different angles in both sides and the $|g_{lum}|$ fell in the range of $-0.61\times10^{-3}$ to $-5.96\times10^{-3}$ (FIGS. 4F, 27A-27D, 28A-29B). This phenomenon was attributed to the amplified artifact (Bragg reflection) induced by the birefringent domains of the thick film (7 μm).

Figure 5E:
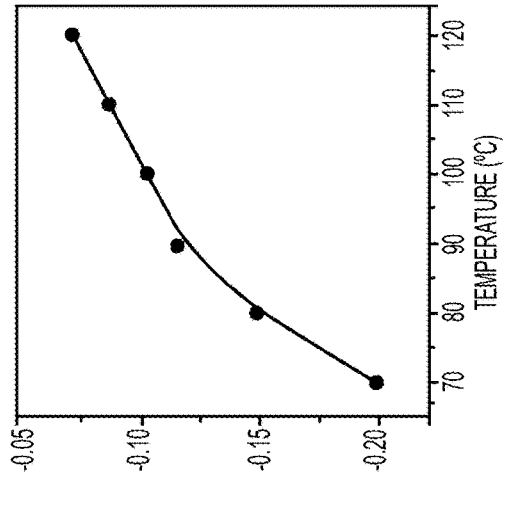

The ester linkage of DPCE-ECh offered only weak intermolecular interactions. and the relationship between the molecular orientations and the chiroptical properties were also investigated. The DSC trace of DPCE-ECh recorded during the first cooling cycle showed three exothermic transitions at around 121, 86 and 30° C. upon cooling from 180° C. (FIG. 5A). The POM image showed oily-streak textures that were typical of the sematic phase in the liquid crystalline state at 85° C. (FIG. 33A-33D; 34A-34D).

1D WAXD measurements were then carried out to monitor the structural evolution. It was found that a sharp peak at $2\theta=2.35°$ appeared at 80° C., indicating the formation of an ordered structure. In addition, a high-order diffraction peak at $2\theta=4.78°$ was also observed. The ratio of the scattering vectors of the two peaks was approximately 1:2, indicating the formation of a smectic structure (FIGS. 5B, 29A-29B, 30A-30B). Such an ordered structure was retained at the temperature range of 86-33° C. The transition recorded by DSC at 86° C. corresponds to the clearing point (FIG. 5A). In the temperature range of 86-121° C. (DSC), a broad and weak peak compared with that of smectic phase was observed (FIGS. 30A-30B) and we identified it as an isotropic liquid phase. To further prove the smectic structure of DPCE-ECh, 2D SAXS and wide-angle X-ray scattering (WAXS) were carried out (FIGS. 5C, 5D). The oriented sample for the measurements was prepared by mechanically shearing the melted film at 85° C.

Figures 36A, 36B:
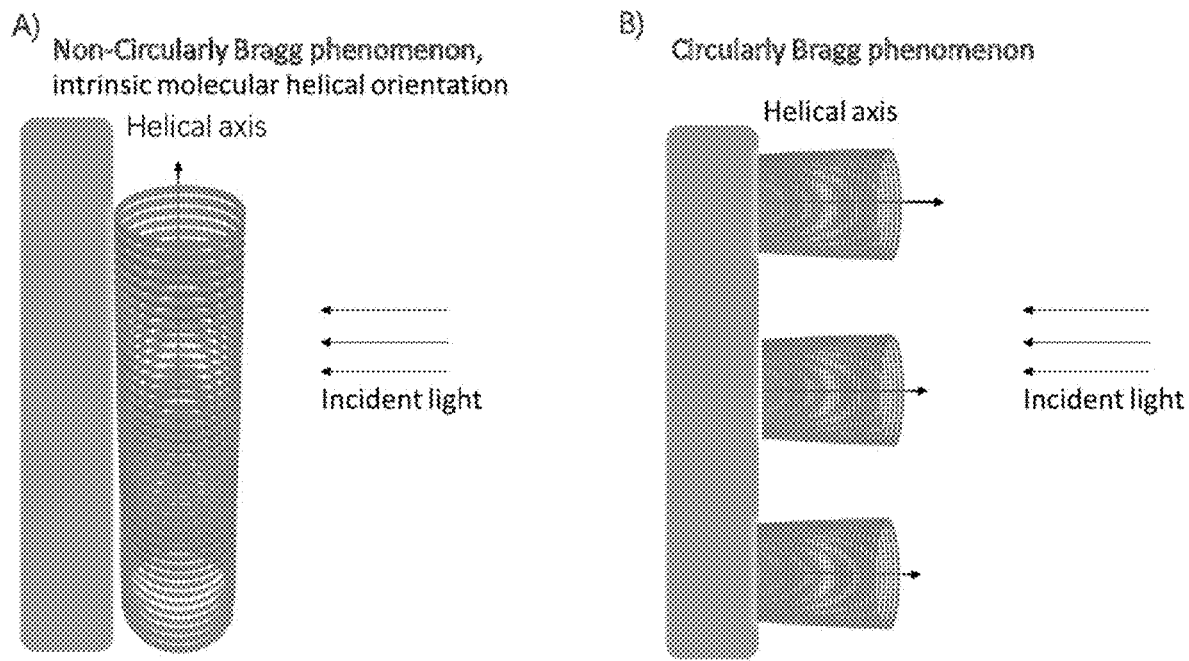
FIGS. 36A-36B depict a diagram of molecular assembly orientation for circularly Bragg phenomenon and non-circulalry Bragg phenomenon.
Figure 37:
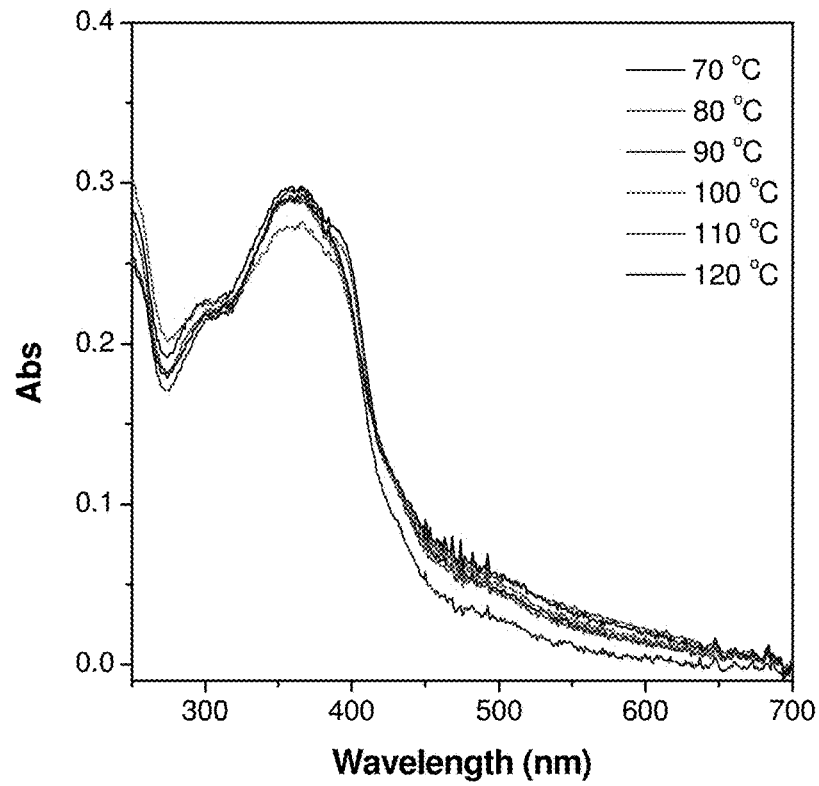
FIG. 37 depicts UV spectra of front and back sides of DPCE-ECh films annealed at different temperatures for 45 minutes recorded at different rotation angles perpendicular to the light axis.
Figure 38A:
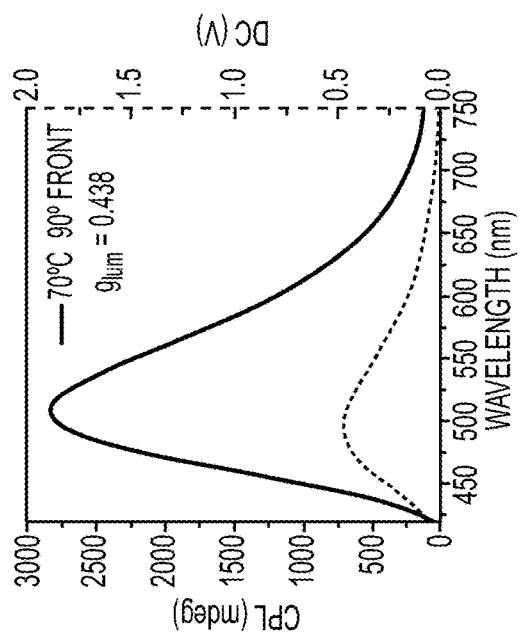
FIGS. 38A-38D depict CPL spectra of DPCE-ECh films annealed at 70° C. for 45 minutes at different rotation angles perpendicular to the light axis (front side).
Figure 38B:
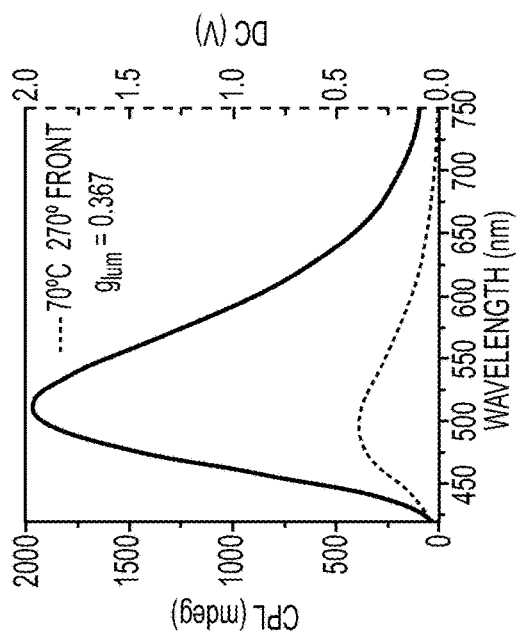
Figure 38C:
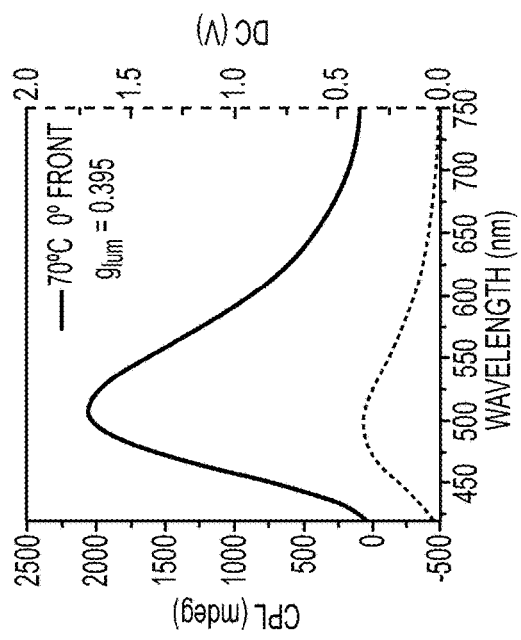
Figure 38D:
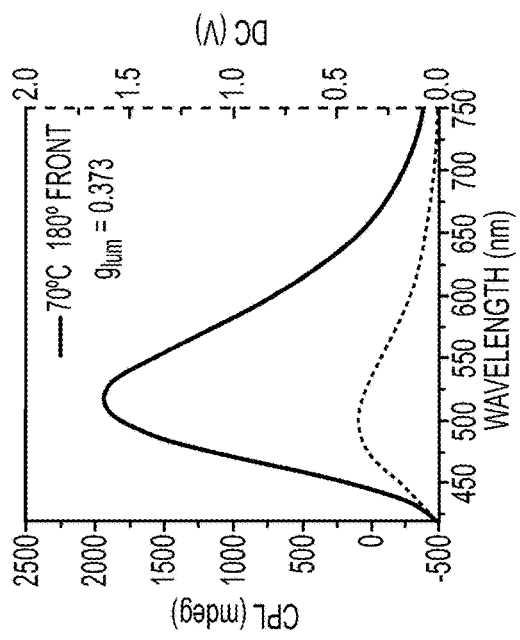
Figure 39A:
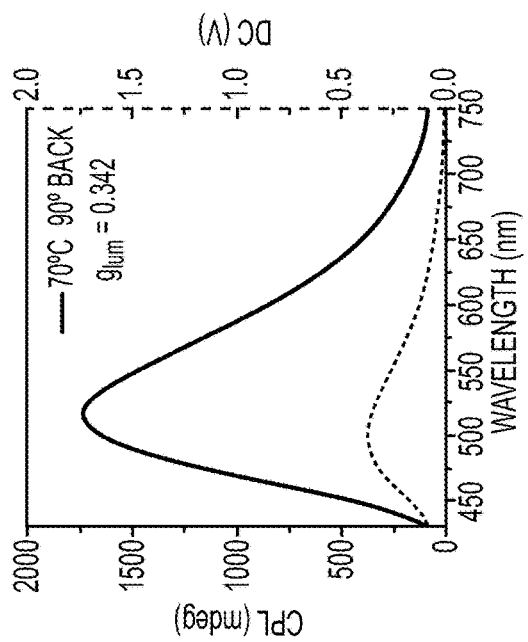
FIGS. 39A-39D depict CPL spectra of DPCE-ECh films annealed at 70° C. for 45 minutes at different rotation angles perpendicular to the light axis (back side).
Figure 39B:
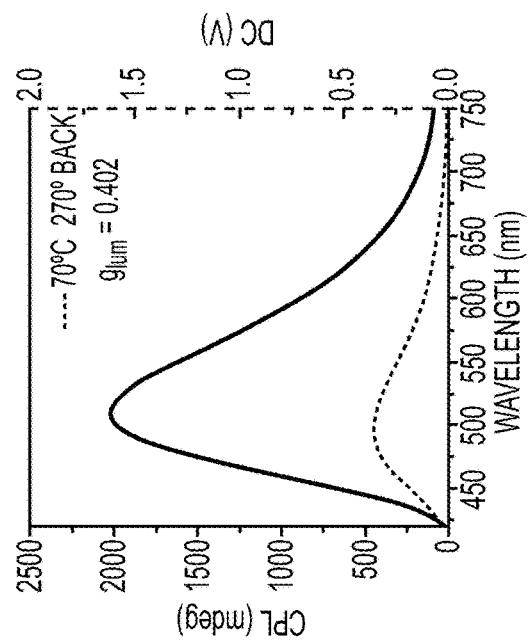
Figure 39C:
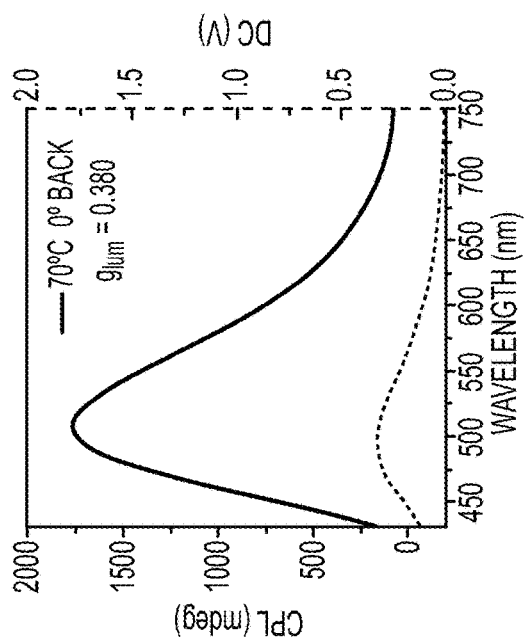
Figure 39D:
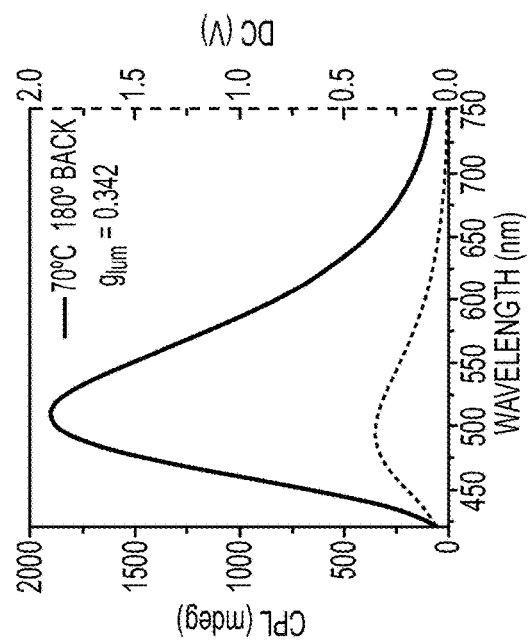
Figure 41A:
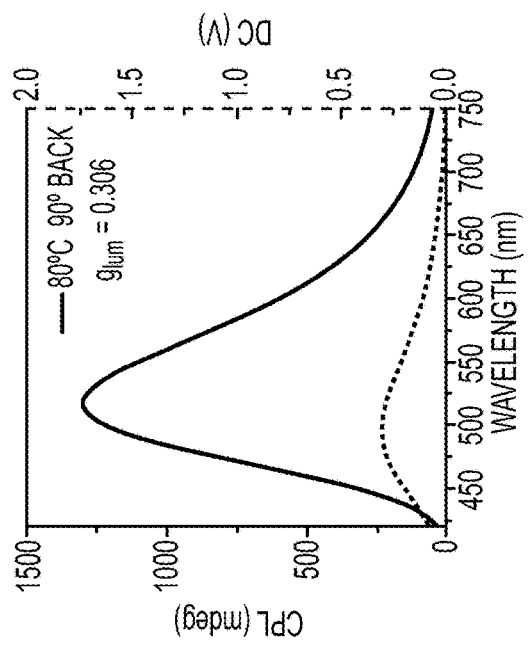
FIGS. 41A-41D depict CPL spectra of DPCE-ECh films annealed at 80° C. for 45 minutes at different rotation angles perpendicular to the light axis (back side).
Figure 41B:
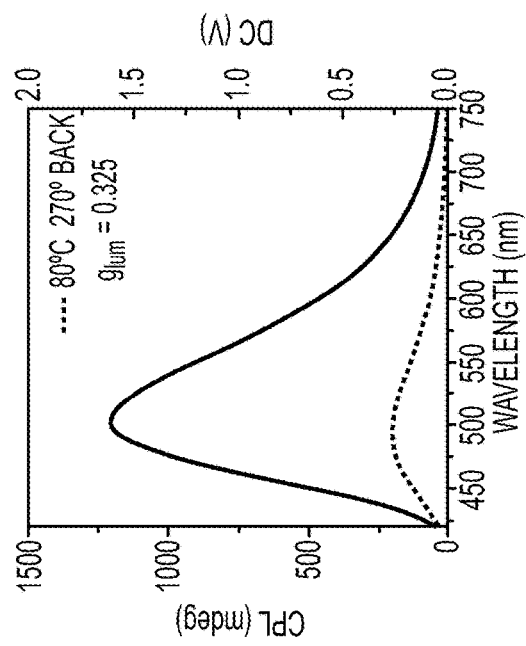
Figure 41C:
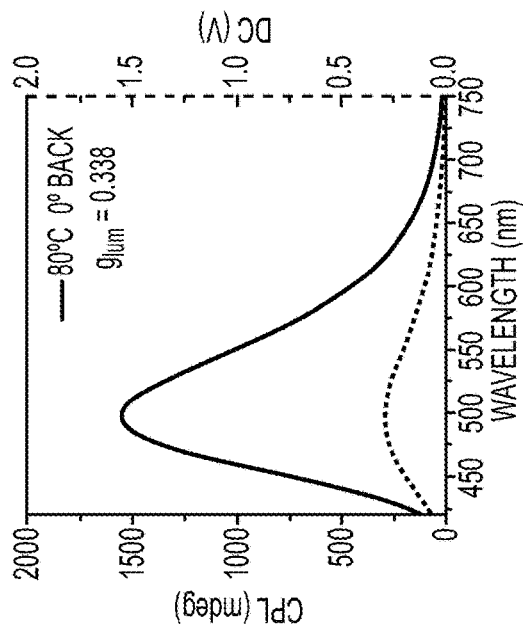
Figure 41D:
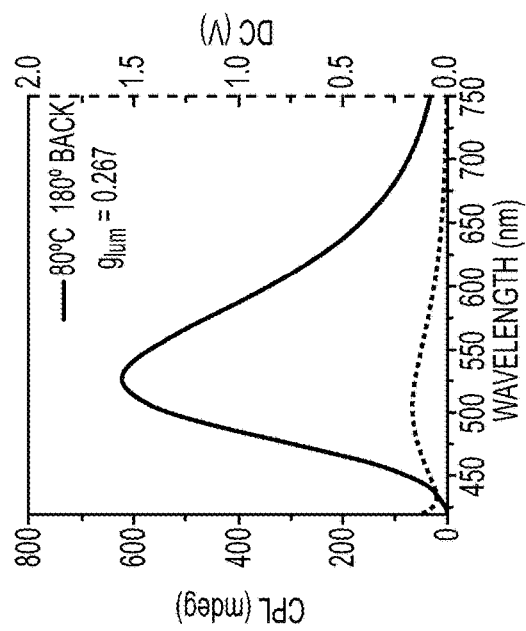
Figure 42A:
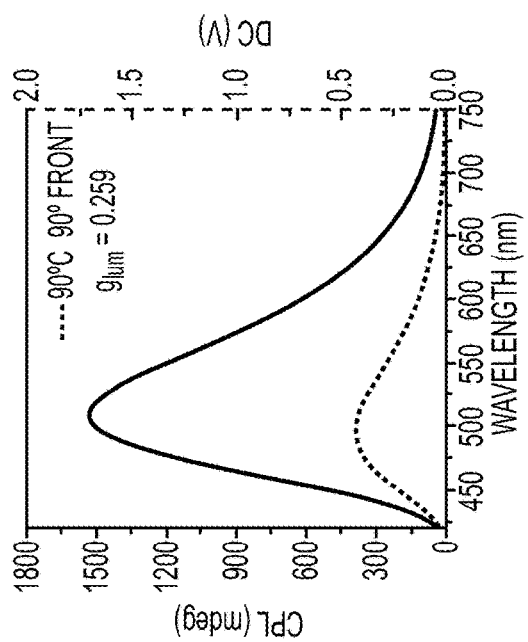
FIGS. 42A-42D depict CPL spectra of DPCE-ECh films annealed at 90° C. for 45 minutes at different rotation angles perpendicular to the light axis (front side).
Figure 42B:
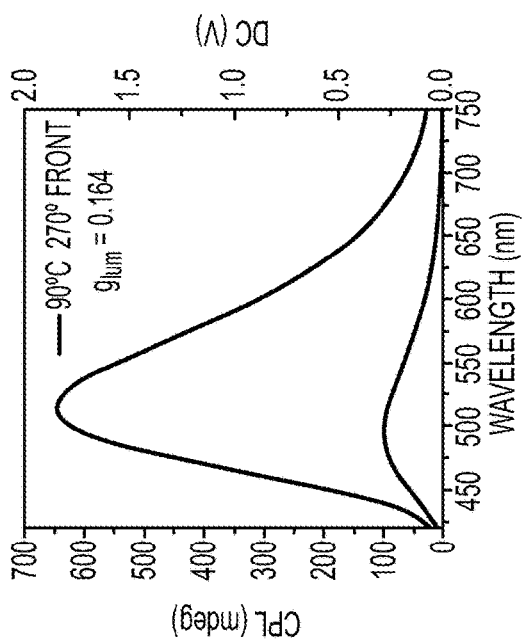
Figure 42C:
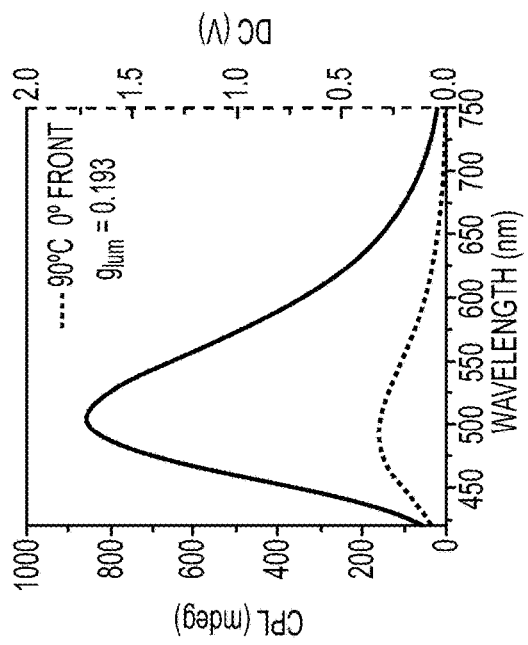
Figure 42D:
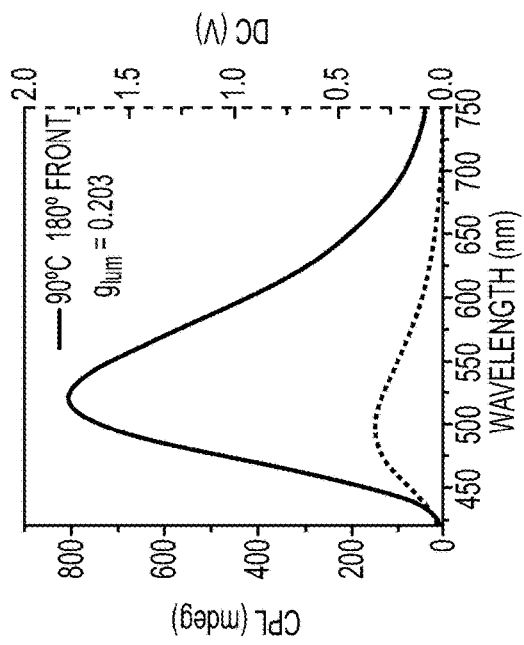
Figure 43A:
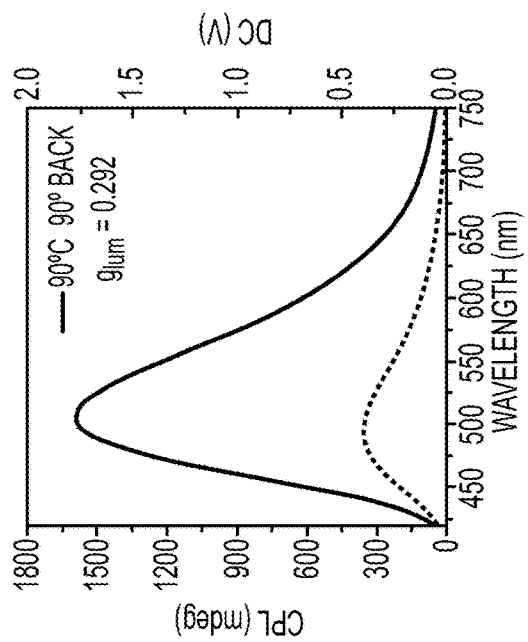
FIGS. 43A-43D depict CPL spectra of DPCE-ECh films annealed at 90° C. for 45 minutes at different rotation angles perpendicular to the light axis (back side).
Figure 43B:
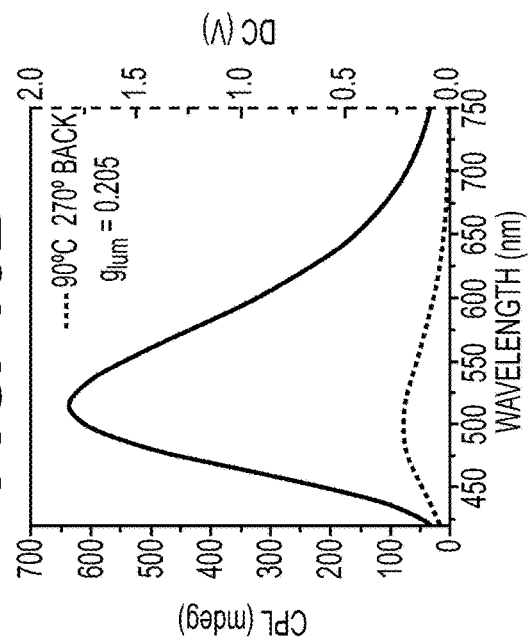
Figure 43C:
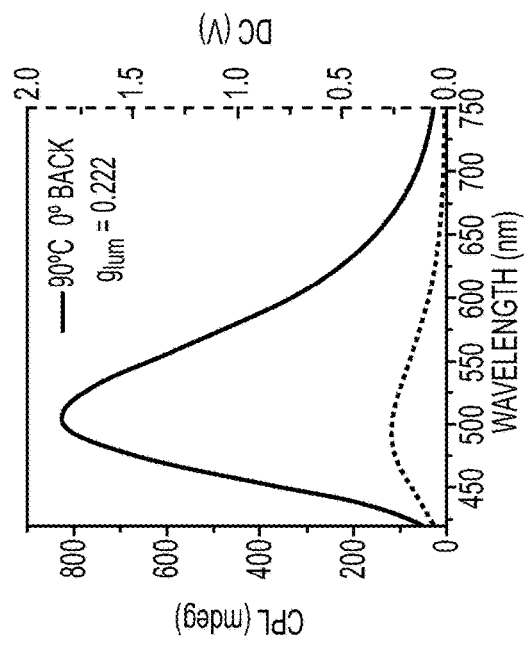
Figure 43D:
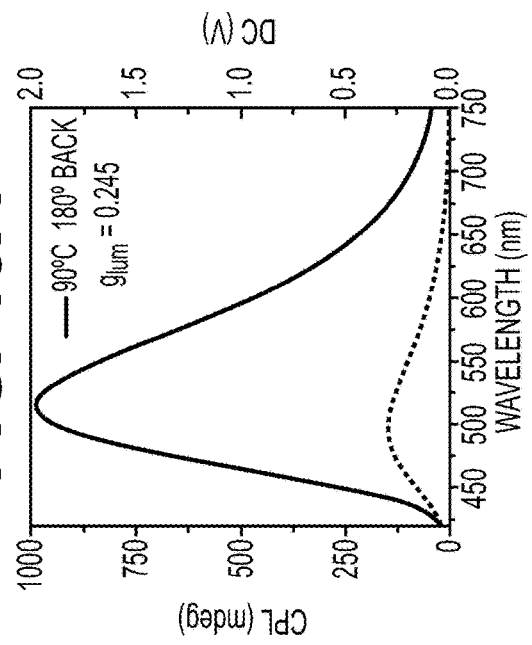
Figure 44A:
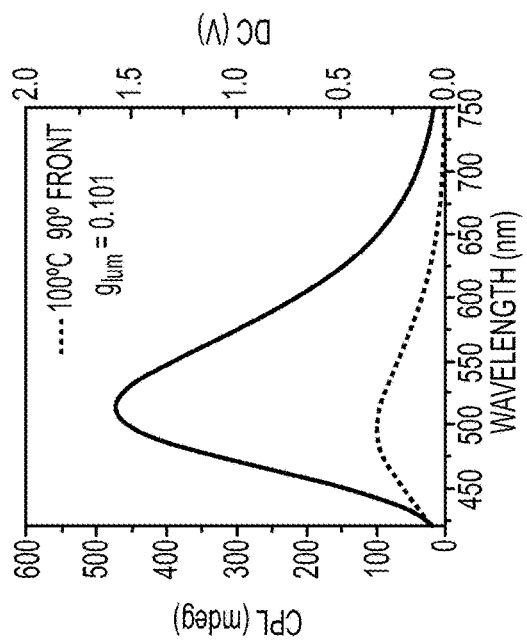
FIGS. 44A-44D depict CPL spectra of DPCE-ECh films annealed at 100° C. for 45 minutes at different rotation angles perpendicular to the light axis (front side).
Figure 44B:
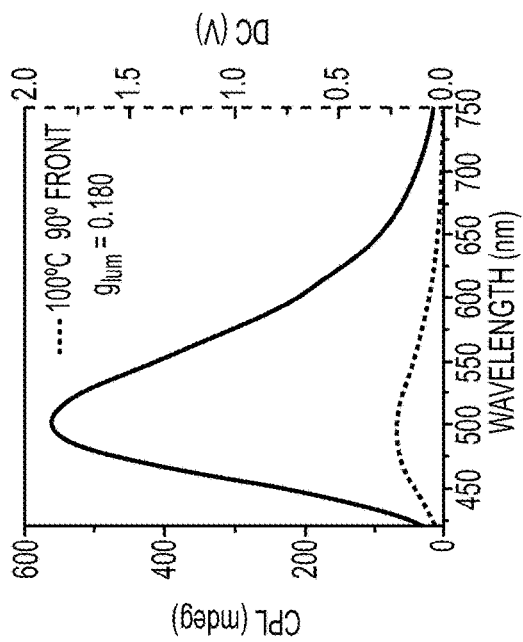
Figure 44C:
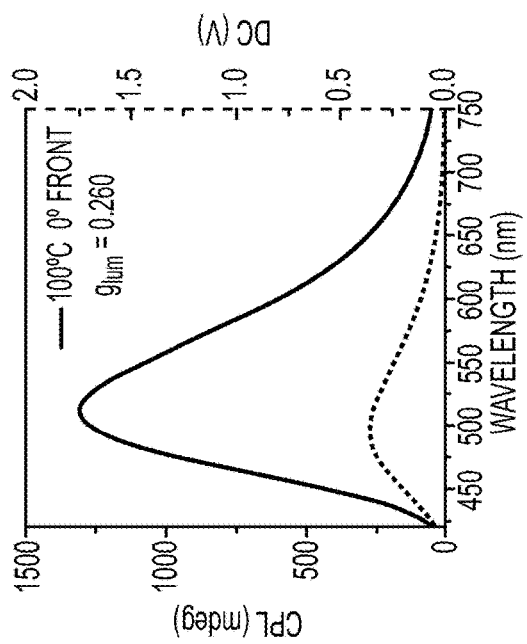
Figure 44D:
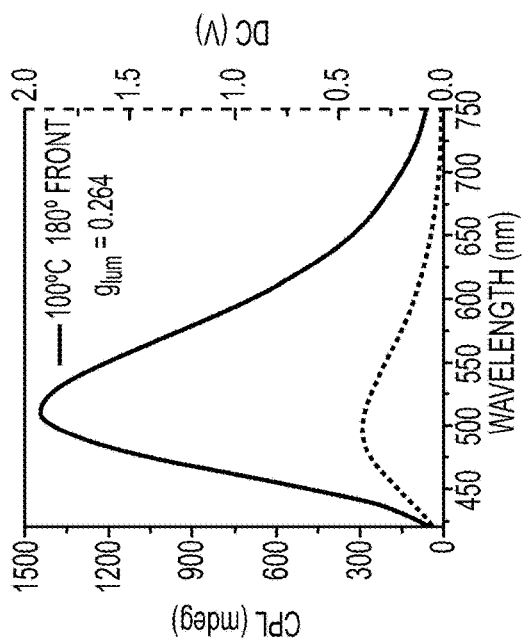
Figure 45A:
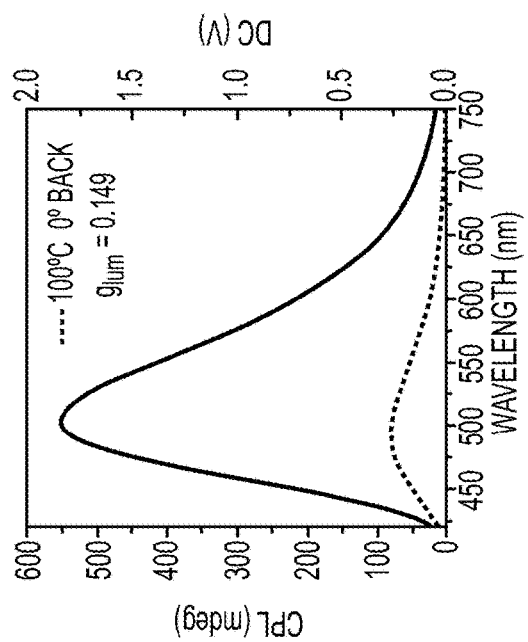
FIGS. 45A-45D depict CPL spectra of DPCE-ECh films annealed at 100° C. for 45 minutes at different rotation angles perpendicular to the light axis (back side).
Figure 45C:
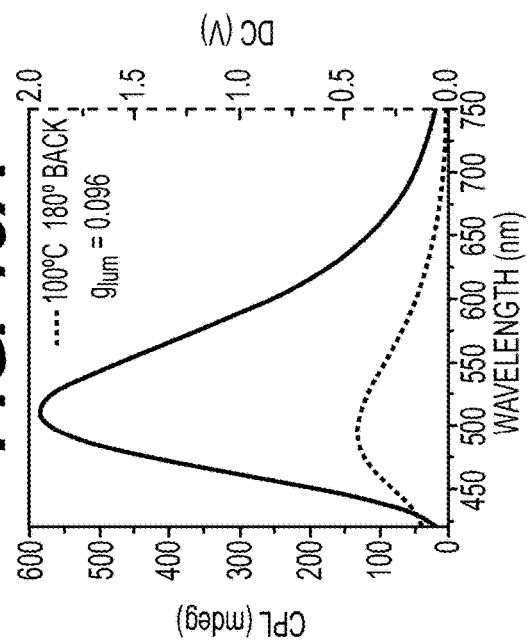
Figure 45B:
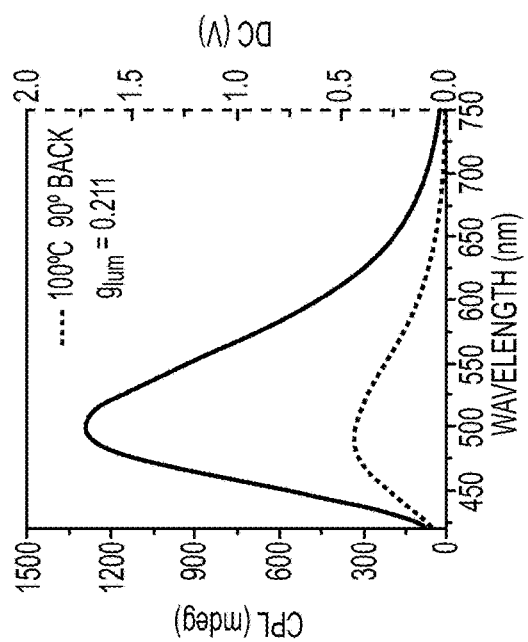
Figure 45D:
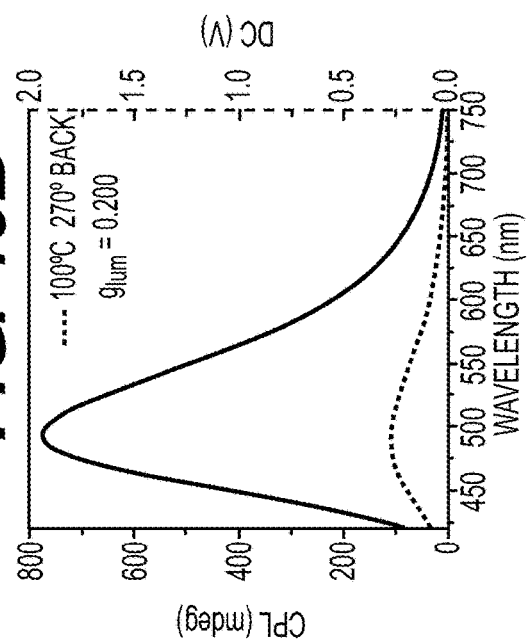
Figure 46A:
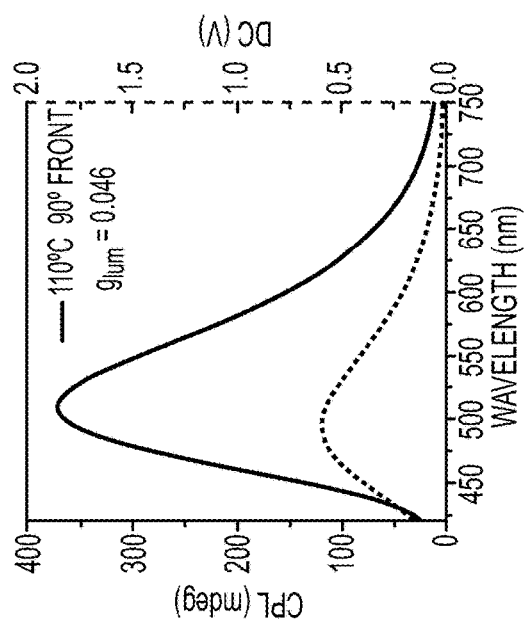
FIGS. 46A-46D depict CPL spectra of DPCE-ECh films annealed at 110° C. for 45 minutes at different rotation angles perpendicular to the light axis (front side).
Figure 46B:
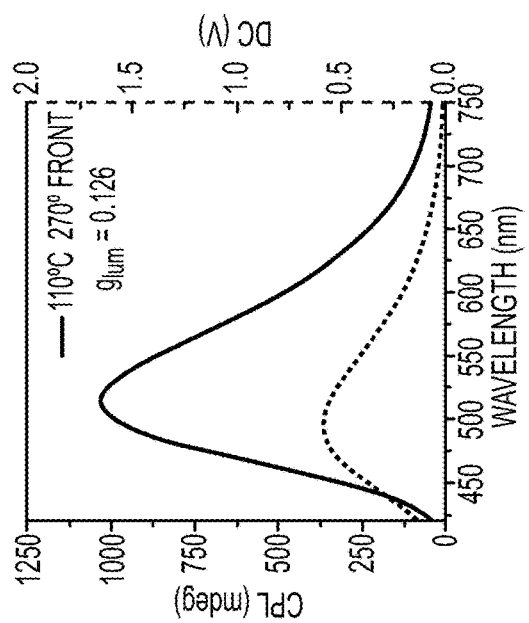
Figure 46C:
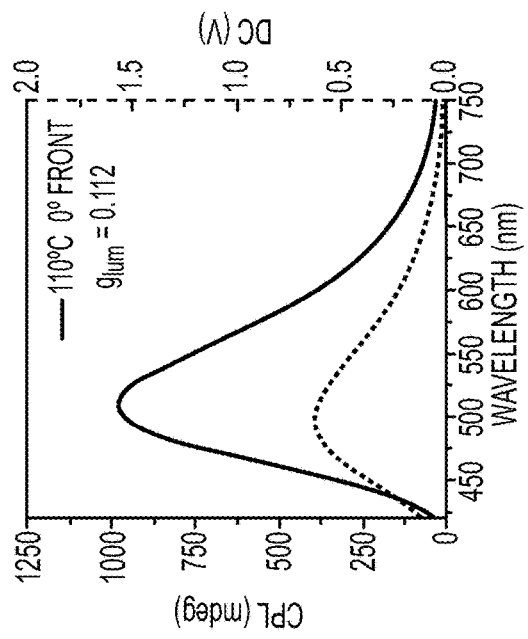
Figure 46D:
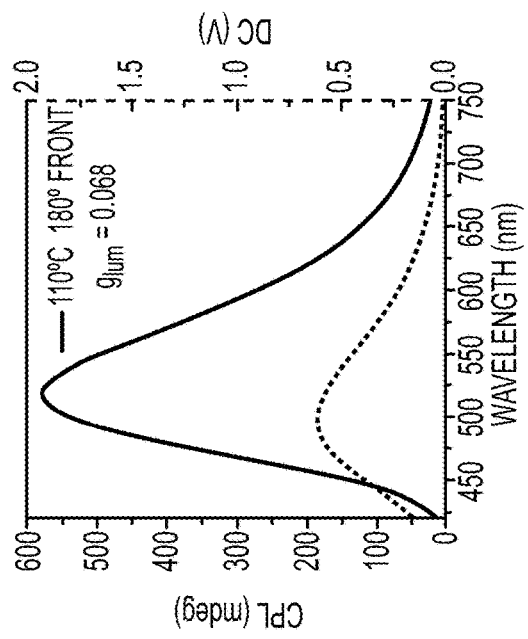
Figure 49A:
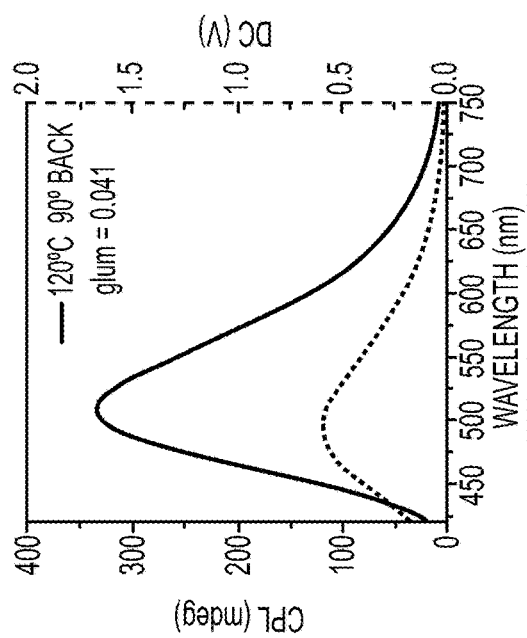
FIGS. 49A-49D depict CPL spectra of DPCE-ECh films annealed at 120° C. for 45 minutes at different rotation angles perpendicular to the light axis (back side).
Figure 49B:
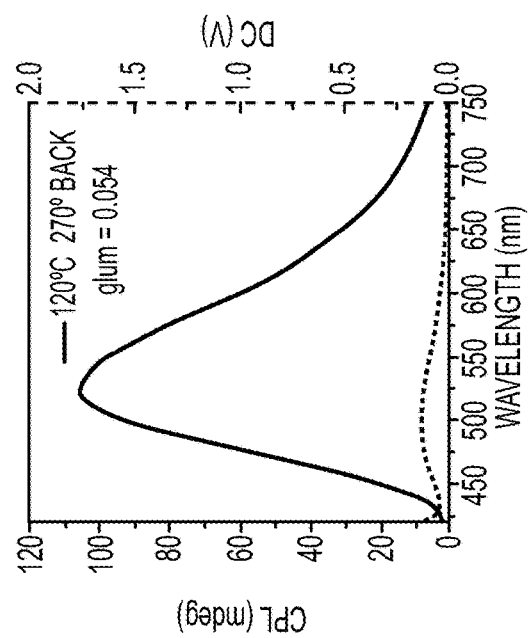
Figure 49C:
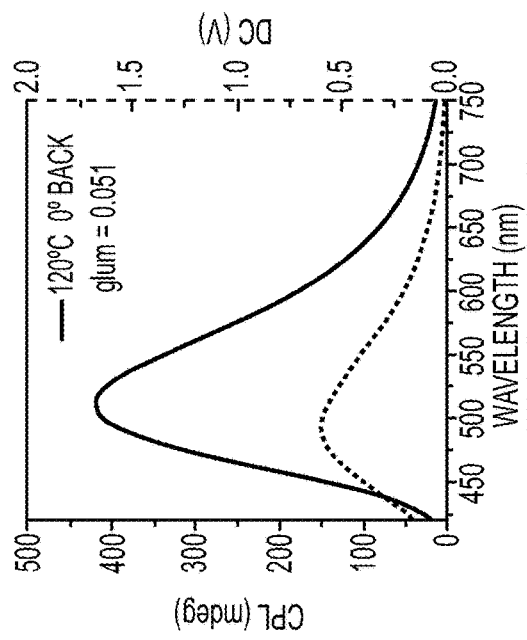
Figure 49D:
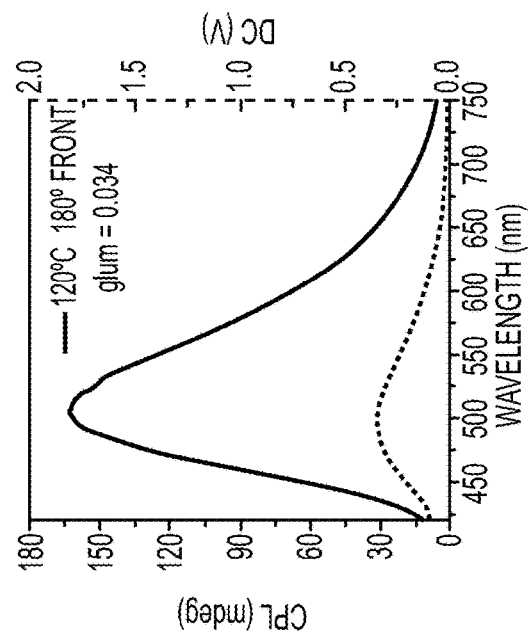

As shown in the illustration in FIG. 38A-38D, the point-focused X-ray beam was aligned perpendicular to the shear direction. It was noted that the diffuse peaks at smaller (FIG. 5C) and larger angles (FIG. 5D, marked with dash line) are not orthogonal to each other. This suggests that the director makes a tilt angle with respect to the smectic layer and the angle rotates from layer to layer to form a smectic C phase. CD experiments were conducted to analyze the chiroptical activities of DPCE-ECh solid film on glass slides. Even when the samples were rotated or flipped, strong and consistent CD signals were obtained (FIGS. 5E, 35A-35F). This implies that the long helical molecular stacking axis was perpendicular rather than parallel to the optical axis (FIGS. 36A-36B).

Figure 5F:
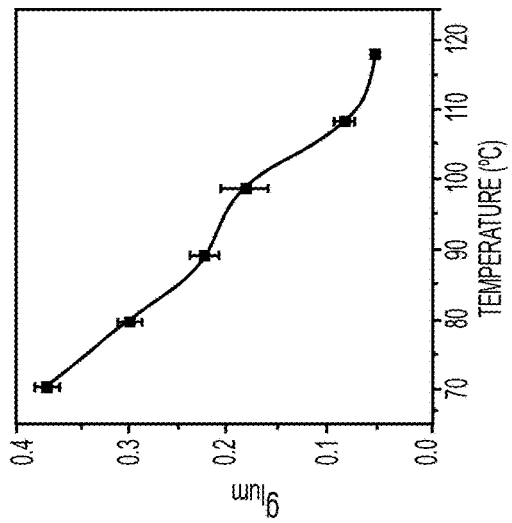
Figure 5G:
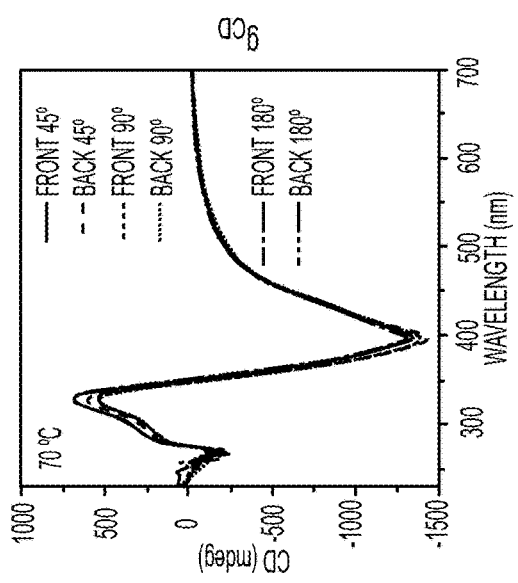

In addition, the molecular orientation in-plane was supposed to be aligned randomly. In this sense, the LDLB effect in such solid film could be neglected and genuine chiroptical signals from the chiral supramolecular structure would result. A $g_{CD}$ value of $-0.20$ at 404 nm was achieved (FIG. 5F). Similarly, a film in a 7 μm thick liquid crystal cell for CPL measurement was fabricated. CPL spectra were also obtained by rotating the sample at different angles in both sides (FIG. 5G). Strong CPL responses with positive signals were observed in this annealed film with a maximum $g_{lum}$ value (average, 70° C.) of $+0.380\pm0.011$. However, different $g_{lum}$ ranging from 0.342 to 0.438 were observed with varied angles and sides. The strong CPL response arose from the chiral supramolecular structure in which the helical axis was perpendicular to the optical axis and parallel to the direction of the glass substrate. The large difference in $g_{lum}$ (about 0.1) at different angles in both sides was attributed to the birefringence pattern. Because the film thickness was 7 μm for CPL detection, which is much thicker than the film for CD detection (50 nm), the artifact induced by the birefringent domains was amplified in the thick film. Such large $g_{lum}$ values (+0.380±0.011) with weak contribution of Bragg reflection was very rare for organic compounds.

Figure 5H:
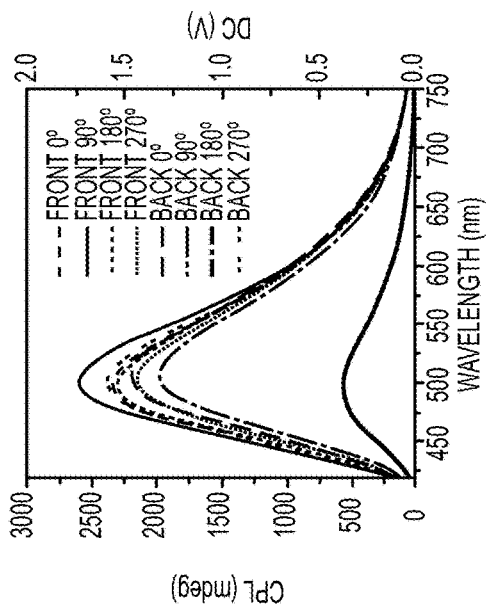
Figure 6:
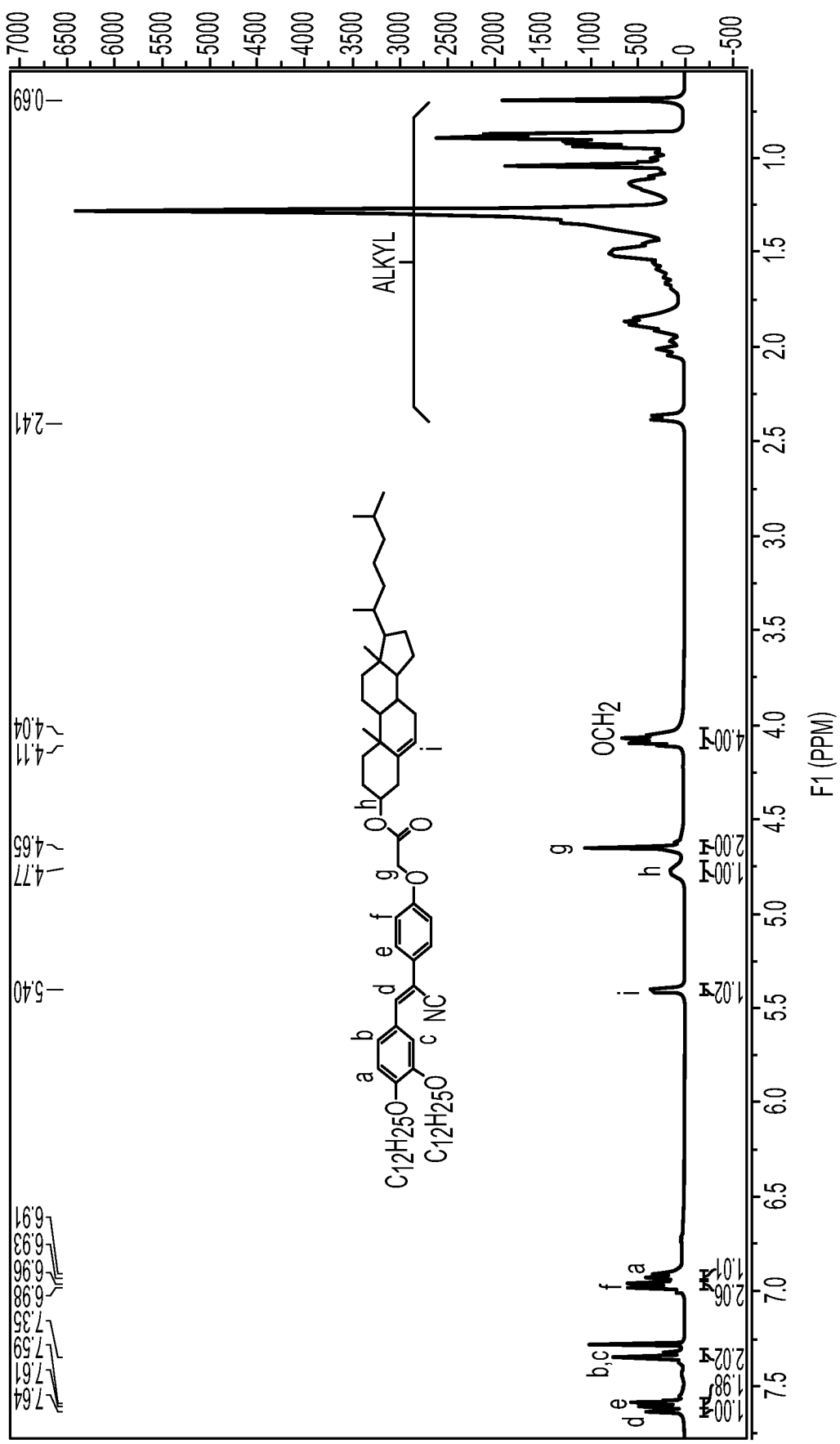
FIG. 6 depicts $^1$H NMR spectrum of DPCE-ECh in CDCl$_3$.
Figure 7:
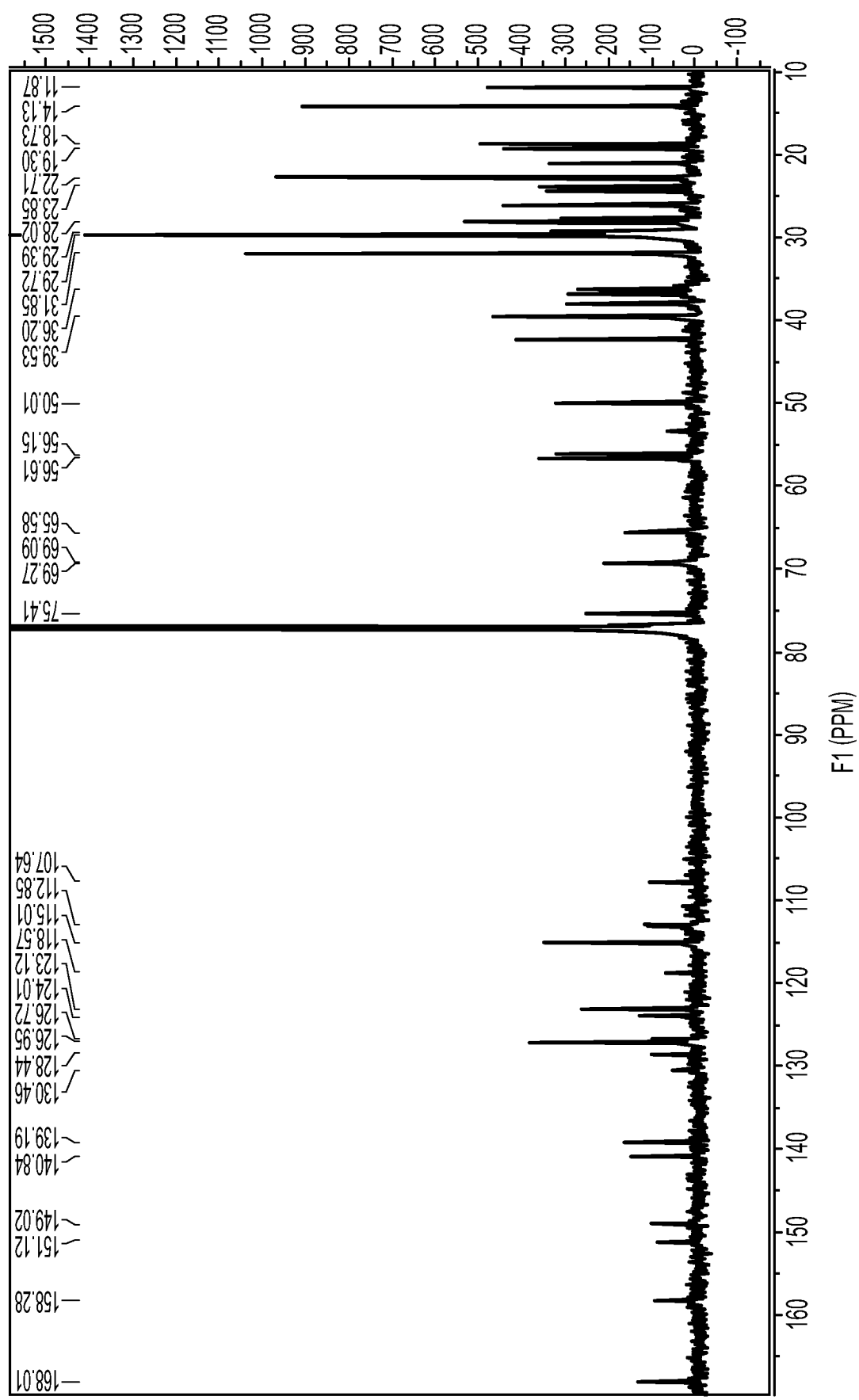
FIG. 7 depicts $^{13}$C NMR spectrum of DPCE-ECh in CDCl$_3$.
Figure 8:
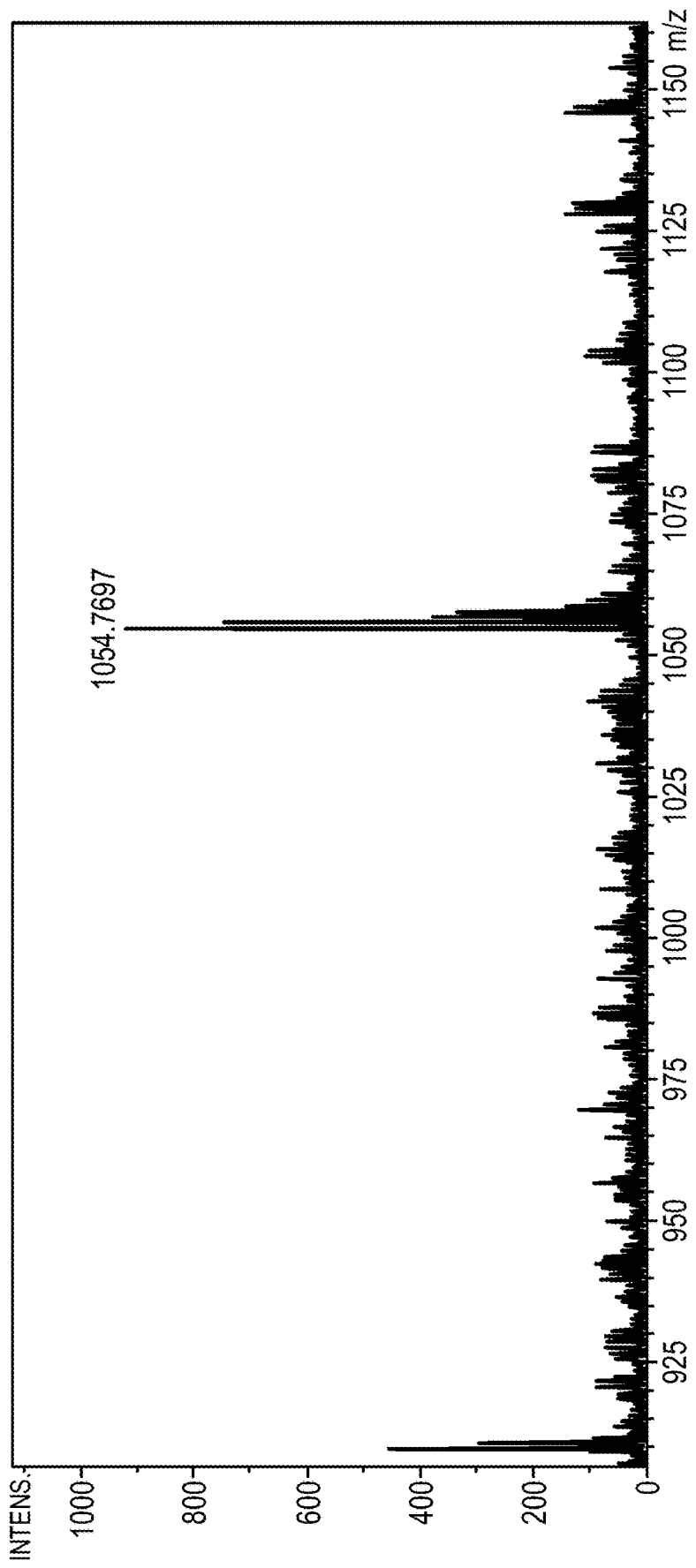
FIG. 8 depicts HR-ESI-MS spectrum of DPCE-ECh.
Figure 9:
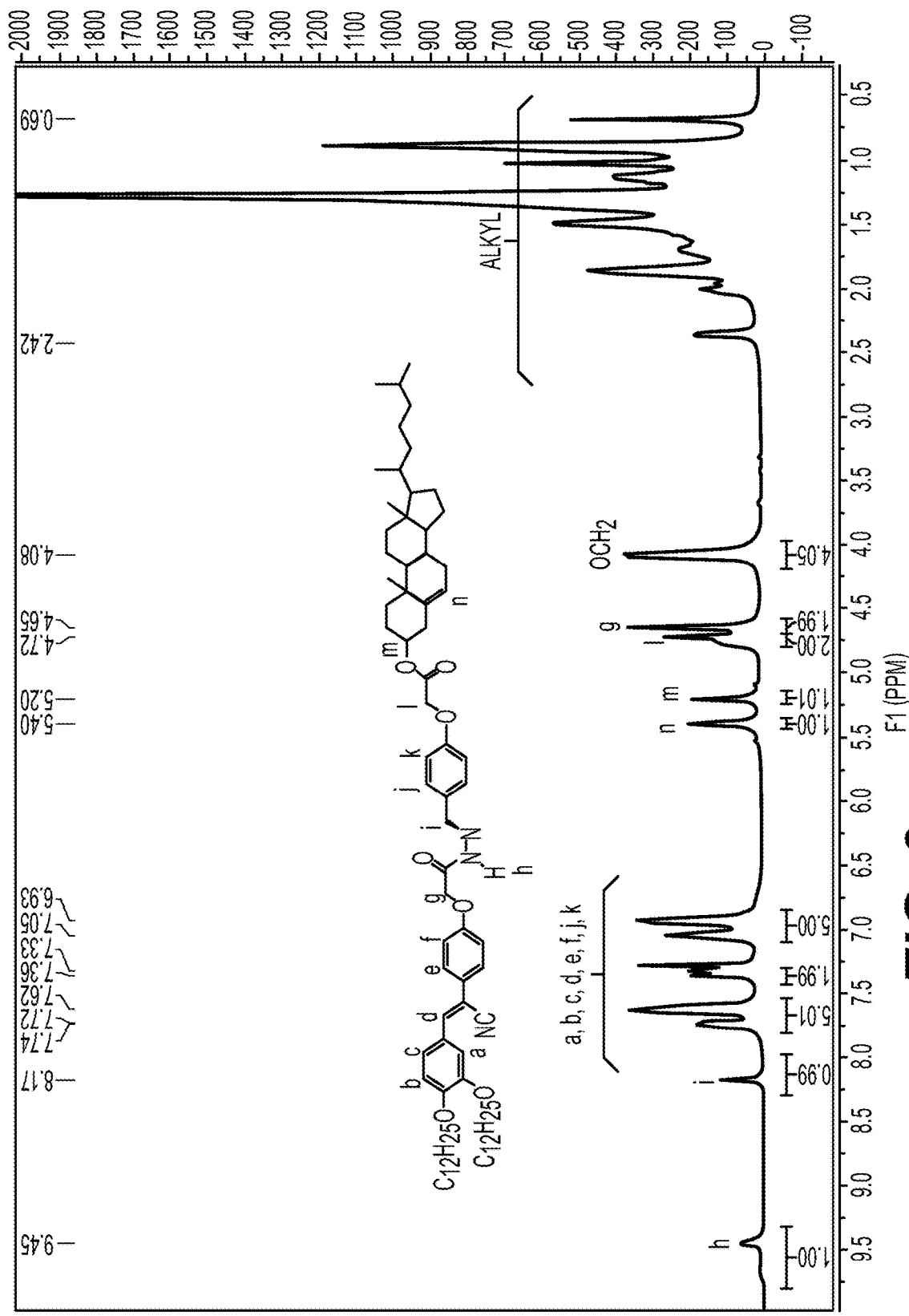
FIG. 9 depicts $^1$H NMR spectrum of DPCE-ACh in CDCl$_3$.
Figure 10:
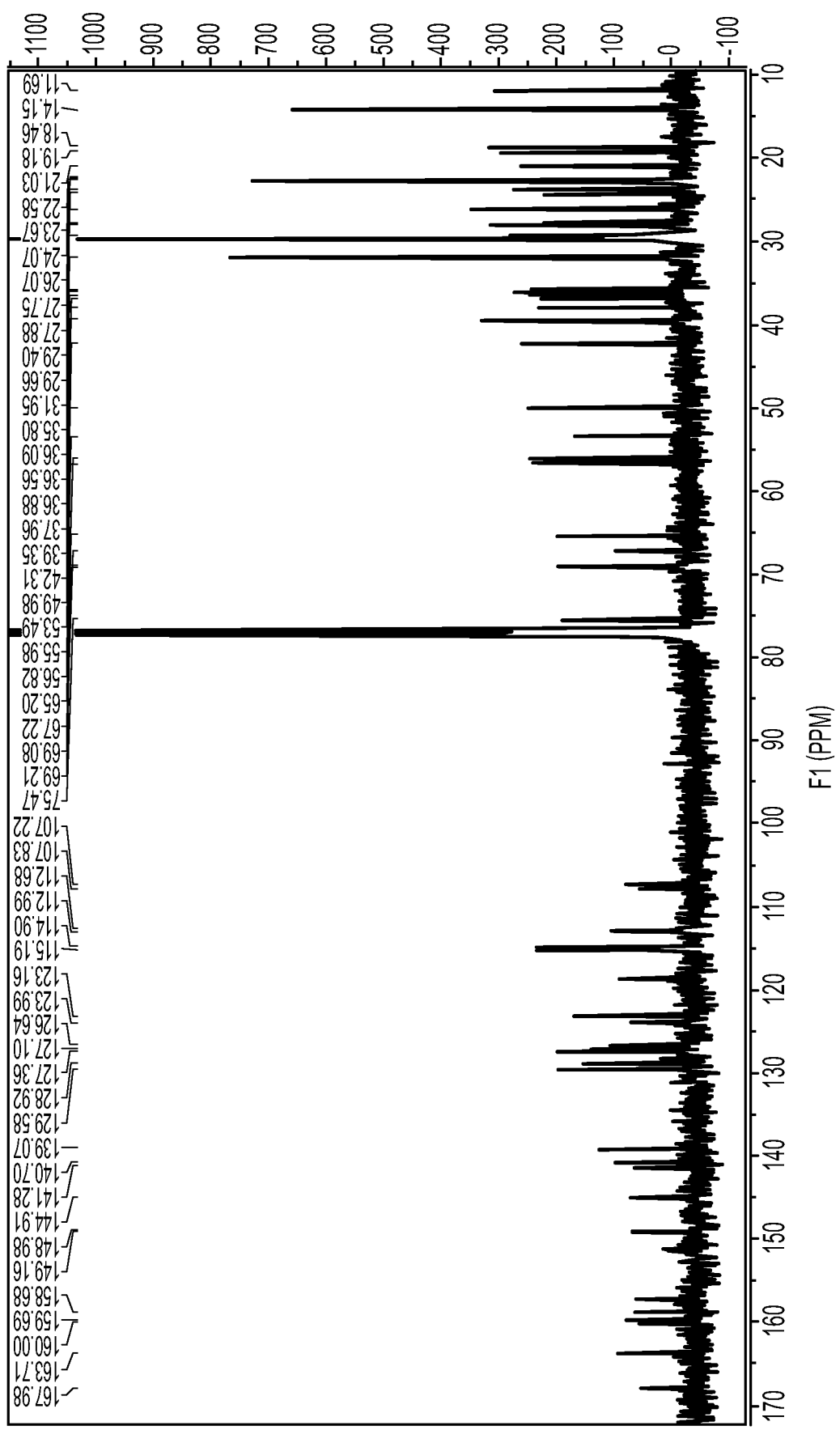
FIG. 10 depicts $^{13}$C NMR spectrum of DPCE-ACh in CDCl$_3$.
Figure 11:
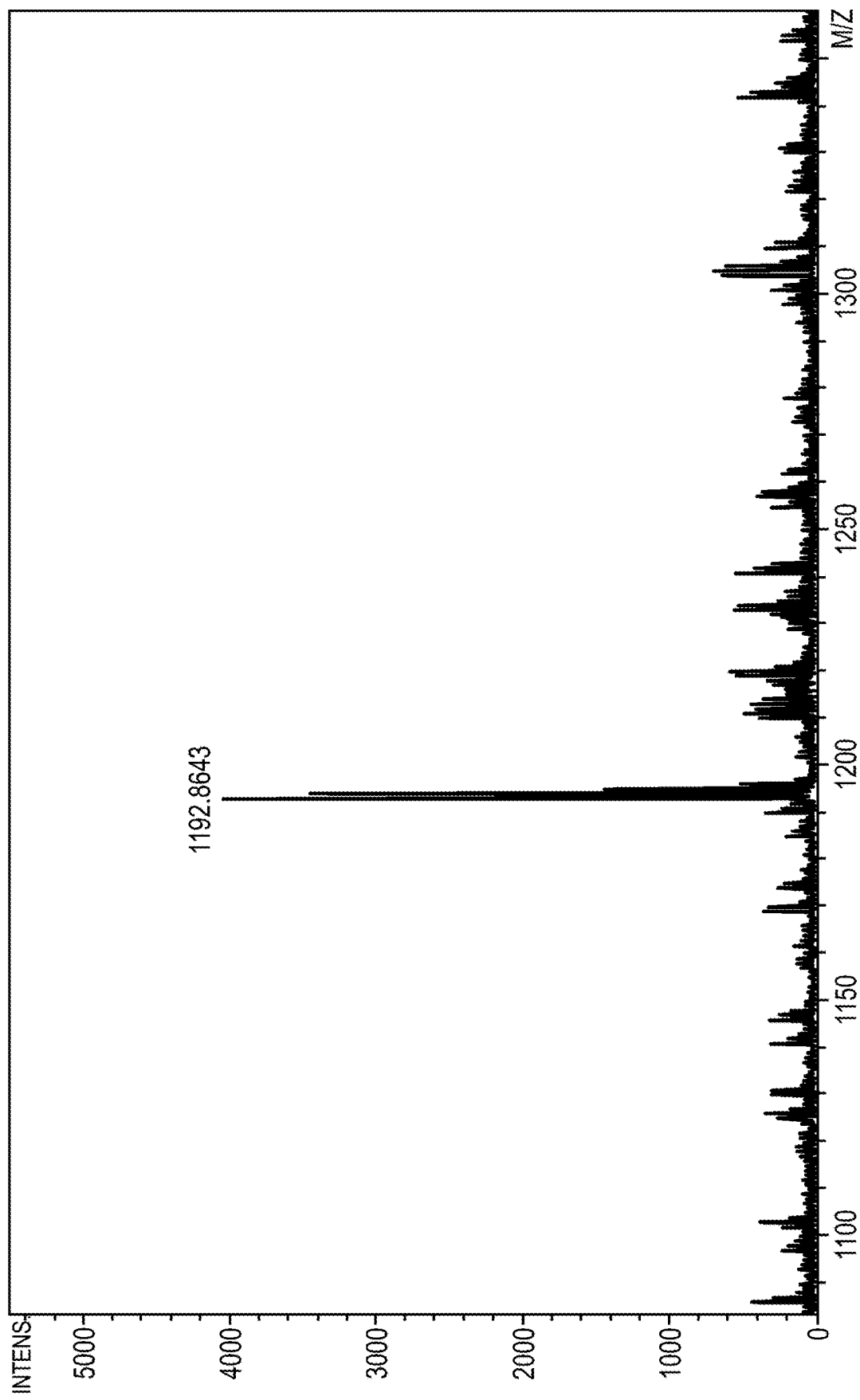
FIG. 11 depicts HR-ESI-MS spectrum of DPCE-ACh.
Figure 31:
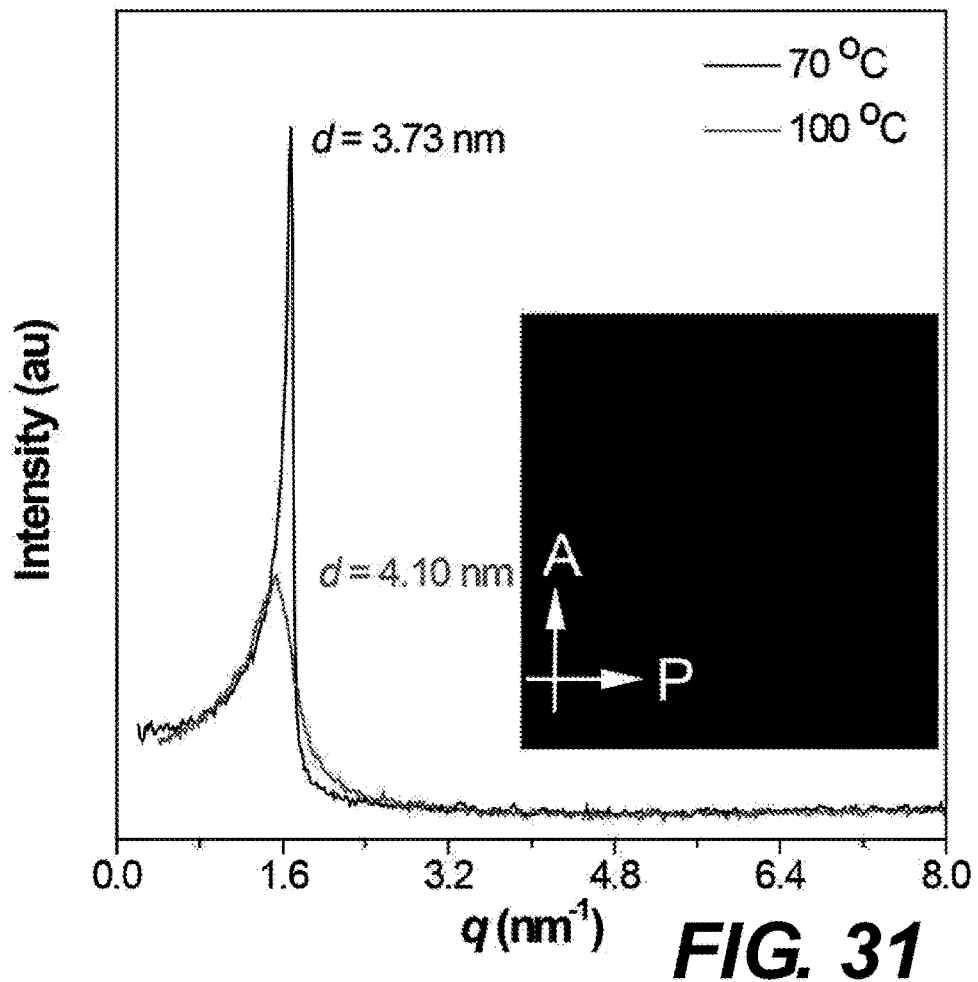
FIG. 31 depicts SAXS pattern at different temperatures (Inset: POM image of DPCE-ECh at 100° C.
Figure 35A:
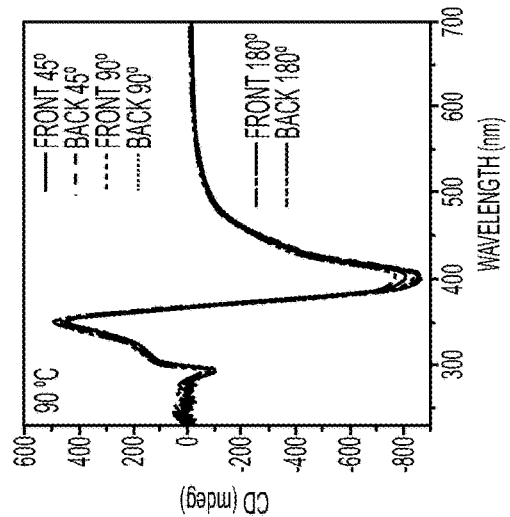
FIGS. 35A-35F depict (A) spectra of front and back sides of DPCE-ECh films annealed at 70° C. for 45 minutes recorded at different rotation angles perpendicular to the light axis; (B) spectra of front and back sides of DPCE-ECh films annealed at 80° C. for 45 minutes recorded at different rotation angles perpendicular to the light axis; (C) spectra of front and back sides of DPCE-ECh films annealed at 90° C. for 45 minutes recorded at different rotation angles perpendicular to the light axis; (D) spectra of front and back sides of DPCE-ECh films annealed at 100° C. for 45 minutes recorded at different rotation angles perpendicular to the light axis; (E) spectra of front and back sides of DPCE-ECh films annealed at 110° C. for 45 minutes recorded at different rotation angles perpendicular to the light axis; and (F) spectra of front and back sides of DPCE-ECh films annealed at 120° C. for 45 minutes recorded at different rotation angles perpendicular to the light axis; the film thickness of DPCE-ECh is 50 nm for CD detection.
Figure 35B:
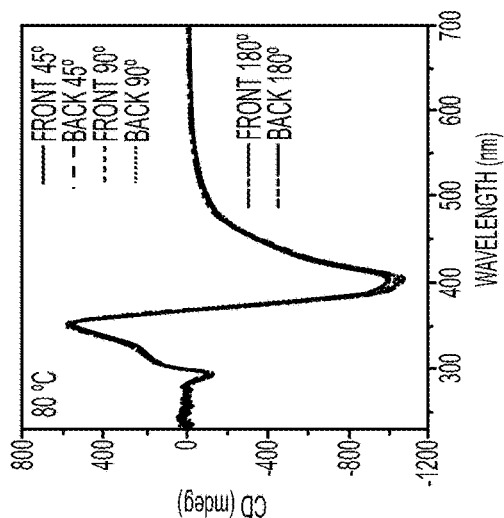
Figure 35C:
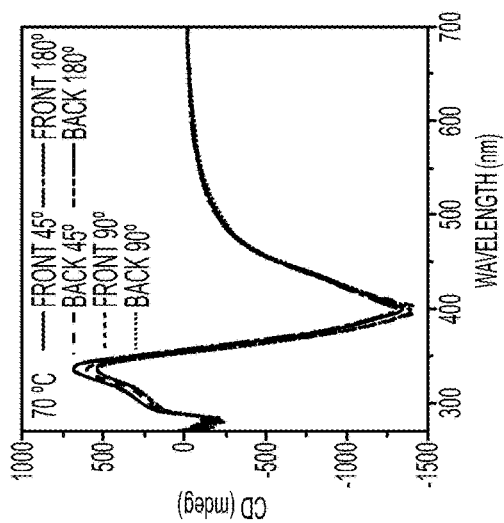
Figure 35D:
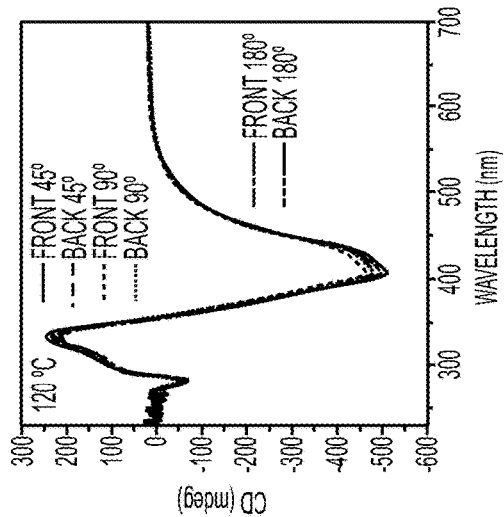
Figure 35E:
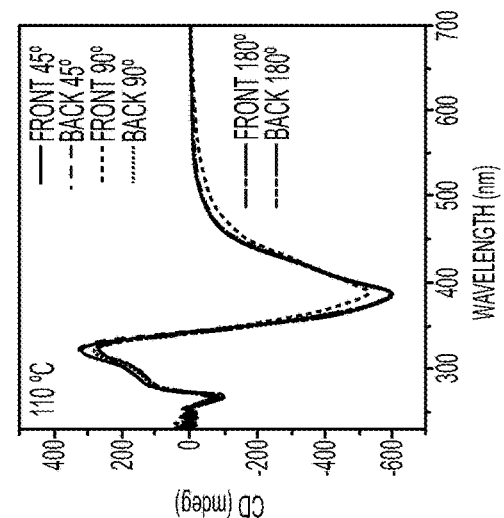
Figure 35F:
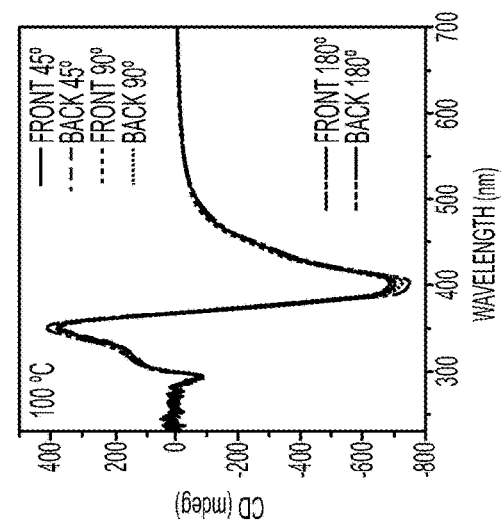

By increasing the annealing temperature (>70° C.), the dissymmetry factor ($g_{cD}$ and $g_{lum}$) of the thin film decreased (FIGS. 5F, 5H), indicating the dissociation of the smectic C phase. Interestingly, when the isotropic liquid of DPCE-ECh was annealed at a temperature range of 90-120° C. followed by CPL measurement, a strong CPL signal with a $g_{CD}$ value of −0.11 and a $g_{lum}$ value of +0.18 was still recorded (FIGS. 38A-49D). The CPL response of the isotropoic state of DPCE-ECh indicates that a twisted organization is still retained in the aggregate and such twisting is still sufficient for CPL induction. Thus, this chiral isotropic state is identified as chiral isotropic liquid (Iso*) in FIG. 31 (inset), which was a recently discovered new phase.

Figures 50A, 50B:
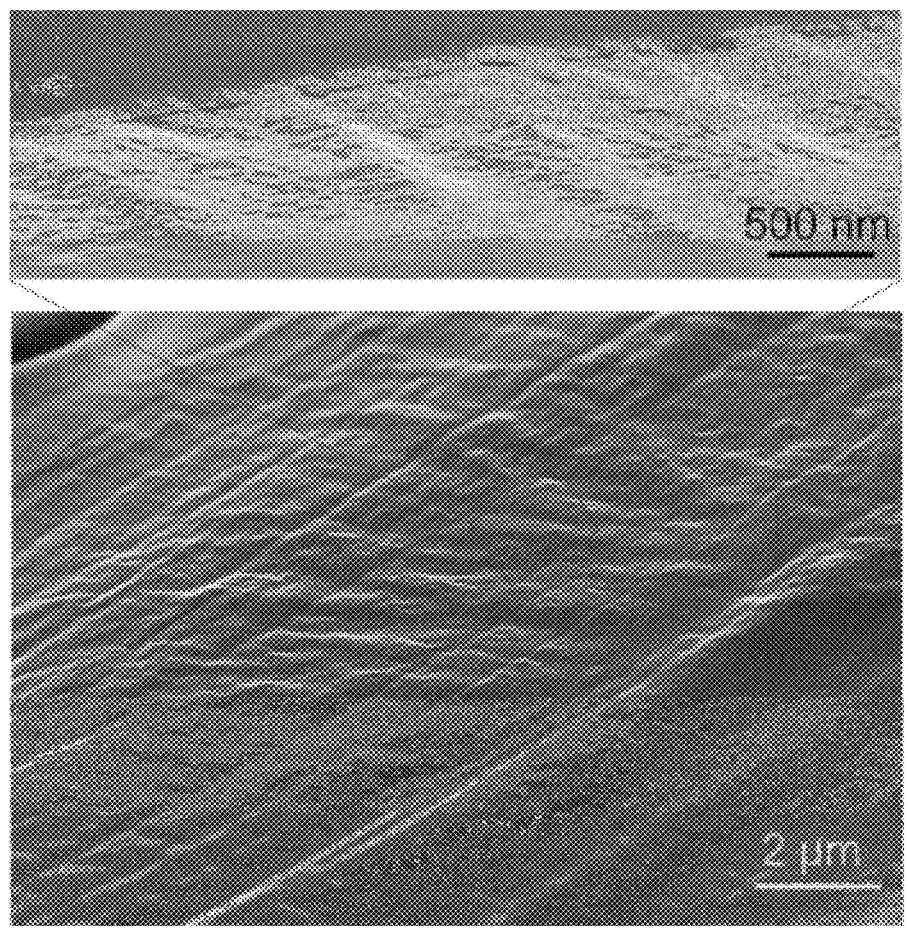
FIGS. 50A-50B depict SEM textures of DPCE-ECh with layered arch structures on the fracture plane.

Normally, the measured g value in a disperse phase represents a weighted average of all possible orientations. In THF solution, DPCE-ECh and DPCE-ACh ($10^{-5}$ mol $L^{-1}$) were soluble and dispersed in an isolated fashion in solution. Therefore, the measured g value in dilute solution comes from the single molecule itself. For a single molecule, the chiral function was mainly focused on the cholesterol unit and the luminescent function was mainly focused on the diphenylacrylonitrile unit. Hence, no CPL signal was observed in these single molecules. On the other hand, the aggregates of DPCE-ECh maintained a spherical structure regardless of the water fraction variation. Such a symmetrical morphology lead to a silent CPL response. Meanwhile, in the solid state, combining the X-ray results and chiroptical activity of DPCE-ECh, a smectic C* phase was identified finally. Moreover, SEM images showed textures of the fracture plane of DPCE-ECh with layered and arched structures (FIGS. 50A-50B). The smectic C* state lead to a giant CPL response. For DPCE-ACh, a positive CPL signal was observed due to M-helical nanofibers formation in suspension. Negative CPL signal was observed due to the complex liquid crystalline (H+S) orientations in the solid state. These findings demonstrated that the CPL response (intensity and orientation) of synthetic advanced materials not only relies on chiral functions on the molecular level, but also depends on the mesoscopic architectures of the molecular assemblies.

The present subject matter being thus described, it will be apparent that the same may be modified or varied in many ways. Such modifications and variations are not to be regarded as a departure from the spirit and scope of the present subject matter, and all such modifications and variations are intended to be included within the scope of the following claims.

We claim:
1. A fluorescent compound selected from the group consisting of

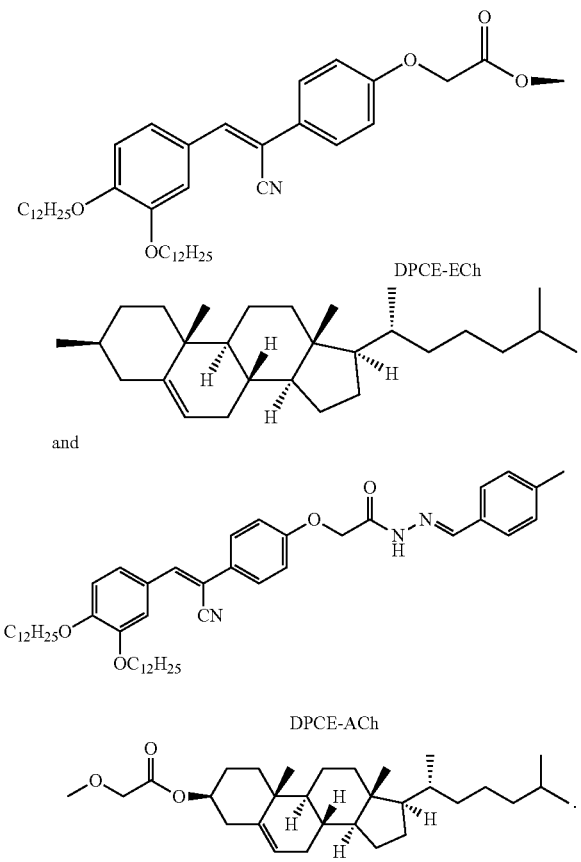

2. The compound of claim 1, wherein the compound emits circularly polarized light in the aggregate state.
3. A chiral dye comprising the compound of claim 1.
4. A circularly polarized organic light-emitting crystal comprising the compound of claim 1.

* * * * *